US008924889B2

(12) United States Patent
Hunleth et al.

(10) Patent No.: US 8,924,889 B2
(45) Date of Patent: Dec. 30, 2014

(54) SCENE TRANSITIONS IN A ZOOMABLE USER INTERFACE USING A ZOOMABLE MARKUP LANGUAGE

(75) Inventors: Frank A. Hunleth, Rockville, MD (US); Stephen Scheirey, Urbana, MD (US); Charles W. K. Gritton, Sterling, VA (US)

(73) Assignee: Hillcrest Laboratories, Inc., Rockville, MD (US)

( * ) Notice: Subject to any disclaimer, the term of this patent is extended or adjusted under 35 U.S.C. 154(b) by 2014 days.

(21) Appl. No.: 11/633,325

(22) Filed: Dec. 4, 2006

(65) Prior Publication Data

US 2007/0192739 A1      Aug. 16, 2007

Related U.S. Application Data

(63) Continuation of application No. 11/325,749, filed on Jan. 5, 2006, now abandoned.

(60) Provisional application No. 60/741,596, filed on Dec. 2, 2005.

(51) Int. Cl.
*G06F 3/048* (2013.01)
*G06F 3/0481* (2013.01)

(52) U.S. Cl.
CPC .... *G06F 3/0481* (2013.01); *G06F 2203/04806* (2013.01)
USPC ......................................... 715/800

(58) Field of Classification Search
USPC .................. 715/781, 800–801, 719, 720, 798
See application file for complete search history.

(56) References Cited

U.S. PATENT DOCUMENTS

| | | |
|---|---|---|
| 6,314,575 B1 | 11/2001 | Billock et al. |
| 6,377,285 B1 | 4/2002 | Doan et al. |
| 6,412,110 B1 | 6/2002 | Schein et al. |
| 6,421,067 B1 | 7/2002 | Kamen et al. |

(Continued)

OTHER PUBLICATIONS

International Search Report for PCT/US06/46302 mailed Mar. 13, 2008.

(Continued)

*Primary Examiner* — Thanh Vu
(74) *Attorney, Agent, or Firm* — Patent Portfolio Builders PLLC

(57) ABSTRACT

Methods and systems are provided for allowing a user to interface with a system. More particularly, in one exemplary embodiment, a zoomable user interface (ZUI) generated by a processor includes a collection of scenes displayable on the ZUI including a first scene and a second scene, each of the scenes being implemented using software written in a programming language. The ZUI also includes an event capture mechanism for identifying user inputs to the ZUI, including a user input for requesting a change from the first scene to the second scene; and a transition between the first scene and the second scene in the collection of scenes, the transition conveying a spatial relationship between the first scene and the second scene within the ZUI.

54 Claims, 24 Drawing Sheets

(56) References Cited

U.S. PATENT DOCUMENTS

| | | | |
|---|---|---|---|
| 6,577,350 | B1 | 6/2003 | Proehl et al. |
| 7,239,301 | B2 | 7/2007 | Liberty et al. |
| 2003/0007006 | A1 | 1/2003 | Baar et al. |
| 2003/0128390 | A1* | 7/2003 | Yip et al. ............... 358/1.18 |
| 2004/0056861 | A1 | 3/2004 | Huber et al. |
| 2004/0233219 | A1 | 11/2004 | Aguera y Arcas |
| 2004/0268393 | A1 | 12/2004 | Hunleth et al. |
| 2005/0001849 | A1 | 1/2005 | Arcas |
| 2005/0005263 | A1* | 1/2005 | Miyazaki ............... 717/114 |
| 2005/0182792 | A1 | 8/2005 | Israel et al. |
| 2006/0010246 | A1* | 1/2006 | Schulz et al. ........... 709/232 |
| 2006/0176403 | A1 | 8/2006 | Gritton et al. |

OTHER PUBLICATIONS

Written Opinion for PCT/US06/46302 mailed Mar. 13, 2008.

Bederson, B., Quantum Treemaps and Bubblemaps for a Zoomable Image Browser, UIST 2001, ACM Symposium on User Interface Software and Technology, CHI Letters 3(2), pp. 71-80.

Andersson, O., et al., "Scalable Vector Graphics (SVG) 1.1 Specification," W3C Recommendation, Jan. 14, 2003, outline, downloaded on Aug. 30, 2007, http://www.w3.org/TR/2003/REC-SVG11-20030114/, pp. 1-5.

Andersson, O., et al., "SVG Tiny 1.2-20060810—7 Coordinate Systems, Transformations and Units," W3C Candidate Recommendation, Aug. 10, 2006, downloaded on Aug. 30, 2007, http://www.w3.org/TR/SVGMobile12/coords.html, pp. 1-30.

\* cited by examiner

DRAMA

APOLLO 13 (1995)
Length: 120 Minutes   Price: $3.99   (BUY/WATCH TRAILER/BACK)

Massively popular, fast-paced retelling of near-disater space mission. Much to enjoy for fans of suspense and special effects. Well-developed characters appeal even to those who don't like typical Hollywood epics.

Actors: Tom Hanks, Bill Paxton, Kevin Bacon, Gary Sinise, Ed Harris

Tom Hanks

American leading actor Tom Hanks has become one of the most popular stars in contemporary American cinema. Born July 9, 1956, in Concord, CA.

Rated by Empire Magazine as 17th out of The Top 100 Movie Stars of All Time in October 1997, Hanks is married to actress Rita Wilson, with whom he appeared in Volunteers (1985).

Filmography
Saving Private Ryan
The Green Mile
Forrest Gump
Road to Perdition
Apollo 13
Philadelphia
Toy Story
Cast Away

SCENE TRANSITIONS IN A ZOOMABLE USER INTERFACE USING A ZOOMABLE MARKUP LANGUAGE

RELATED APPLICATIONS

This application is related to, and claims priority from, U.S. patent application Ser. No. 11/325,749, filed on Jan. 5, 2006, entitled "Distributed Software Construction for User Interfaces", the disclosure of which is incorporated here by reference. This application is also related to, and claims priority from, U.S. Provisional Patent Application Ser. No. 60/741,596, filed on Dec. 2, 2005, entitled "Home Multimedia Environment", the disclosure of which is incorporated here by reference.

BACKGROUND

The present invention describes a framework for organizing, selecting and launching media items. Part of that framework involves the design and operation of graphical user interfaces with the basic building blocks of point, click, scroll, hover and zoom and, more particularly, to zoomable user interfaces associated with media items which can be used with, e.g., a 3D pointing remote.

Technologies associated with the communication of information have evolved rapidly over the last several decades. Television, cellular telephony, the Internet and optical communication techniques (to name just a few things) combine to inundate consumers with available information and entertainment options. Taking television as an example, the last three decades have seen the introduction of cable television service, satellite television service, pay-per-view movies and video-on-demand. Whereas television viewers of the 1960s could typically receive perhaps four or five over-the-air TV channels on their television sets, today's TV watchers have the opportunity to select from hundreds and potentially thousands of channels of shows and information. Video-on-demand technology, currently used primarily in hotels and the like, provides the potential for in-home entertainment selection from among thousands of movie titles. Digital video recording (DVR) equipment such as offered by TiVo, Inc., 2160 Gold Street, Alviso, Calif. 95002, further expand the available choices.

The technological ability to provide so much information and content to end users provides both opportunities and challenges to system designers and service providers. One challenge is that while end users typically prefer having more choices rather than fewer, this preference is counterweighted by their desire that the selection process be both fast and simple. Unfortunately, the development of the systems and interfaces by which end users access media items has resulted in selection processes which are neither fast nor simple. Consider again the example of television programs. When television was in its infancy, determining which program to watch was a relatively simple process primarily due to the small number of choices. One would consult a printed guide which was formatted, for example, as series of columns and rows which showed the correspondence between (1) nearby television channels, (2) programs being transmitted on those channels and (3) date and time. The television was tuned to the desired channel by adjusting a tuner knob and the viewer watched the selected program. Later, remote control devices were introduced that permitted viewers to tune the television from a distance. This addition to the user-television interface created the phenomenon known as "channel surfing" whereby a viewer could rapidly view short segments being broadcast on a number of channels to quickly learn what programs were available at any given time.

Despite the fact that the number of channels and amount of viewable content has dramatically increased, the generally available user interface and control device options and framework for televisions has not changed much over the last 30 years. Printed guides are still the most prevalent mechanism for conveying programming information. The multiple button remote control with simple up and down arrows is still the most prevalent channel/content selection mechanism. The reaction of those who design and implement the TV user interface to the increase in available media content has been a straightforward extension of the existing selection procedures and interface objects. Thus, the number of rows and columns in the printed guides has been increased to accommodate more channels. The number of buttons on the remote control devices has been increased to support additional functionality and content handling, e.g., as shown in FIG. 1. However, this approach has significantly increased both the time required for a viewer to review the available information and the complexity of actions required to implement a selection. Arguably, the cumbersome nature of the existing interface has hampered commercial implementation of some services, e.g., video-on-demand, since consumers are resistant to new services that will add complexity to an interface that they view as already too slow and complex.

In addition to increases in bandwidth and content, the user interface bottleneck problem is being exacerbated by the aggregation of technologies. Consumers are reacting positively to having the option of buying integrated systems rather than a number of segregable components. A good example of this trend is the combination television/VCR/DVD in which three previously independent components are frequently sold today as an integrated unit. This trend is likely to continue, potentially with an end result that most if not all of the communication devices currently found in the household being packaged as an integrated unit, e.g., a television/VCR/DVD/internet access/radio/stereo unit. Even those who buy separate components desire seamless control of and interworking between them. With this increased aggregation comes the potential for more complexity in the user interface. For example, when so-called "universal" remote units were introduced, e.g., to combine the functionality of TV remote units and VCR remote units, the number of buttons on these universal remote units was typically more than the number of buttons on either the TV remote unit or VCR remote unit individually. This added number of buttons and functionality makes it very difficult to control anything but the simplest aspects of a TV or VCR without hunting for exactly the right button on the remote. Many times, these universal remotes do not provide enough buttons to access many levels of control or features unique to certain TVs. In these cases, the original device remote unit is still needed, and the original hassle of handling multiple remotes remains due to user interface issues arising from the complexity of aggregation. Some remote units have addressed this problem by adding "soft" buttons that can be programmed with the expert commands. These soft buttons sometimes have accompanying LCD displays to indicate their action. These too have the flaw that they are difficult to use without looking away from the TV to the remote control. Yet another flaw in these remote units is the use of modes in an attempt to reduce the number of buttons. In these "moded" universal remote units, a special button exists to select whether the remote should communicate with the TV, DVD player, cable set-top box, VCR, etc. This causes many usability issues including sending commands to the wrong device, forcing the user to look at the remote to make sure that it is in the right mode, and it does not provide any simplification to the integration of multiple devices. The most advanced of these universal remote units provide some integration by allowing the user to program sequences of commands to multiple devices into the remote. This is such a difficult task that many users hire professional installers to program their universal remote units.

Some attempts have also been made to modernize the screen interface between end users and media systems. Electronic program guides (EPGs) have been developed and implemented to replace the afore-described media guides. Early EPGs provided what was essentially an electronic replica of the printed media guides. For example, cable service operators have provided analog EPGs wherein a dedicated channel displays a slowly scrolling grid of the channels and their associated programs over a certain time horizon, e.g., the next two hours. Scrolling through even one hundred channels in this way can be tedious and is not feasibly scalable to include significant additional content deployment, e.g., video-on-demand. More sophisticated digital EPGs have also been developed. In digital EPGs, program schedule information, and optionally applications/system software, is transmitted to dedicated EPG equipment, e.g., a digital set-top box (STB). Digital EPGs provide more flexibility in designing the user interface for media systems due to their ability to provide local interactivity and to interpose one or more interface layers between the user and the selection of the media items to be viewed. An example of such an interface can be found in U.S. Pat. No. 6,421,067 to Kamen et al., the disclosure of which is incorporated here by reference. FIG. 2 depicts a GUI described in the '067 patent. Therein, according to the Kamen et al. patent, a first column 190 lists program channels, a second column 191 depicts programs currently playing, a column 192 depicts programs playing in the next half-hour, and a fourth column 193 depicts programs playing in the half hour after that. The baseball bat icon 121 spans columns 191 and 192, thereby indicating that the baseball game is expected to continue into the time slot corresponding to column 192. However, text block 111 does not extend through into column 192. This indicates that the football game is not expected to extend into the time slot corresponding to column 192. As can be seen, a pictogram 194 indicates that after the football game, ABC will be showing a horse race. The icons shown in FIG. 2 can be actuated using a cursor, not shown, to implement various features, e.g., to download information associated with the selected programming. Other digital EPGs and related interfaces are described, for example, in U.S. Pat. Nos. 6,314,575, 6,412,110, and 6,577,350, the disclosures of which are also incorporated here by reference.

However, the interfaces described above suffer from, among other drawbacks, an inability to easily scale between large collections of media items and small collections of media items. For example, interfaces which rely on lists of items may work well for small collections of media items, but are tedious to browse for large collections of media items. Interfaces which rely on hierarchical navigation (e.g., tree structures) may be more speedy to traverse than list interfaces for large collections of media items, but are not readily adaptable to small collections of media items. Additionally, users tend to lose interest in selection processes wherein the user has to move through three or more layers in a tree structure. For all of these cases, current remote units make this selection processor even more tedious by forcing the user to repeatedly depress the up and down buttons to navigate the list or hierarchies. When selection skipping controls are available such as page up and page down, the user usually has to look at the remote to find these special buttons or be trained to know that they even exist.

Organizing frameworks, techniques and systems which simplify the control and screen interface between users and media systems as well as accelerate the selection process have been described in U.S. patent application Ser. No. 10/768, 432, filed on Jan. 30, 2004, entitled "A Control Framework with a Zoomable Graphical User Interface for Organizing, Selecting and Launching Media Items", the disclosure of which is incorporated here by reference and which is hereafter referred to as the "432 application". Such frameworks permit service providers to take advantage of the increases in available bandwidth to end user equipment by facilitating the supply of a large number of media items and new services to the user. One significant feature of such frameworks is the provision of a spatial relationship between displayed scenes within the interface. This spatial relationship, conveyed to the user, enables he or she to more easily navigate among what is potentially a very large number of scenes and selectable media objects provided within the interface.

Typically software development associated with user interface and application building associated with, for example, set-top box and TV systems involves a choice between two extremes. One approach is to develop all of the software as one unified application. This approach has the advantage that the interaction between the user and the user interface is fully encapsulated and the performance is fully controlled. The disadvantage of this approach is that the development of new features for the user interface is slow because the whole application is affected whenever something is changed. At the other end of the spectrum, there is the approach of designing the user interface much like a web browser. Using this approach, a small machine is built that interprets HTML code to build up the user interface screens. One advantage of this second approach is that development of applications is very quick. Disadvantages of this second approach include (1) that interactions are not fully encapsulated, (2) bandwidth performance issues are not fully controlled and (3) that the various programming languages available for building web browser-like applications, e.g., HTML, XML and SVG, do not provide the needed functionality to describe (and make use of) spatial relationships between scenes in an application. In these programming languages, one can build web browser applications having pages which are linked together in various ways, e.g., hyperlinks, and which may even provide for transition effects when a user moves from one page to the next, but do not provide any mechanism for building up a universe of scenes having spatial relationships which can then be used to aid a user in navigation.

Accordingly, it would be desirable to provide user interfaces, methods and software design constructions which overcome these difficulties.

SUMMARY

According to an exemplary embodiment, a zoomable user interface (ZUI) includes a collection of scenes displayable on the ZUI including a first scene and a second scene, each of the scenes being implemented using software written in a programming language, an event capture mechanism for identifying user inputs to the ZUI, including a user input for requesting a change from the first scene to the second scene; and a transition between the first scene and the second scene in said collection of scenes, the transition conveying a spatial relationship between the first scene and the second scene within the ZUI, wherein the transition is implemented using at least one ZUI attribute or element added to the programming language.

According to another exemplary embodiment, a method for displaying scenes on a zoomable user interface (ZUI) includes displaying a collection of scenes on the ZUI including a first scene and a second scene, each of the scenes being implemented using software written in a programming language, identifying user inputs to the ZUI, including a user input for requesting a change from the first scene to the second scene, and transitioning between the first scene and the second scene in the collection of scenes, the transition conveying a spatial relationship between the first scene and the second scene within the ZUI, wherein the transition step is implemented using at least one ZUI attribute or element added to the programming language.

According to still another exemplary embodiment, a system for displaying scenes on a zoomable user interface (ZUI) includes means for displaying a collection of scenes on the ZUI including a first scene and a second scene, each of the scenes being implemented using software written in a programming language, means for identifying user inputs to the ZUI, including a user input for requesting a change from the first scene to the second scene, and means for transitioning between the first scene and the second scene in the collection of scenes, the transition conveying a spatial relationship between the first scene and the second scene within the ZUI, wherein the means for transitioning is implemented using at least one ZUI attribute or element added to the programming language.

According to yet another exemplary embodiment, a computer-readable medium contains instructions which, when executed on a computer, perform the steps of displaying a collection of scenes on the ZUI including a first scene and a second scene, each of the scenes being implemented using software written in a programming language, identifying user inputs to the ZUI, including a user input for requesting a change from the first scene to the second scene, and transitioning between the first scene and the second scene in the collection of scenes, the transition conveying a spatial relationship between the first scene and the second scene within the ZUI, wherein the transition step is implemented using at least one ZUI attribute or element added to the programming language.

BRIEF DESCRIPTION OF THE DRAWINGS

The accompanying drawings illustrate exemplary embodiments of the present invention, wherein:

FIGS. 17-21 depict a zoomable graphical user interface according to another exemplary embodiment of the present invention;

DETAILED DESCRIPTION

Figure 1:
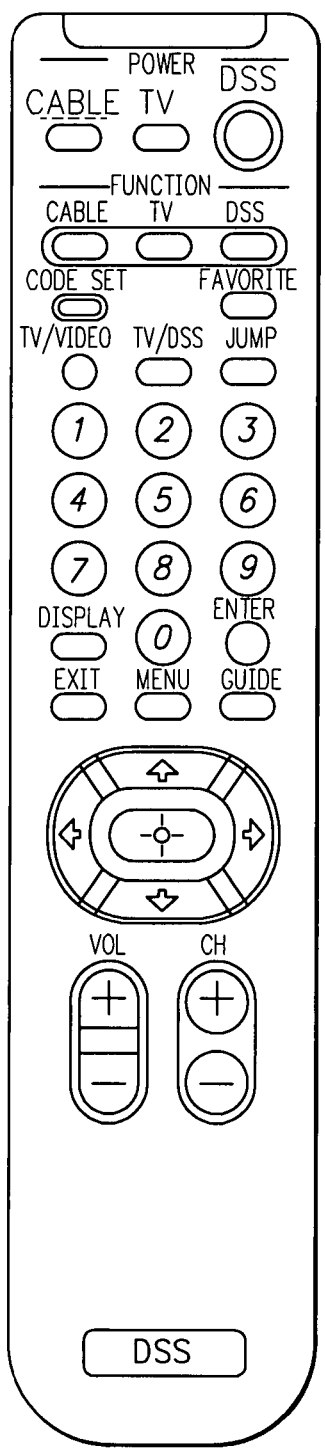
FIG. 1 depicts a conventional remote control unit for an entertainment system.
Figure 2:
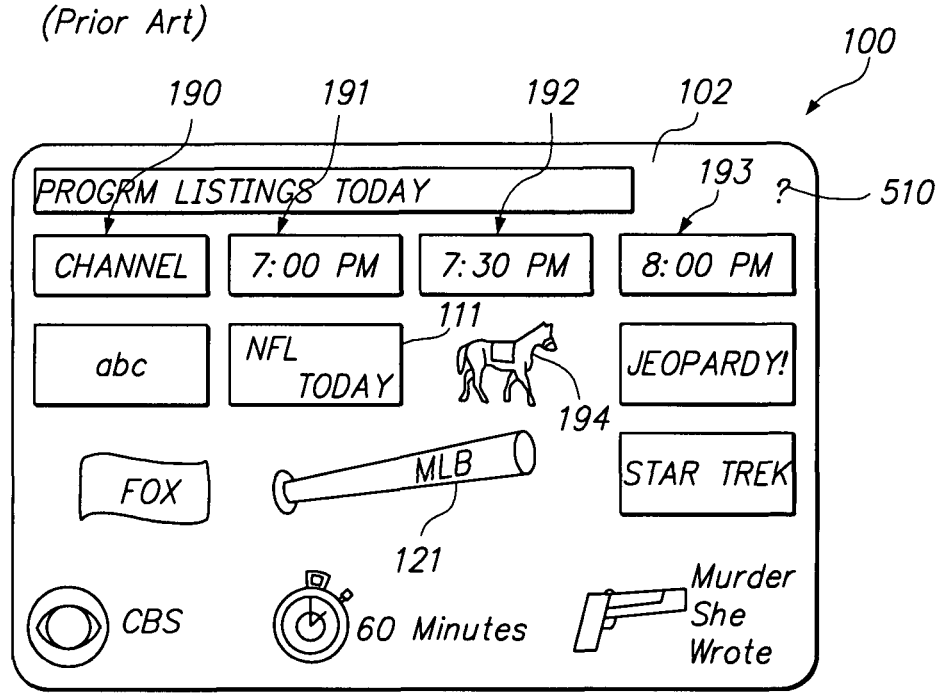
FIG. 2 depicts a conventional graphical user interface for an entertainment system.

The following detailed description of the invention refers to the accompanying drawings. The same reference numbers in different drawings identify the same or similar elements. Also, the following detailed description does not limit the invention. Instead, the scope of the invention is defined by the appended claims.

In order to provide some context for this discussion, an exemplary aggregated media system 200 which the present invention can be used to implement will first be described with respect to FIGS. 3-22. Those skilled in the art will appreciate, however, that the present invention is not restricted to implementation in this type of media system and that more or fewer components can be included therein. Therein, an input/output (I/O) bus 210 connects the system components in the media system 200 together. The I/O bus 210 represents any of a number of different of mechanisms and techniques for routing signals between the media system components. For example, the I/O bus 210 may include an appropriate number of independent audio "patch" cables that route audio signals, coaxial cables that route video signals, two-wire serial lines or infrared or radio frequency transceivers that route control signals, optical fiber or any other routing mechanisms that route other types of signals.

In this exemplary embodiment, the media system 200 includes a television/monitor 212, a video cassette recorder (VCR) 214, digital video disk (DVD) recorder/playback device 216, audio/video tuner 218 and compact disk player 220 coupled to the I/O bus 210. The VCR 214, DVD 216 and compact disk player 220 may be single disk or single cassette devices, or alternatively may be multiple disk or multiple cassette devices. They may be independent units or integrated together. In addition, the media system 200 includes a microphone/speaker system 222, video camera 224 and a wireless I/O control device 226. According to exemplary embodiments of the present invention, the wireless I/O control device 226 is a media system remote control unit that supports free space pointing, has a minimal number of buttons to support navigation, and communicates with the entertainment system 200 through RF signals. For example, wireless I/O control device 226 can be a 3D pointing device which uses a gyroscope or other mechanism to define both a screen position and a motion vector to determine the particular command desired. A set of buttons can also be included on the wireless I/O device 226 to initiate the "click" primitive described below as well as a "back" button. In another exemplary embodiment, wireless I/O control device 226 is a media system remote control unit, which communicates with the components of the entertainment system 200 through IR signals. In yet another embodiment, wireless I/O control device 134 may be an IR remote control device similar in appearance to a typical entertainment system remote control with the added feature of a track-ball or other navigational mechanisms which allows a user to position a cursor on a display of the entertainment system 100.

Figure 3:
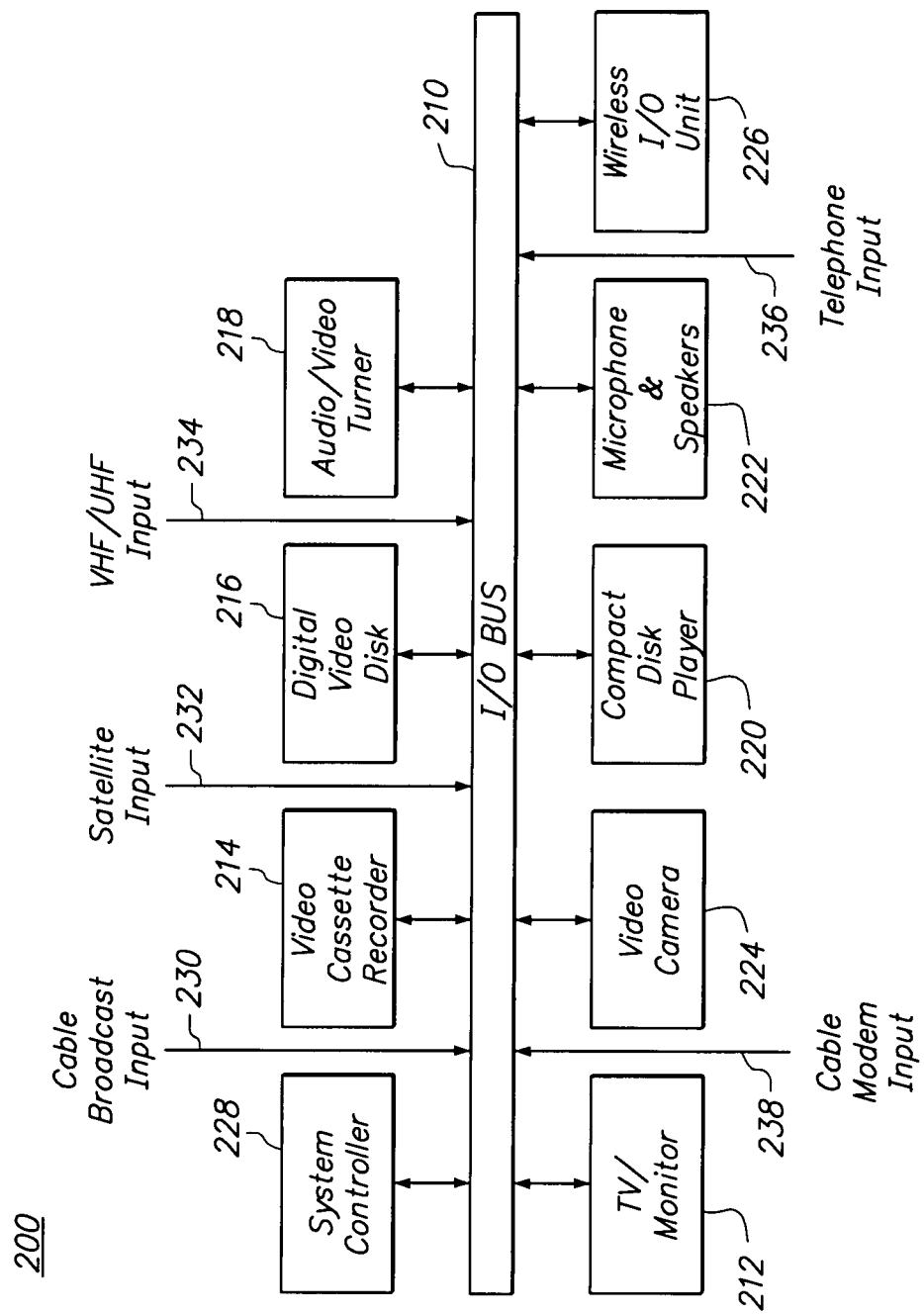
FIG. 3 depicts an exemplary media system in which exemplary embodiments of the present invention (both display and remote control) can be implemented.

The entertainment system 200 also includes a system controller 228. According to one exemplary embodiment of the present invention, the system controller 228 operates to store and display entertainment system data available from a plurality of entertainment system data sources and to control a wide variety of features associated with each of the system components. As shown in FIG. 3, system controller 228 is coupled, either directly or indirectly, to each of the system components, as necessary, through I/O bus 210. In one exemplary embodiment, in addition to or in place of I/O bus 210, system controller 228 is configured with a wireless communication transmitter (or transceiver), which is capable of communicating with the system components via IR signals or RF signals. Regardless of the control medium, the system controller 228 is configured to control the media components of the media system 200 via a graphical user interface described below.

As further illustrated in FIG. 3, media system 200 may be configured to receive media items from various media sources and service providers. In this exemplary embodiment, media system 200 receives media input from and, optionally, sends information to, any or all of the following sources: cable broadcast 230, satellite broadcast 232 (e.g., via a satellite dish), very high frequency (VHF) or ultra high frequency (UHF) radio frequency communication of the broadcast television networks 234 (e.g., via an aerial antenna), telephone network 236 and cable modem 238 (or another source of Internet content). Those skilled in the art will appreciate that the media components and media sources illustrated and described with respect to FIG. 3 are purely exemplary and that media system 200 may include more or fewer of both. For example, other types of inputs to the system include AM/FM radio and satellite radio.

Figure 4:
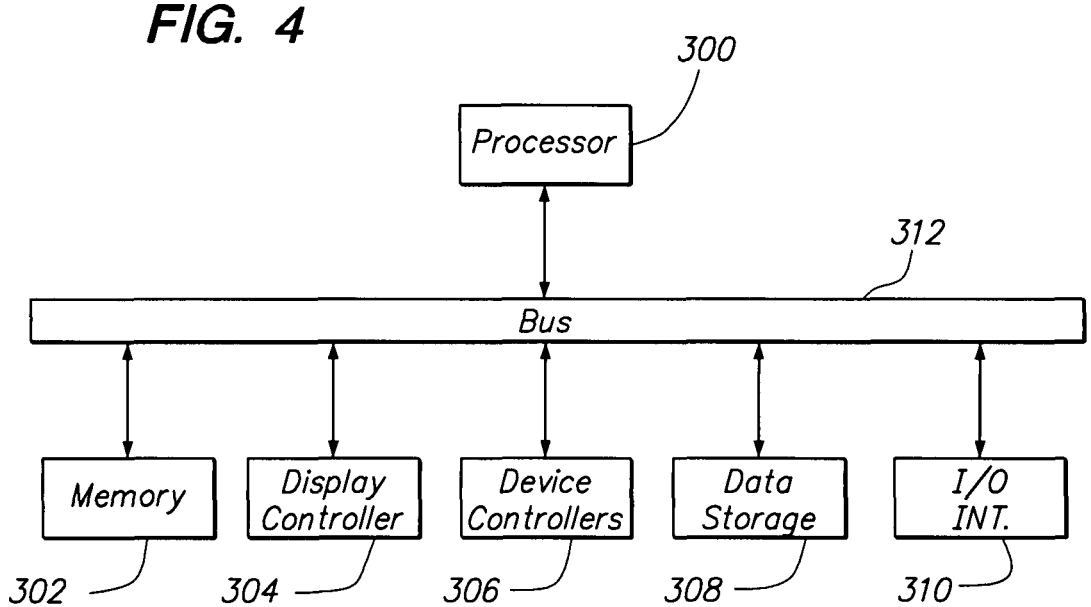
FIG. 4 shows a system controller of FIG. 3 in more detail.

FIG. 4 is a block diagram illustrating an embodiment of an exemplary system controller 228 according to the present invention. System controller 228 can, for example, be implemented as a set-top box and includes, for example, a processor 300, memory 302, a display controller 304, other device controllers (e.g., associated with the other components of system 200), one or more data storage devices 308 and an I/O interface 310. These components communicate with the processor 300 via bus 312. Those skilled in the art will appreciate that processor 300 can be implemented using one or more processing units. Memory device(s) 302 may include, for example, DRAM or SRAM, ROM, some of which may be designated as cache memory, which store software to be run by processor 300 and/or data usable by such programs, including software and/or data associated with the graphical user interfaces described below. Display controller 304 is operable by processor 300 to control the display of monitor 212 to, among other things, display GUI screens and objects as described below. Zoomable GUIs according to exemplary embodiments of the present invention can provide resolution independent zooming, so that monitor 212 can provide displays at any resolution. Device controllers 306 provide an interface between the other components of the media system 200 and the processor 300. Data storage 308 may include one or more of a hard disk drive, a floppy disk drive, a CD-ROM device, or other mass storage device. Input/output interface 310 may include one or more of a plurality of interfaces including, for example, a keyboard interface, an RF interface, an IR interface and a microphone/speech interface. According to one exemplary embodiment of the present invention, I/O interface 310 will include an interface for receiving location information associated with movement of a wireless pointing device.

Generation and control of a graphical user interface according to exemplary embodiments of the present invention to display media item selection information is performed by the system controller 228 in response to the processor 300 executing sequences of instructions contained in the memory 302. Such instructions may be read into the memory 302 from other computer-readable mediums such as data storage device(s) 308 or from a computer connected externally to the media system 200. Execution of the sequences of instructions contained in the memory 302 causes the processor to generate graphical user interface objects and controls, among other things, on monitor 212. In alternative embodiments, hardwire circuitry may be used in place of or in combination with software instructions to implement the present invention. As mentioned in the Background section, conventional interface frameworks associated with the television industry are severely limited in their ability to provide users with a simple and yet comprehensive selection experience. Accordingly, control frameworks described herein overcome these limitations and are, therefore, intended for use with televisions, albeit not exclusively. It is also anticipated that the revolutionary control frameworks, graphical user interfaces and/or various algorithms described herein will find applicability to interfaces which may be used with computers and other non-television devices. In order to distinguish these various applications of exemplary embodiments of the present invention, the terms "television" and "TV" are used in this specification to refer to a subset of display devices, whereas the terms "GUI", "GUI screen", "display" and "display screen" are intended to be generic and refer to television displays, computer displays and any other display device. More specifically, the terms "television" and "TV" are intended to refer to the subset of display devices which are able to display television signals (e.g., NTSC signals, PAL signals or SECAM signals) without using an adapter to translate television signals into another format (e.g., computer video formats). In addition, the terms "television" and "TV" refer to a subset of display devices that are generally viewed from a distance of several feet or more (e.g., sofa to a family room TV) whereas computer displays are generally viewed close-up (e.g., chair to a desktop monitor).

Figure 5:
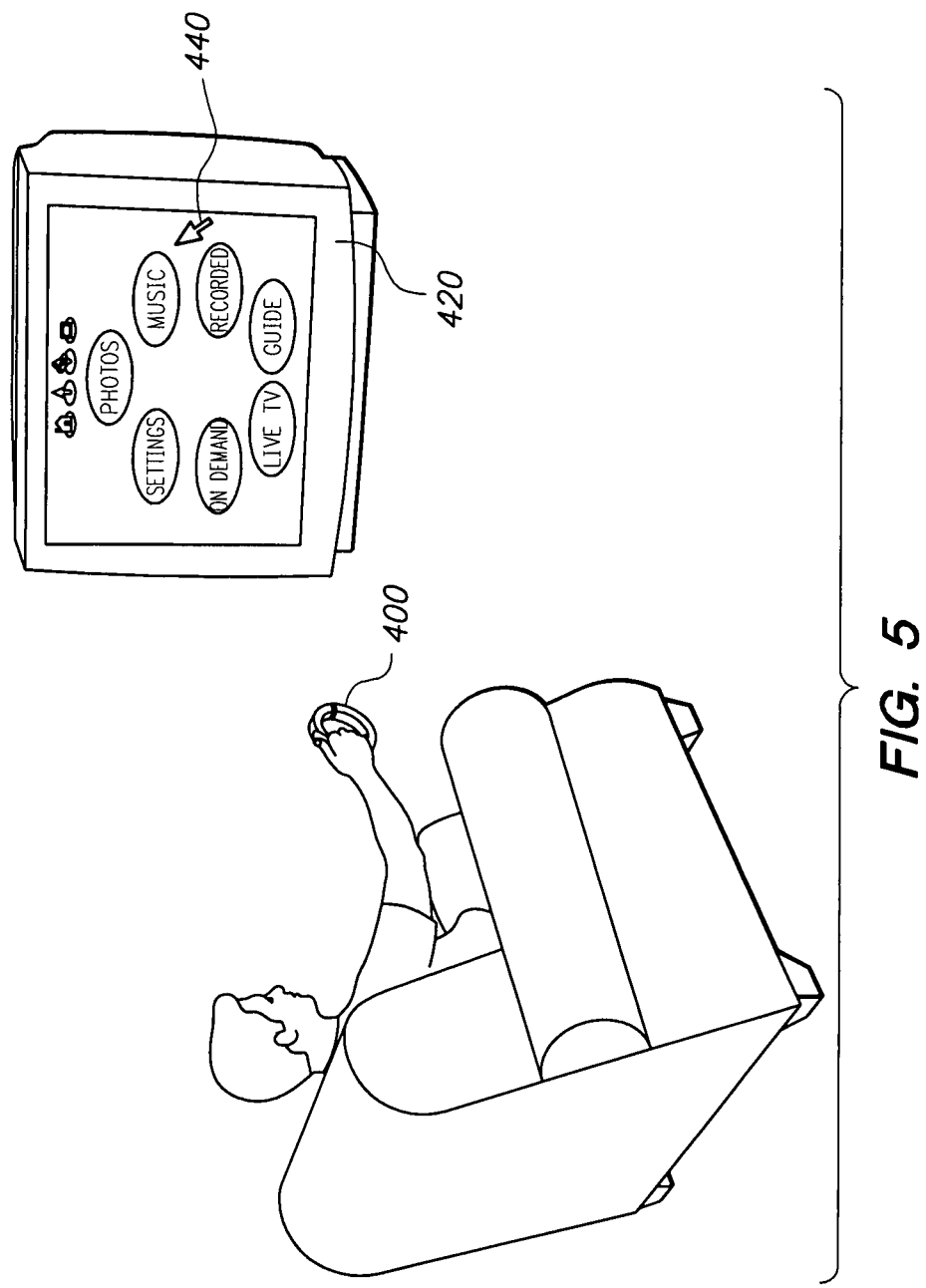
FIG. 5 illustrates a user employing a 3D pointing device to provide input to a user interface on a television according to an exemplary embodiment of the present invention.

As one purely illustrative example of an environment in which zoomable user interfaces according to exemplary embodiments of the present invention can be deployed, consider the environment illustrated in FIG. 5. Therein, a person may be sitting (or standing) in front of a television 420, holding a 3D pointing device 400 in her or his hand. The 3D pointing device 400 can be used to provide inputs, e.g., commands, to a user interface displayed on the television 420, to select various media items for display. The 3D pointing device 400 may be used in an unsupported manner, i.e., it may spend at least some period of time being moved in the air by a user relative to the television 420 to point at various user interface objects displayed on the television.

According to some exemplary embodiments of the present invention, 3D pointing device 400 can have a ring-shaped housing or body as shown in FIG. 5 and described in more detail in U.S. patent application Ser. No. 11/480,662, entitled "3D Pointing Devices", filed on Jul. 3, 2006, the disclosure of which is incorporated here by reference. The 3D pointing device 400 may or may not have one or more buttons, scroll wheels, or other user-actuable control elements for providing user input. Regardless of the number and type of user-actuable control elements which are provided on 3D pointing device 400, movement of the device 400 (e.g., in three or more dimensions) is sensed and provided as user input. For example, as the 3D pointing device 400 moves between different positions, that movement is detected by one or more sensors (not shown) within 3D pointing device 400 and transmitted to the television 420 (or associated system component, e.g., a set-top box (not shown)). Movement of the 3D pointing device 400 can, for example, be translated into movement of a cursor 440 displayed on the television 420 and which is used to interact with a zoomable user interface as described below.

Having described exemplary media systems which can be used to implement control frameworks including zoomable graphical interfaces according to the present invention, several examples of such interfaces will now be described. According to exemplary embodiments of the present invention, a user interface displays selectable items which can be grouped by category. A user points a remote unit at the category or categories of interest and depresses the selection button to zoom in or the "back" button to zoom back. Each zoom in, or zoom back, action by a user results in a change in the magnification level and/or context of the selectable items rendered by the user interface on the screen. More specifically, according to one exemplary embodiment, zooming provides for the progressive scaling and display of an object (or a portion thereof) or group of objects that gives the visual impression of movement of all or part of a display group toward or away from an observer. According to exemplary embodiments, each change in magnification level can be consistent, i.e., the changes in magnification level are provided in predetermined steps. Exemplary embodiments of the present invention also provide for user interfaces which incorporate several visual techniques to achieve scaling to the very large. These techniques involve a combination of building blocks and transition techniques that achieve both scalability and ease-of-use, in particular techniques which adapt the user interface to enhance a user's visual memory for rapid revisiting of user interface objects by providing a spatial relationship between the various user interface objects.

The user interface is largely a visual experience. In such an environment exemplary embodiments of the present invention make use of the capability of the user to remember the location of objects within the visual environment. This is achieved by providing a stable, dependable location for user interface selection items. Each object has a location in the zoomable layout. Once the user has found an object of interest it is natural to remember which direction was taken to locate the object. If that object is of particular interest it is likely that the user will re-visit the item more than once, which will reinforce the user's memory of the path to the object. User interfaces according to exemplary embodiments of the present invention provide visual mnemonics that help the user remember the location of items of interest. Such visual mnemonics include pan and zoom animations, transition effects which generate a geographic sense of movement across the user interface's virtual surface and consistent zooming functionality, among other things which will become more apparent based on the examples described below. Of particular interest for the purposes of the present application are exemplary mechanisms described below under the heading "ZML" which provide a framework for creating such an interface including, among other things, an ability to generate, track and manipulate zoomable "paths" between user interface objects.

Figure 6:
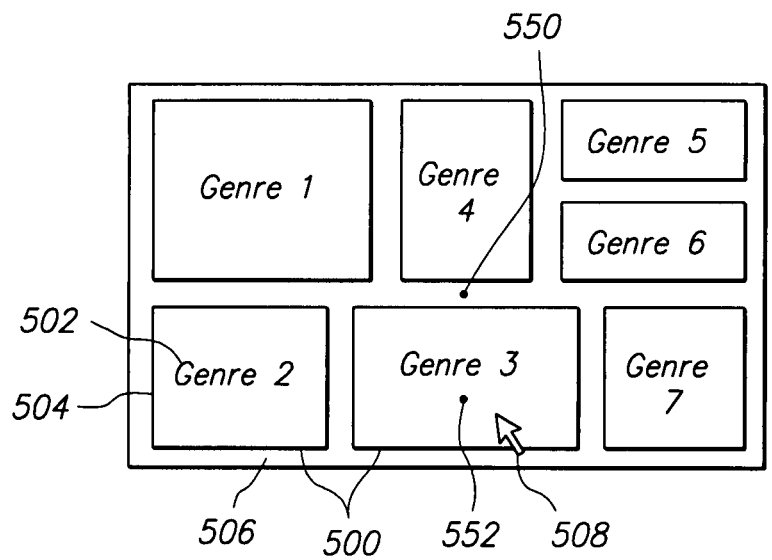
FIGS. 6-9 depict a graphical user interface for a media system according to an exemplary embodiment of the present invention.

Referring first to FIGS. 6-9, an exemplary control framework including a zoomable graphical user interface according to an exemplary embodiment of the present invention is described for use in displaying and selecting musical media items. FIG. 6 portrays the zoomable GUI at its most zoomed out state. Therein, the interface displays a set of shapes 500. Displayed within each shape 500 are text 502 and/or a picture 504 that describe the group of media item selections accessible via that portion of the GUI. As shown in FIG. 6, the shapes 500 are rectangles, and text 502 and/or picture 504 describe the genre of the media. However, those skilled in the art will appreciate that this first viewed GUI grouping could represent other aspects of the media selections available to the user e.g., artist, year produced, area of residence for the artist, length of the item, or any other characteristic of the selection. Also, the shapes used to outline the various groupings in the GUI need not be rectangles. Shrunk down versions of album covers and other icons could be used to provide further navigational hints to the user in lieu of or in addition to text 502 and/or picture 504 within the shape groupings 500. A background portion of the GUI 506 can be displayed as a solid color or be a part of a picture such as a map to aid the user in remembering the spatial location of genres so as to make future uses of the interface require less reading. The selection pointer (cursor) 508 follows the movements of an input device and indicates the location to zoom in on when the user presses the button on the device (not shown in FIG. 6).

According to one exemplary embodiment of the present invention, the input device can be a free space pointing device, e.g., the free space pointing device described in U.S. patent application Ser. No. 11/119,683, filed on May 2, 2005, entitled "Free Space Pointing Devices and Methods", the disclosure of which is incorporated here by reference and which is hereafter referred to as the "'683 application", coupled with a graphical user interface that supports the point, click, scroll, hover and zoom building blocks which are described in more detail below. One feature of this exemplary input device that is beneficial for use in conjunction with the present invention is that it can be implemented with only two buttons and a scroll wheel, i.e., three input actuation objects. One of the buttons can be configured as a ZOOM IN (select) button and one can be configured as a ZOOM OUT (back) button. Compared with the conventional remote control units, e.g., that shown in FIG. 1, the present invention simplifies this aspect of the GUI by greatly reducing the number of buttons, etc., that a user is confronted with in making his or her media item selection. An additional preferred, but not required, feature of input devices according to exemplary embodiments of the present invention is that they provide "3D pointing" capability for the user. The phrase "3D pointing" is used in this specification to refer to the ability of a user to freely move the input device in three (or more) dimensions in the air in front of the display screen and the corresponding ability of the user interface to translate those motions directly into movement of a cursor on the screen. Thus "3D pointing" differs from conventional computer mouse pointing techniques which use a surface other than the display screen, e.g., a desk surface or mousepad, as a proxy surface from which relative movement of the mouse is translated into cursor movement on the computer display screen. Use of 3D pointing in control frameworks according to exemplary embodiments of the present invention further simplifies the user's selection experience, while at the same time providing an opportunity to introduce gestures as distinguishable inputs to the interface. A gesture can be considered as a recognizable pattern of movement over time which pattern can be translated into a GUI command, e.g., a function of movement in the x, y, z, yaw, pitch and roll dimensions or any subcombination thereof. Those skilled in the art will appreciate, however that any suitable input device can be used in conjunction with zoomable GUIs according to the present invention. Other examples of suitable input devices include, but are not limited to, trackballs, touchpads, conventional TV remote control devices, speech input, any devices which can communicate/translate a user's gestures into GUI commands, or any combination thereof. It is intended that each aspect of the GUI functionality described herein can be actuated in frameworks according to the present invention using at least one of a gesture and a speech command. Alternate implementations include using cursor and/or other remote control keys or even speech input to identify items for selection.

Figure 7:
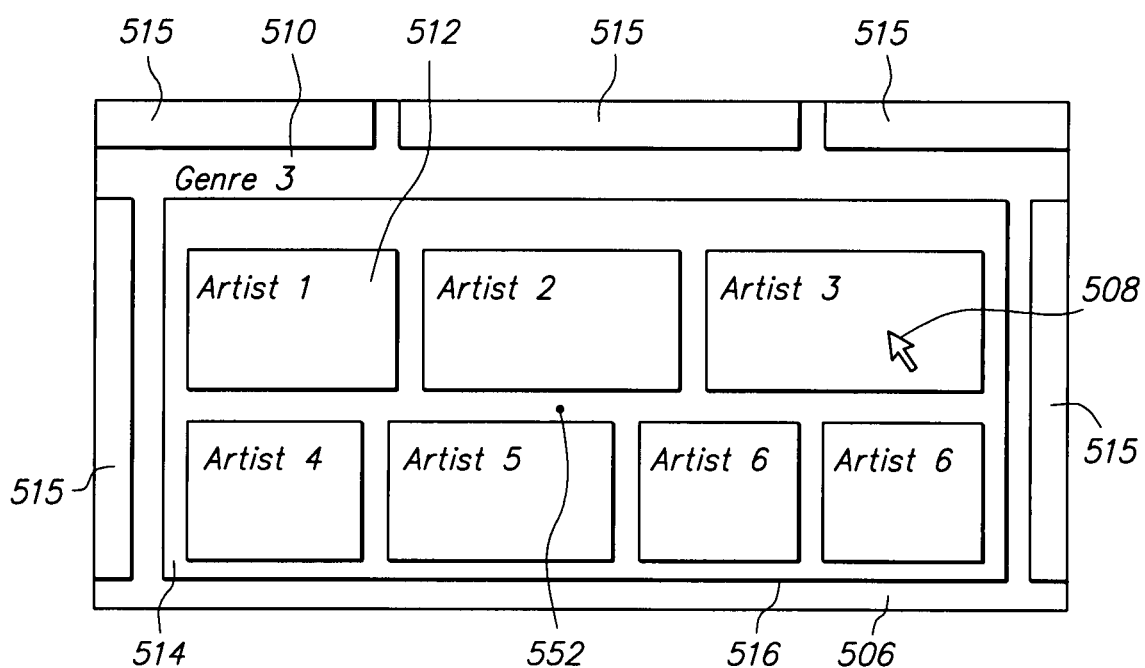

FIG. 7 shows a zoomed in view of Genre 3 that would be displayed if the user selects Genre 3 from FIG. 5, e.g., by moving the cursor 508 over the area encompassed by the rectangle surrounding Genre 3 on display 212 and depressing a button on the input device. The interface can animate the zoom from FIG. 6 to FIG. 7 so that it is clear to the user that a zoom occurred. An example of such an animated zoom/transition effect is described below, however the zooming transition effect can be performed by progressive scaling and displaying of at least some of the UI objects displayed on the current UI view to provide a visual impression of movement of those UI objects toward (or away from) an observer. Once the shape 516 that contains Genre 3 occupies most of the screen on display 212, the interface reveals the artists that have albums in the genre. In this example, seven different artists and/or their works are displayed. The unselected genres 515 that were adjacent to Genre 3 in the zoomed out view of FIG. 6 are still adjacent to Genre 3 in the zoomed in view, but are clipped by the edge of the display 212. These unselected genres can be quickly navigated to by selection of them with selection pointer 508. It will be appreciated, however, that other exemplary embodiments of the present invention can omit clipping neighboring objects and, instead, present only the unclipped selections. Each of the artist groups, e.g., group 512, can contain images of shrunk album covers, a picture of the artist or customizable artwork by the user in the case that the category contains playlists created by the user.

Figure 8:
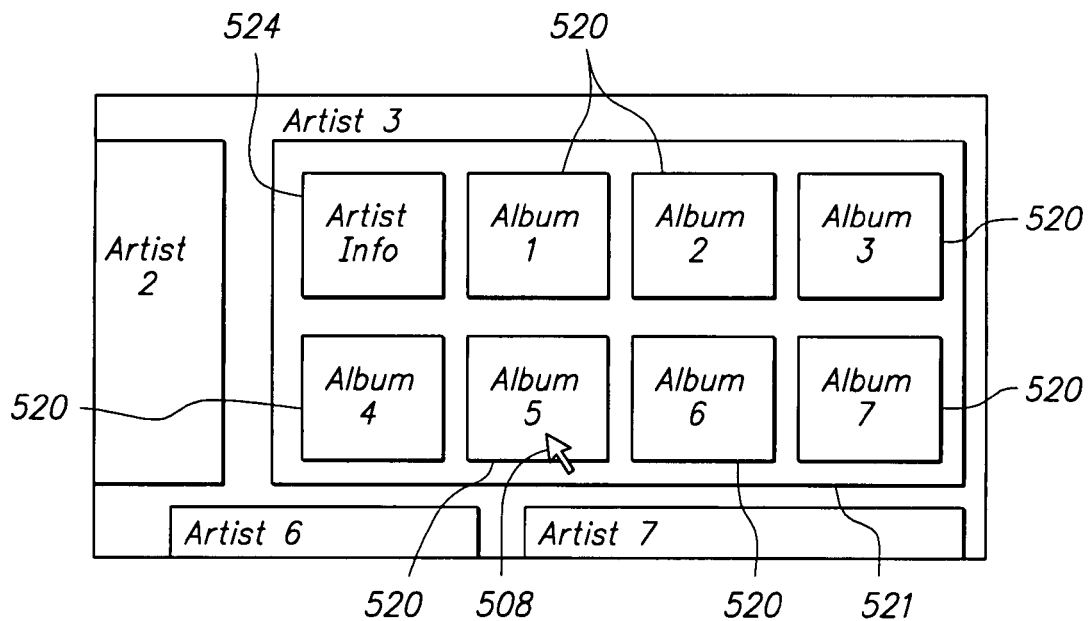

A user may then select one of the artist groups for further review and/or selection. FIG. 8 shows a further zoomed in view in response to a user selection of Artist 3 via positioning of cursor 508 and actuation of the input device, in which images of album covers 520 come into view. As with the transition from the GUI screen of FIG. 6 and FIG. 7, the unselected, adjacent artists (artists #2, 6 and 7 in this example) are shown towards the side of the zoomed in display, and the user can click on these with selection pointer 508 to pan to these artist views. In this portion of the interface, in addition to the images 520 of album covers, artist information 524 can be displayed as an item in the artist group. This information may contain, for example, the artist's picture, biography, trivia, discography, influences, links to web sites and other pertinent data. Each of the album images 520 can contain a picture of the album cover and, optionally, textual data. In the case that the album image 520 includes a user created playlist, the graphical user interface can display a picture which is selected automatically by the interface or preselected by the user.

Figure 9:
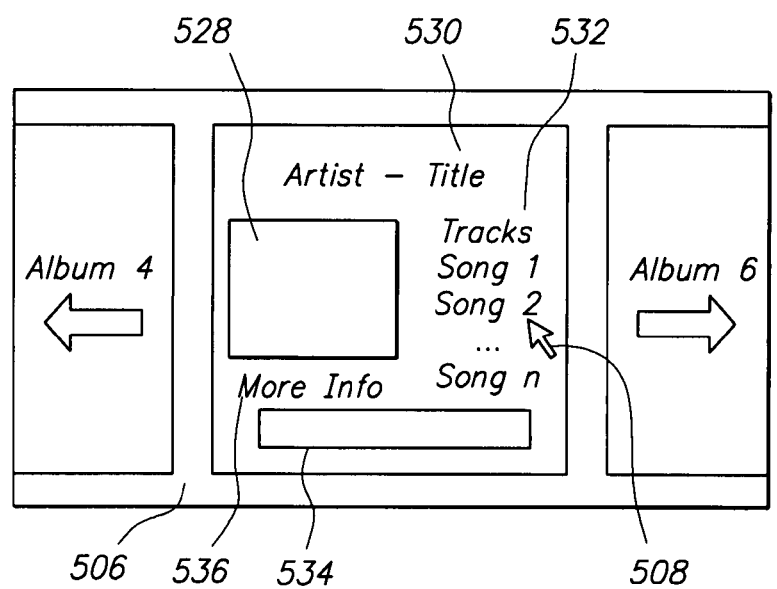

Finally, when the user selects an album cover image 520 from within the group 521, the interface zooms into the album cover as shown in FIG. 9. As the zoom progresses, the album cover can fade or morph into a view that contains items such as the artist and title of the album 530, a list of tracks 532, further information about the album 536, a smaller version of the album cover 528, and controls 534 to play back the content, modify the categorization, link to the artists web page, or find any other information about the selection. Neighboring albums 538 are shown that can be selected using selection pointer 508 to cause the interface to bring them into view. As mentioned above, alternative embodiments of the present invention can, for example, zoom in to only display the selected object, e.g., album 5, and omit the clipped portions of the unselected objects, e.g., albums 4 and 6. This final zoom provides an example of semantic zooming, wherein certain GUI elements are revealed that were not previously visible at the previous zoom level. Various techniques for performing semantic zooming according to exemplary embodiments of the present invention are provided below.

As illustrated in the FIGS. 6-9 and the description, this exemplary embodiment of a graphical user interface provides for navigation of a music collection. Interfaces according to the present invention can also be used for video collections such as for DVDs, VHS tapes, other recorded media, video-on-demand, video segments and home movies. Other audio uses include navigation of radio shows, instructional tapes, historical archives, and sound clip collections. Print or text media such as news stories and electronic books can also be organized and accessed using this invention.

As will be apparent to those skilled in the art from the foregoing description, zoomable graphical user interfaces according to the present invention provide users with the capability to browse a large (or small) number of media items rapidly and easily. This capability is attributable to many characteristics of interfaces according to exemplary embodiments of the present invention including, but not limited to: (1) the use of images as all or part of the selection information for a particular media item, (2) the use of zooming to rapidly provide as much or as little information as a user needs to make a selection and (3) the use of several GUI techniques which combine to give the user the sense that the entire interface resides on a single plane, such that navigation of the GUI can be accomplished, and remembered, by way of the user's sense of direction. This latter aspect of GUIs according to the present invention can be accomplished by, among other things, linking the various GUI screens together "geographically" by maintaining as much GUI object continuity from one GUI screen to the next, e.g., by displaying edges of neighboring, unselected objects around the border of the current GUI screen. Alternatively, if a cleaner view is desired, and other GUI techniques provide sufficient geographic feedback, then the clipped objects can be omitted. As used in this text, the phrase "GUI screen" refers to a set of GUI objects rendered on one or more display units at the same time. A GUI screen may be rendered on the same display which outputs media items, or it may be rendered on a different display. The display can be a TV display, computer monitor or any other suitable GUI output device.

Another GUI effect which enhances the user's sense of GUI screen connectivity is the panning animation effect which can be invoked when a zoom is performed or when the user selects an adjacent object at the same zoom level as the currently selected object. For example, panning can be performed by progressive translation and display of at least some of the user interface objects which are currently displayed in a user interface view in such a way as to provide the visual impression of lateral movement of those user interface objects to an observer. Returning to the example of FIG. 6, as the user is initially viewing this GUI screen, his or her point-of-view is centered about point 550. However, when he or she selects Genre 3 for zooming in, his or her point-of-view will shift to point 552. According to exemplary embodiments of the present invention, the zoom in process is animated to convey the shifting the POV center from point 550 to 552. This panning animation can be provided for every GUI change, e.g., from a change in zoom level or a change from one object to another object on the same GUI zoom level. Thus if, for example, a user situated in the GUI screen of FIG. 7 selected the leftmost unselected genre 515 (Genre 2), a panning animation would occur which would give the user the visual impression of "moving" left or west. Exemplary embodiments of the present invention employ such techniques to provide a consistent sense of directional movement between GUI screens enables users to more rapidly navigate the GUI, both between zoom levels and between media items at the same zoom level.

Various data structures and algorithms can be used to implement zoomable GUIs according to the present invention. For example, data structures and algorithms for panning and zooming in an image browser which displays photographs have been described, for example, in the article entitled "Quantum Treemaps and Bubblemaps for a Zoomable Image Browser" by Benjamin B. Bederson, *UIST* 2001, *ACM Symposium on User Interface Software and Technology, CHI Letters,* 3(2), pp. 71-80, the disclosure of which is incorporated here by reference. However, in order to provide a GUI for media selection which can, at a high level, switch between numerous applications and, at a lower level, provide user controls associated with selected images to perform various media selection functions, additional data structures, algorithms and programming language extensions are needed.

Zoomable GUIs can be conceptualized as supporting panning and zooming around a scene of user interface components in the view port of a display device. To accomplish this effect, zoomable GUIs according to exemplary embodiments of the present invention can be implemented using scene graph data structures. Each node in the scene graph represents some part of a user interface component, such as a button or a text label or a group of interface components. Children of a node represent graphical elements (lines, text, images, etc.) internal to that node. For example, an application can be represented in a scene graph as a node with children for the various graphical elements in its interface. Two special types of nodes are referred to herein as cameras and layers. Cameras are nodes that provide a view port into another part of the scene graph by looking at layer nodes. Under these layer nodes user interface elements can be found. Control logic for a zoomable interface programmatically adjusts a cameras view transform to provide the effect of panning and zooming.

Figure 10:
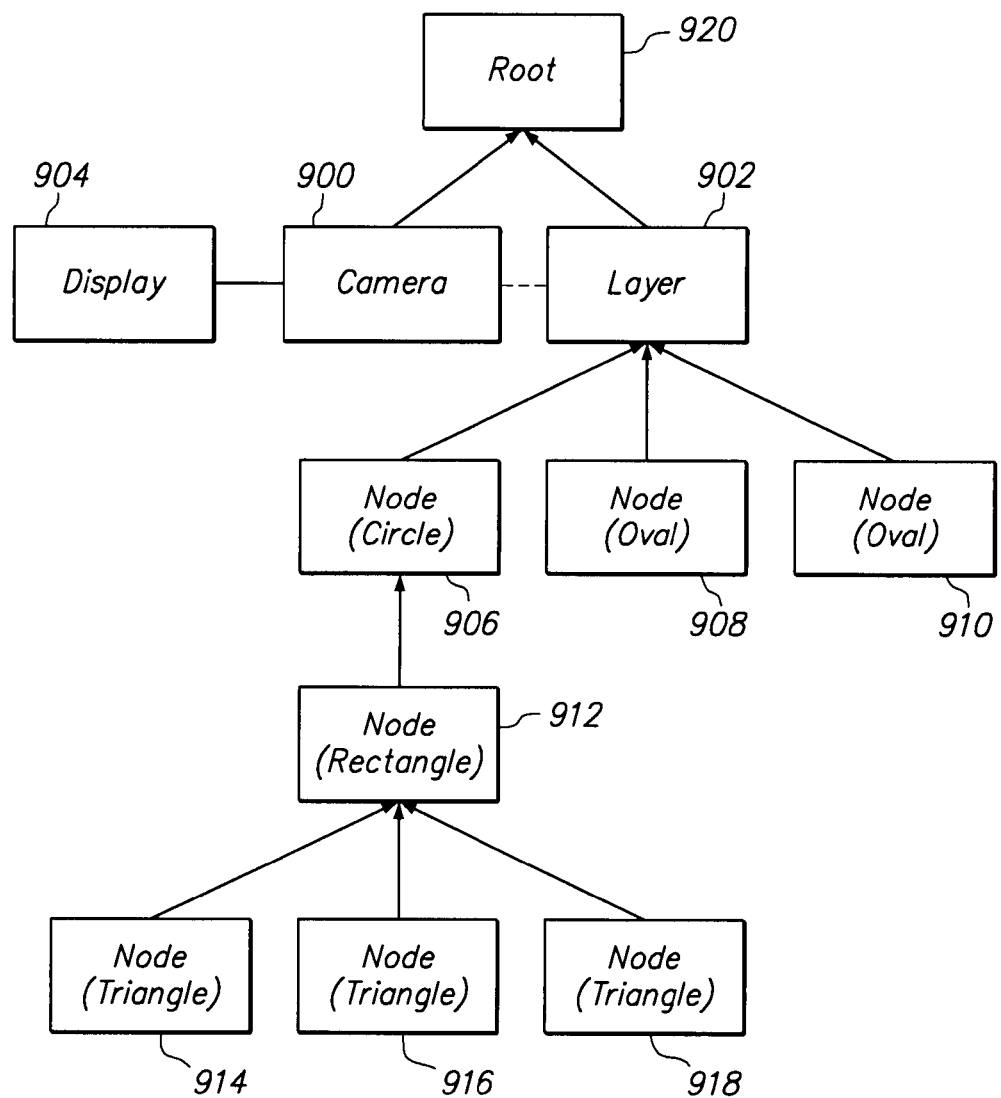
FIG. 10 illustrates an exemplary data structure according to an exemplary embodiment of the present invention.
Figure 11A:
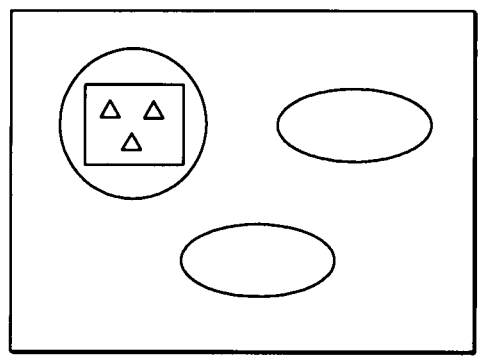
FIGS. 11(a) and 11(b) illustrate a zoomed out and a zoomed in version of a portion of an exemplary GUI created using the data structure of FIG. 10 according to an exemplary embodiment of the present invention.
Figure 11B:
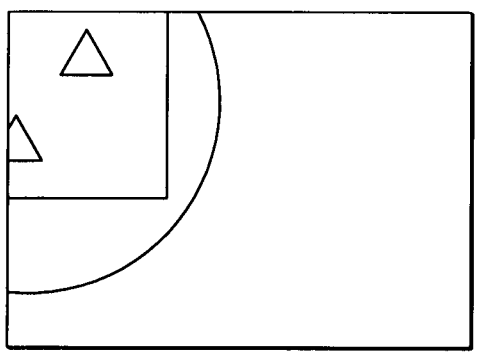

FIG. 10 shows a scene graph that contains basic zoomable interface elements which can be used to implement exemplary embodiments of the present invention, specifically it contains one camera node 900 and one layer node 902. The dotted line between the camera node 900 and layer node 902 indicates that the camera node 900 has been configured to render the children of the layer node 902 in the camera's view port. The attached display device 904 lets the user see the camera's view port. The layer node 902 has three children nodes 904 that draw a circle and a pair of ovals. The scene graph further specifies that a rectangle is drawn within the circle and three triangles within the rectangle by way of nodes 912-918. The scene graph is tied into other scene graphs in the data structure by root node 920. Each node 906-918 has the capability of scaling and positioning itself relative to its parent by using a local coordinate transformation matrix. Exemplary programming language extensions which provide one mechanism for performing these functions are described below under the heading "ZML". FIGS. 11(*a*) and 11(*b*) illustrate how the scene graph appears when rendered through the camera at a first, zoomed out level of magnification and a second, zoomed in level of magnification, respectively.

Rendering the scene graph can be accomplished as follows. Whenever the display 904 needs to be updated, e.g., when the user triggers a zoom-in from the view of FIG. 11(*a*) to the view of FIG. 11(*b*), a repaint event calls the camera node 900 attached to the display 904 to render itself. This, in turn, causes the camera node 900 to notify the layer node 902 to render the area within the camera's view port. The layer node 902 renders itself by notifying its children to render themselves, and so on. The current transformation matrix and a bounding rectangle for the region to update is passed at each step and optionally modified to inform each node of the proper scale and offset that they should use for rendering. Since the scene graphs of applications operating within zoomable GUIs according to the present invention may contain thousands of nodes, each node can check the transformation matrix and the area to be updated to ensure that their drawing operations will indeed be seen by the user. Although the foregoing example, describes a scene graph including one camera node and one layer node, it will be appreciated that exemplary embodiments of the present invention can embed multiple cameras and layers. These embedded cameras can provide user interface elements such as small zoomed out maps that indicate the user's current view location in the whole zoomable interface, and also allow user interface components to be independently zoomable and pannable.

When using a zoomable interface to coordinate the operation of multiple applications, e.g., like the exemplary movie browser described below with respect to FIGS. 15-19, the memory and resource requirements for each application may exceed the total memory available in the media system. This suggests that applications unload some or all of their code and data when the user is no longer viewing them. However, in zoomable GUIs according to the present invention it can be desirable to provide the appearance that some or all of the applications appear active to the user at all times. To satisfy these two competing objectives, the applications which are "off-screen" from the user's point of view can be put into a temporarily suspended state. To achieve this behavior in zoomable GUIs according to exemplary embodiments of the present invention, events are sent to applications to indicate when they enter and exit a view port. One way to implement such events is to add logic to the code that renders a component so that it detects when the user enters a view port. However, this implies that the notification logic gets invoked at every rendering event and, more importantly, that it cannot easily detect when the user has navigated the view port away from the component. Another method for sending events to applications is to incorporate the notification logic into the GUI navigation elements (such as hyperlinks and buttons), so that they send notifications to the component when they change the view port of a camera to include the component of interest. However, this requires the programmer to vigilantly add notification code to all possible navigation UI elements.

According to one exemplary embodiment, a computationally efficient node watcher algorithm can be used to notify applications regarding when GUI components and/or applications enter and exit the view of a camera. At a high level, the node watcher algorithm has three main processing stages: (1) initialization, (2) view port change assessment and (3) scene graph change assessment. The initialization stage computes node quantities used by the view port change assessment stage and initializes appropriate data structures. The view port change assessment stage gets invoked when the view port changes and notifies all watched nodes that entered or exited the view port. Finally, the scene graph change assessment stage updates computations made at the initialization stage that have become invalid due to changes in the scene graph. For example, if an ancestor node of the watched node changes location in the scene graph, computations made at initialization may need to be recomputed.

Of these stages, view port change assessment drives the rest of the node watcher algorithm. To delineate when a node enters and exits a view port, the initialization step determines the bounding rectangle of the desired node and transforms it from its local coordinate system to the local coordinate system of the view port. In this way, checking node entrance does not require a sequence of coordinate transformations at each view port change. Since the parents of the node may have transform matrices, this initialization step requires traversing the scene graph from the node up to the camera. As described below, if embedded cameras are used in the scene graph data structure, then multiple bounding rectangles may be needed to accommodate the node appearing in multiple places.

Once the bounding rectangle for each watched node has been computed in the view port coordinate system, the initialization stage adds the bounding rectangle to the view port change assessment data structures. The node watcher algorithm uses a basic building block for each dimension in the scene. In zoomable interfaces according to some exemplary embodiments, this includes an x dimension, a y dimension, and a scale dimension. As described below, however, other exemplary implementations may have additional or different dimensions. The scale dimension describes the magnification level of the node in the view port and is described by the following equation:

$$s = \frac{d'}{d}$$

Where s is the scale, d is the distance from one point of the node to another in the node's local coordinates and d' is the distance from that point to the other in the view port.

Figure 12:
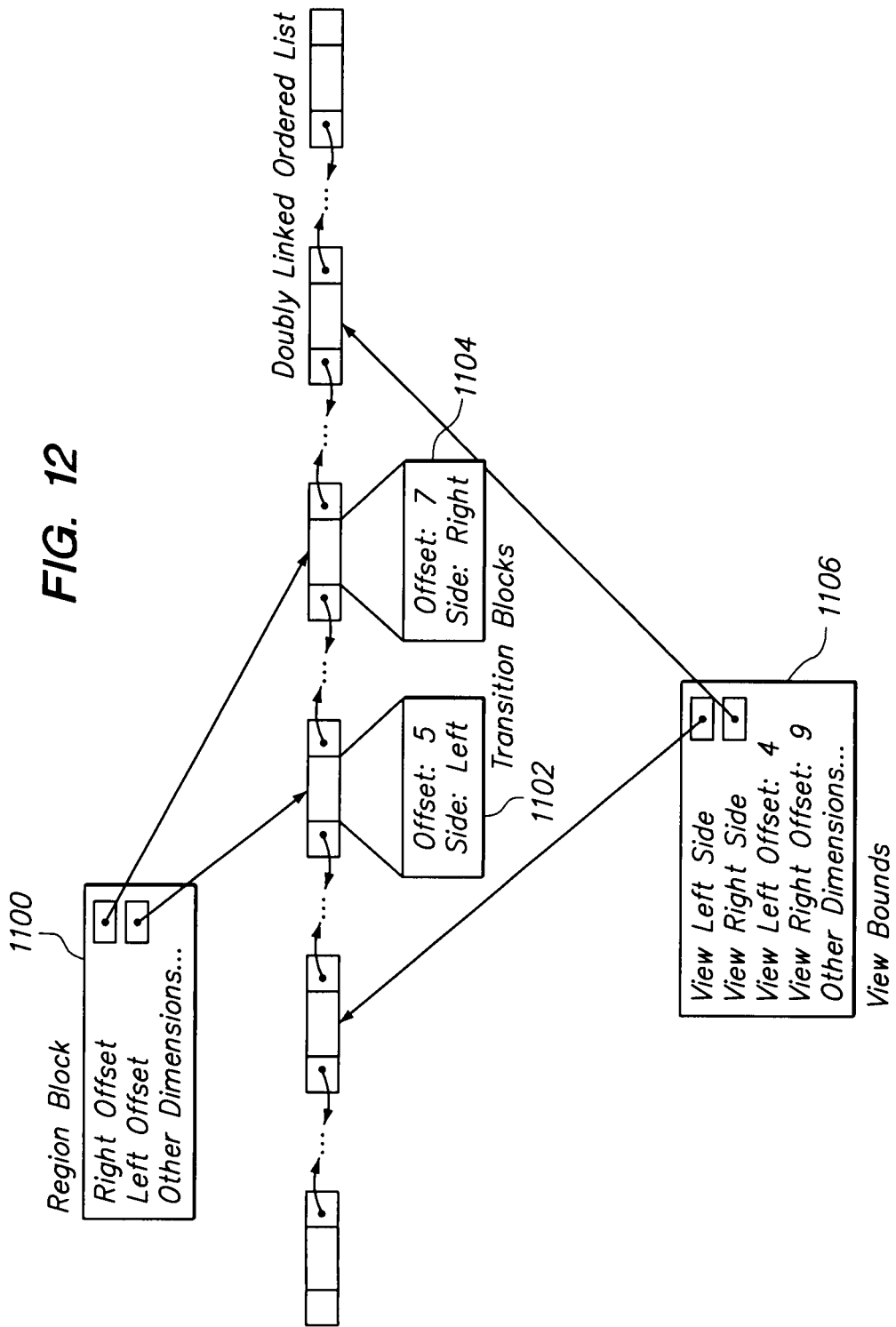
FIG. 12 depicts a doubly linked, ordered list used to generated GUI displays according to an exemplary embodiment of the present invention.

FIG. 12 shows an exemplary building block for detecting scene entrance and exit in one dimension. The following describes handling in the x dimension, but those skilled in the art will appreciate that the other dimensions can be handled in a similar manner. The Region Block 1100 contains references to the transformed bounding rectangle coordinates. This includes the left and right (top and bottom or minimum and maximum scale) offsets of the rectangle. The left and right offsets are stored in Transition Blocks 1102 and 1104, respectively, that are themselves placed in an ordered doubly linked list, such that lower numbered offsets are towards the beginning. The current view port bounds are stored in the View Bounds block 1106. Block 1106 has pointers to the Transition Blocks just beyond the left and right side of the view, e.g., the Transition Block immediately to the right of the one pointed to by View Left Side is in the view unless that latter block is pointed to by View Right Side.

When the view port changes, the following processing occurs for each dimension. First, the View Left Side and View Right Side pointers are checked to see if they need to be moved to include or exclude a Transition Block. Next, if one or both of the pointers need to be moved, they are slid over the Transition Block list to their new locations. Then, for each Transition Block passed by the View Left Side and View Right Side pointers, the node watcher algorithm executes the Transition Block notification code described below. This notification code determines if it is possible that its respective node may have entered or exited the view port. If so, that node is added to a post processing list. Finally, at the end of this processing for each dimension, each node on the post processing list is checked that its view port status actually did change (as opposed to changing and then changing back). If a change did occur, then the algorithm sends an event to the component. Note that if the view port jumps quickly to a new area of the zoomable interface that the algorithm may detect more spurious entrance and exit events.

The Transition Block notification code can be implemented as a table lookup that determines whether the node moved into or out of the view port for the dimension being checked. An exemplary table is shown below.

TABLE 1

Transition Notification Table

| Node side | View side | View Move Direction | Paitial Intersection Notification | Full Intersection Notification |
|---|---|---|---|---|
| Left | Left | Left | None | Enter |
| Left | Left | Right | None | Exit |
| Right | Left | Left | Enter | None |
| Right | Left | Right | Exit | None |
| Left | Right | Left | Exit | None |
| Left | Right | Right | Enter | None |
| Right | Right | Left | None | Exit |
| Right | Right | Right | None | Enter |

Columns 1, 2 and 3 are the inputs to the Transition Notification Table. Specifically, the node watcher algorithm addresses the table using a combination of the node side, view side and view move direction to determine whether the node being evaluated was entered, exited or not impacted. Column 1 refers to the side of the node represented by the Transition Block that was passed by the view port pointers. Column 2 refers to the side of the view port and column 3 refers to the direction that that side of the view port was moving when it passed the node's Transition Block. Either output column 4 or 5 is selected depending upon whether the node should be notified when it is partially or fully in view. For example, in some implementations it may be desirable to notify an application such as a streaming video window only after it is fully in view since loading a partially-in-view video window into the zoomable GUI may be visually disruptive.

When the output of the table indicates enter or exit, the node watcher algorithm adds the node to the post processing list. The output columns of Table 1 are populated based on the following rules. If the node intersects in all dimensions then an enter notification will be sent in the post processing step. If the node was in the view and now one or more dimensions have stopped intersecting, then an exit notification will be sent. To reduce the number of nodes in the post processing list, the Transition Block notification code checks for intersection with other dimensions before adding the node to the list. This eliminates the post processing step when only one or two dimensions out of the total number of dimensions, e.g., three or more, intersect. When a user interface object (e.g., an application) wants to be notified of its view port status in the GUI, it registers a function with the node watcher algorithm. When the application goes into or out of the view, the node watcher algorithm calls that application's registered function with a parameter that indicates the event which occurred. Alternatively, notification can be performed using message passing. In this case, each application has an event queue. The application tells the node watcher algorithm how to communicate with its event queue. For example, it could specify the queue's address. Then, when the node watcher detects a transition, it creates a data structure that contains the cause of the notification and places it in the application's queue.

In addition to using node watcher notifications for application memory management, this algorithm can also be used for other functions in zoomable GUIs according to the present invention. For example, the node watcher algorithm can be used to change application behavior based on the user's view focus, e.g., by switching the audio output focus to the currently viewed application. Another application for the node watcher algorithm is to load and unload higher resolution and composite images when the magnification level changes. This reduces the computational load on the graphics renderer by having it render fewer objects whose resolution more closely matches the display. In addition to having the node watcher algorithm watch a camera's view port, it is also useful to have it watch the navigation code that tells the view port where it will end up after an animation. This provides earlier notification of components that are going to come into view and also enables zoomable GUIS according to exemplary embodiments of the present invention to avoid sending notifications to nodes that are flown over due to panning animations.

To better understand operation of the node watcher algorithm, an example will now be described with reference to FIGS. 13(a), 13(b), 14(a) and 14(b). FIGS. 14(a) and 14(b) depict a portion of a zoomable GUI at two different magnification levels. At the lower magnification level of FIG. 13(a), three nodes are visible: a circle, a triangle and an ellipse. In FIG. 13(b), the view has been zoomed in so much that the ellipse and circle are only partially visible, and the triangle is entirely outside of the view. These nodes may, for example, represent applications or user interface components that depend on efficient event notification and, therefore, are tracked by the node watcher algorithm according to exemplary embodiments of the present invention. In this example, the bounding rectangles for each node are explicitly illustrated in FIGS. 13(a) and 13(b) although those skilled in the art will appreciate that the bounding rectangles would not typically be displayed on the GUI. Each side of each of the bounding rectangles has been labeled in FIGS. 13(a) and 13(b), and these labels will be used to show the correspondence between the bounding rectangle sides and the transition block data structure which were described above.

Figure 13A:
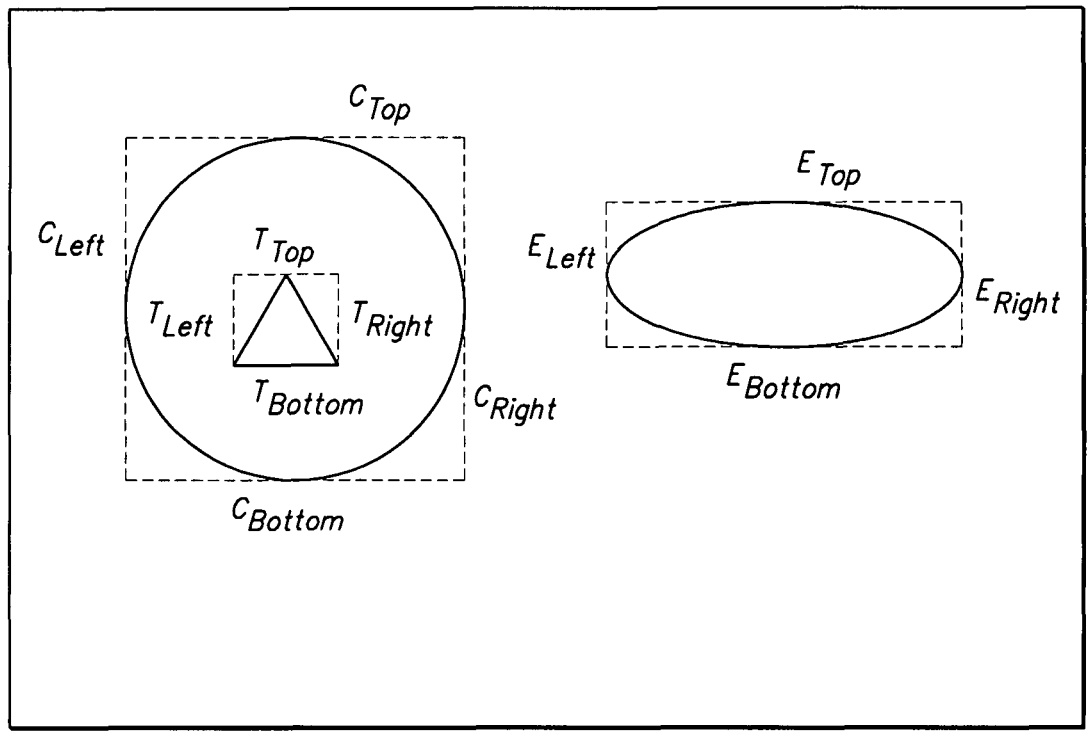
FIGS. 13(a) and 13(b) show a zoomed out and a zoomed in version of a portion of another exemplary GUI used to illustrate operation of a node watching algorithm according to an exemplary embodiment of the present invention.
Figure 13B:
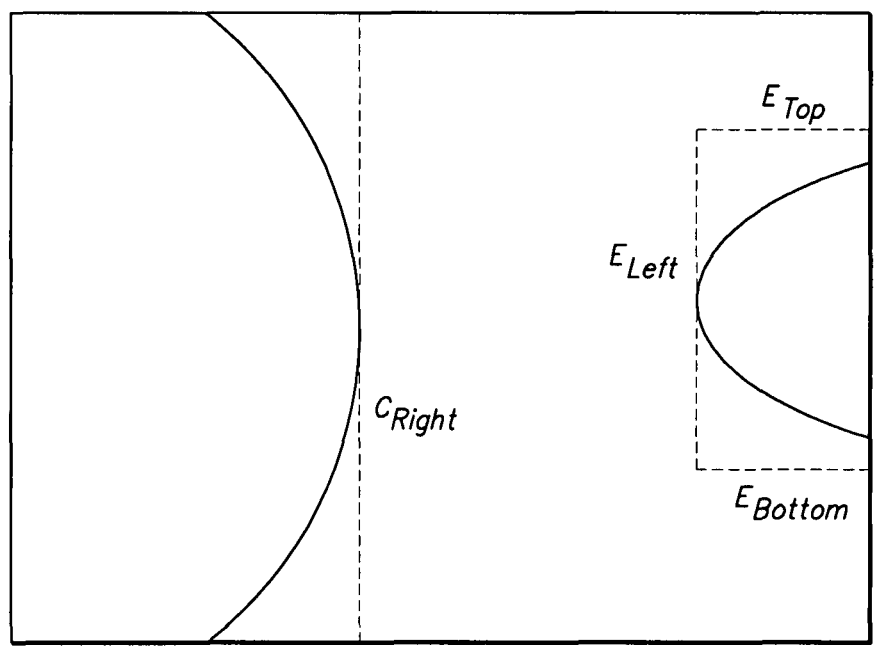
Figure 14A:
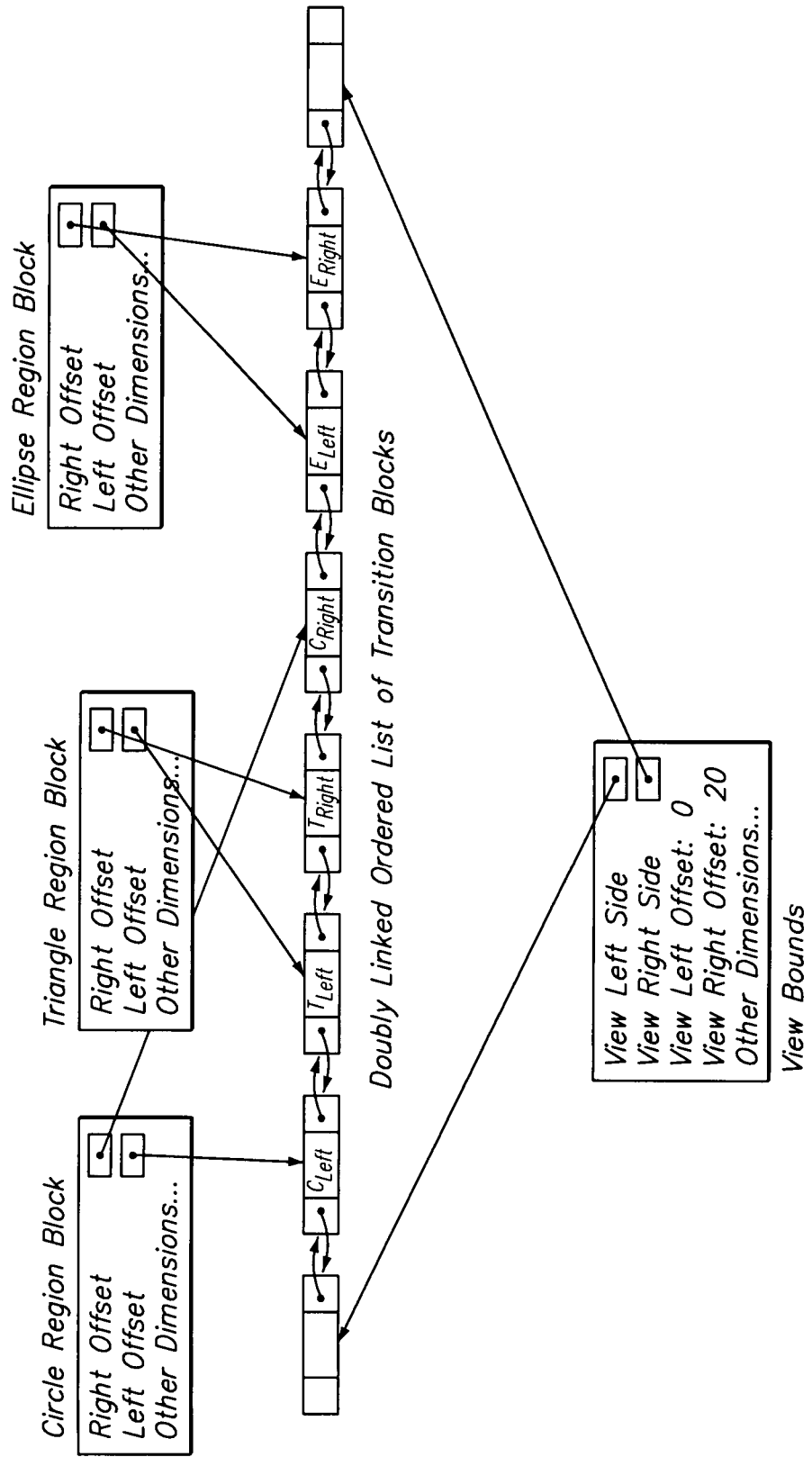
FIGS. 14(a) and 14(b) depict exemplary data structures used to illustrate operation of the node watching algorithm as it the GUI transitions from the view of FIG. 13(a) to the view of FIG. 13(b) according to an exemplary embodiment of the present invention.
Figure 14B:
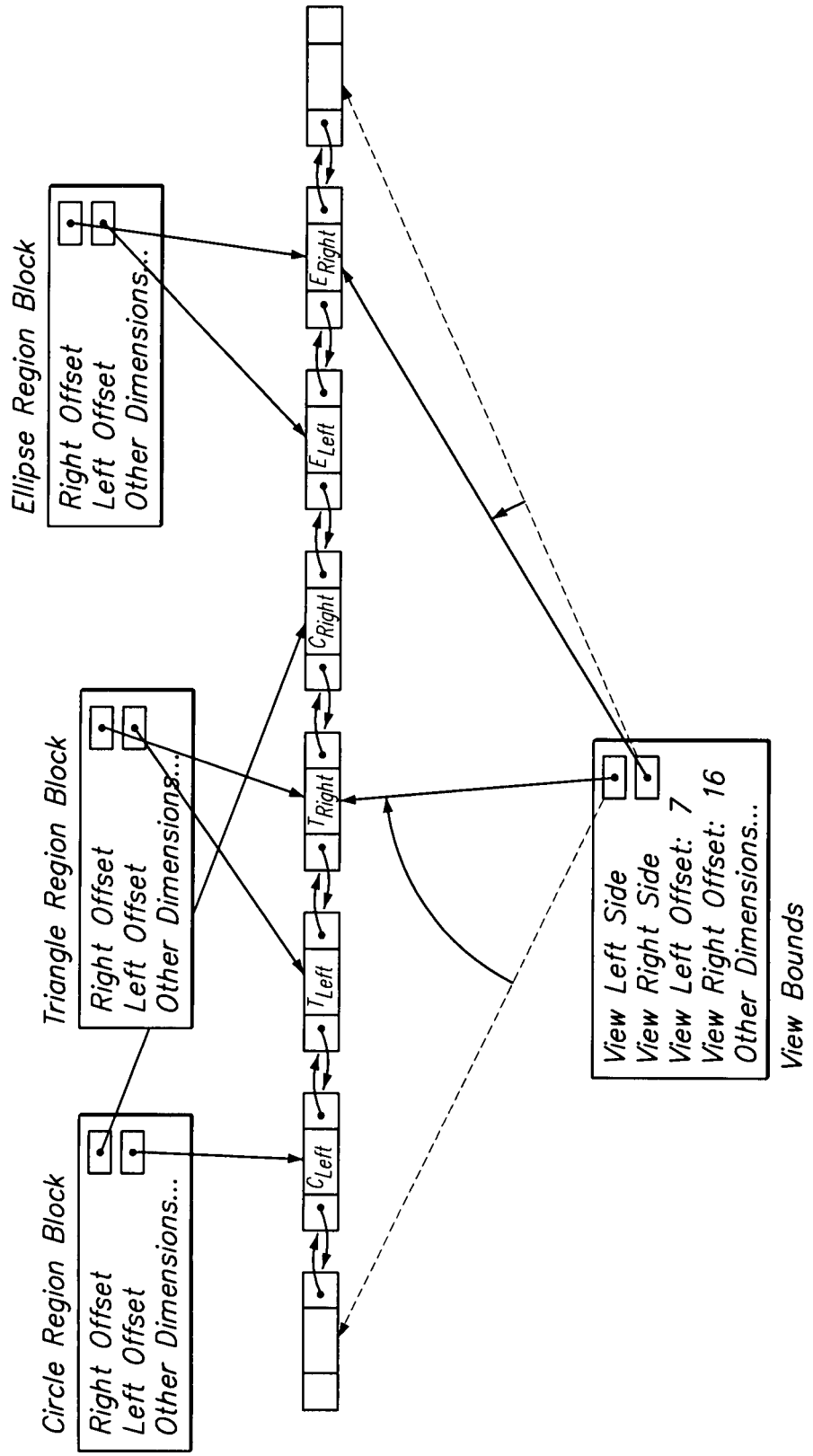

FIG. 14(a) shows exemplary node watcher data structures for the horizontal dimension for the zoomed out view of FIG. 13(a). Therein, each side of a node's bounding rectangle is represented using a transition block. The horizontal transition blocks are shown in FIG. 14(a) in the order that they appear on the GUI screen from left to right. For example, the left side of the circle, $C_{Left}$, comes first and then the left side of the triangle, $T_{Left}$, and so on until the right side of the ellipse, $E_{Right}$. Both ends of the list are marked with empty sentinel transition blocks. Also shown in FIG. 14(a) are the region blocks for each node and their corresponding pointers to their bounding rectangle's horizontal transition blocks. At the bottom of FIG. 14(a) is the view bounds data structure that contains pointers to the transition blocks that are just outside of the current view. For the zoomed out view, all nodes are completely visible, and therefore all of their transition blocks are between the transition blocks pointed to by the view bounds data structure.

FIG. 14(b) shows the node watcher data structures for the zoomed in view of FIG. 13(b). Therein, it can be seen that the view bounds part of the data structure has changed so that it now points to the transition blocks for the right side of the triangle, $T_{Right}$, and the right side of the ellipse, $E_{Right}$, since these two bounding rectangle sides are just outside of the current (zoomed in) view.

Given these exemplary data structures and GUI scenes, the associated processing within the node watcher algorithm while the zoom transition occurs can be described as follows. Starting with the left side of the view, the node watcher algorithm moves the view left side pointer to the right until the transition block that is just outside of the view on the left side is reached. As shown in FIG. 14(b), the view left side pointer first passes the $C_{Left}$ transition block. For this example, assume that the circle node represents an application or other user interface object associated with the zoomable GUI that requires a notification when it is not fully visible in the view. Given these inputs to the node watcher algorithm, Table 1 indicates that the circle node should receive an exit notification for the horizontal dimension. Of course, the node watcher algorithm will typically aggregate notifications from all dimensions before notifying the node to avoid sending redundant exit notifications. Next, the view left side pointer passes the left side of the triangle, $T_{Left}$. If the triangle node has requested notifications for when it completely leaves the view, then the node watcher algorithm indicates per Table 1 that no notification is necessary. However, when the view pointer passes $T_{Right}$, Table 1 indicates that the triangle has exited the view entirely and should be notified. The view pointer stops here since the right side of the circle's bounding rectangle, $C_{Right}$, is still visible in the view.

From the right side, the node watcher algorithm's processing is similar. The view right side pointer moves left to the ellipse's right side $E_{Right}$. Depending on whether the ellipse has requested full or partial notifications, the node watcher algorithm will or will not send a notification to the ellipse pursuant to Table 1. The vertical dimension can be processed in a similar manner using similar data structures and the top and bottom boundary rectangle values. Those skilled in the arts will also appreciate that a plurality of boundary rectangles can be used to approximate non-rectangular nodes when more precise notification is required. Additionally, the present invention contemplates that movement through other dimensions can be tracked and processed by the node watcher algorithm, e.g., a third geometrical (depth or scale) dimension, as well as non-geometrical dimensions such as time, content rating (adult, PG-13, etc.) and content type (drama, comedy, etc). Depending on the number of dimensions in use, the algorithm, more accurately, detects intersections of boundary segments, rectangles, and n-dimensional hypercubes.

In addition to the node watcher algorithm described above, exemplary embodiments of the present invention provide resolution consistent semantic zooming algorithms which can be used in zoomable GUIs according to exemplary embodiments of the present invention. Semantic zooming refers to adding, removing or changing details of a component in a zoomable GUI depending on the magnification level of that component. For example, in the movie browser interface described below, when the user zooms close enough to the image of the movie, it changes to show movie metadata and playback controls. The calculation of the magnification level is based on the number of pixels that the component uses on the display device. The zoomable GUI can store a threshold magnification level which indicates when the switch should occur, e.g., from a view without the movie metadata and playback controls to a view with the movie metadata and playback controls.

Television and computer displays have widely varying display resolutions. Some monitors have such a high resolution that graphics and text that is readable on a low resolution display is so small to become completely unreadable. This also creates a problem for applications that use semantic zooming, especially on high resolution displays such as HDTVs. In this environment, semantic zooming code that renders based on the number of pixels displayed will change the image before the more detailed view is readable. Programmatically modifying the threshold at which semantic zooming changes component views can only work for one resolution.

Figure 15:
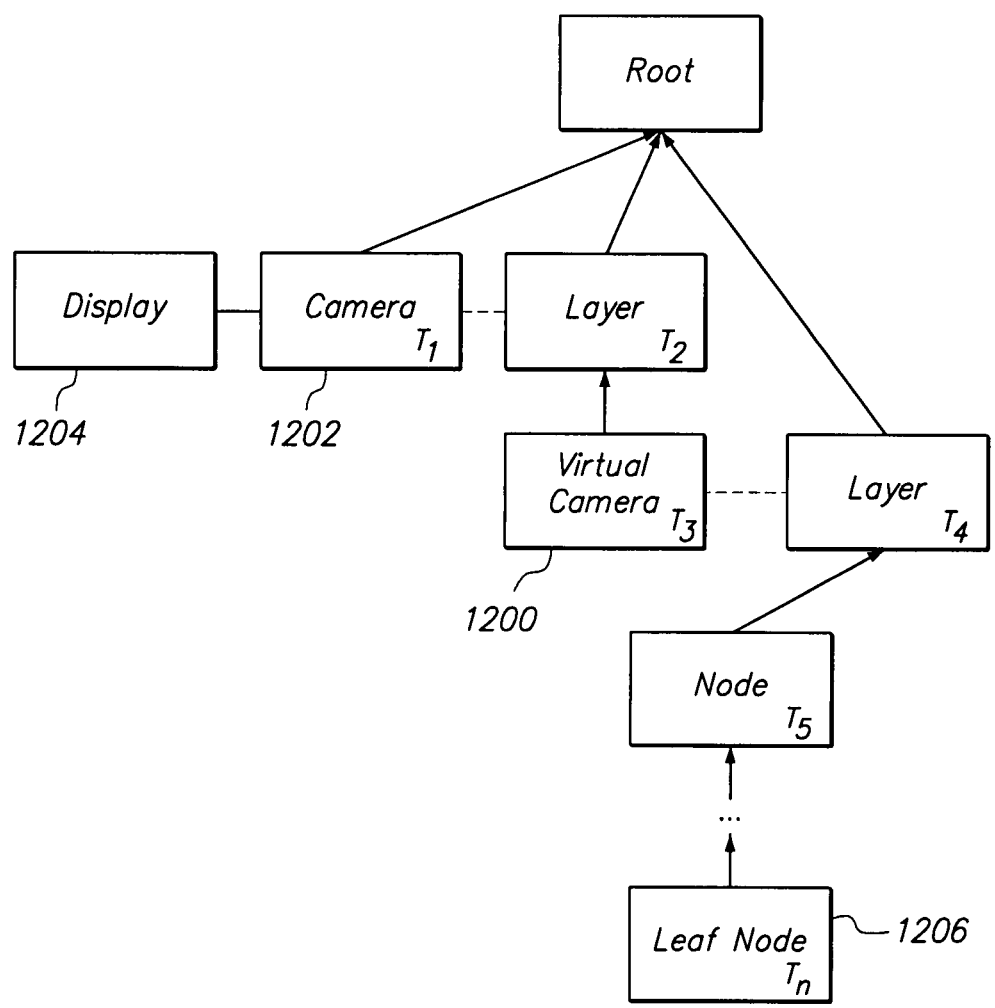
FIG. 15 depicts a data structure according to another exemplary embodiment of the present invention including a virtual camera for use in resolution consistent zooming.

The desirable result is that semantic zooming occurs consistently across all monitor resolutions. One solution is to use lower resolution display modes on high resolution monitors, so that the resolution is identical on all displays. However, the user of a high resolution monitor would prefer that graphics would be rendered at their best resolution if semantic zooming would still work as expected. Accordingly, exemplary embodiments of the present invention provide a semantic zooming technique which supports displays of all different solutions without the previously stated semantic viewing issues. This can be accomplished by, for example, creating a virtual display inside of the scene graph. This is shown in FIG. 15 by using an embedded virtual camera node 1200 and adding logic to compensate for the display resolution. The virtual camera node 1200 defines a view port whose size maps to the user's view distance and monitor size. For example, a large virtual camera view port indicates that a user is either sitting close enough to the monitor or has a large enough monitor to resolve many details. Alternately, a small view port indicates that the user is farther away from the monitor and requires larger fonts and image. The zoomable GUI code can base the semantic zooming transitions on the magnification level of components seen on this virtual camera and using the user's preferred viewing conditions.

The main camera node 1202 that is attached to the display device 1204 has its view port configured so that it displays everything that the virtual camera 1200 is showing. Since graphics images and text are not mapped to pixels until this main camera 1202, no loss of quality occurs from the virtual camera. The result of this is that high definition monitors display higher quality images and do not trigger semantic zooming changes that would make the display harder to read.

According to one exemplary embodiment of the present invention, the process works as follows. Each camera and node in the scene graph has an associated transform matrix ($T_1$ to $T_n$). These matrices transform that node's local coordinate system to that of the next node towards the display. In the figure, $T_1$ transforms coordinates from its view port to display coordinates. Likewise, $T_2$ transforms its local coordinate system to the camera's view port. If the leaf node 1206 needs to render something on the display, it computes the following transform matrix:

$$A = T_1 T_2 \ldots T_n$$

This calculation can be performed while traversing the scene graph. Since the component changes to support semantic zooming are based on the virtual camera 1200, the following calculation is performed:

$$B = T_4 T_5 \ldots T_n$$

Typically, $T_1$ to $T_3$ can be determined ahead of time by querying the resolution of the monitor and inspecting the scene graph. Determining B from A is, therefore, accomplished by inverting these matrices and multiplying as follows:

$$B = (T_1 T_2 T_3)^{-1} A$$

For the case when calculating $T_1$ to $T_3$ ahead of time is problematic, e.g., if a graphics API hides additional transformations, logic can be added to the virtual camera to intercept the transformation matrix that it would have used to render to the display. This intercepted transformation is then inverted and multiplied as above to compute the semantic zooming threshold.

Figure 16A:
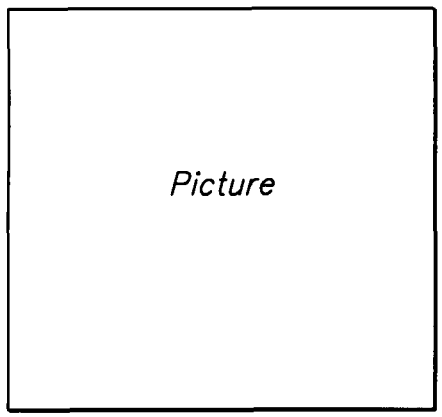
FIGS. 16(a) and 16(b) show a zoomed out and zoomed in version of a portion of an exemplary GUI which depict semantic zooming according to an exemplary embodiment of the present invention.
Figure 16B:
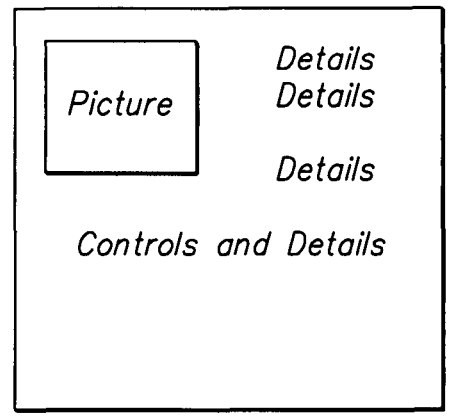
Figure 17:
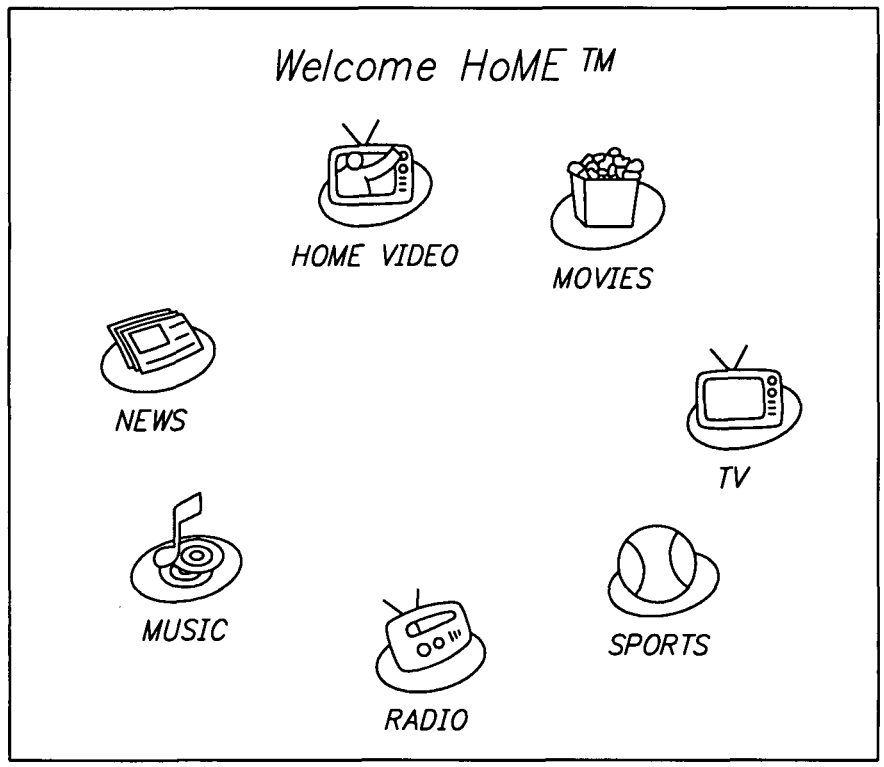

One strength of zoomable interfaces according to exemplary embodiments of the present invention is the ability to maintain context while navigating the interface. All of the interface components appear to exist in the zoomable world, and the user just needs to pan and zoom to reach any of them. The semantic zooming technique described above changes the appearance of a component depending on the zoom or magnification level. FIGS. 16(*a*) and 16(*b*) provide an example of semantic zooming for a component where the zoomed out version of the component (FIG. 16(*a*)) is a picture and the zoomed in version (FIG. 16(*b*)) includes the same picture as well as some controls and details. Some more detailed examples of this are provided below. One challenge associated with semantic zooming is that changes between views can occur abruptly, and transition techniques such as alpha blending do not provide visually pleasing results when transitioning between two such views.

Accordingly, exemplary embodiments of the present invention provide for some common image or text in all views of a component to provide a focal point for a transition effect when a semantic zoom is performed. For example, in FIGS. 16(*a*) and 16(*b*), the common element is the picture. The transition effect between the zoomed out version and the zoomed in version can be triggered using, for example, the above-described node watcher algorithm as follows. First, a registration with the node watcher can be performed to receive an event when the main camera's view port transitions from the magnification level of the zoomed out version of the component to the zoomed in version. Then, when the event occurs, an animation can be displayed which shows the common element(s) shrinking and translating from their location in the zoomed out version to their location in the zoomed in version. Meanwhile, the camera's view port continues to zoom into the component.

Figure 18:
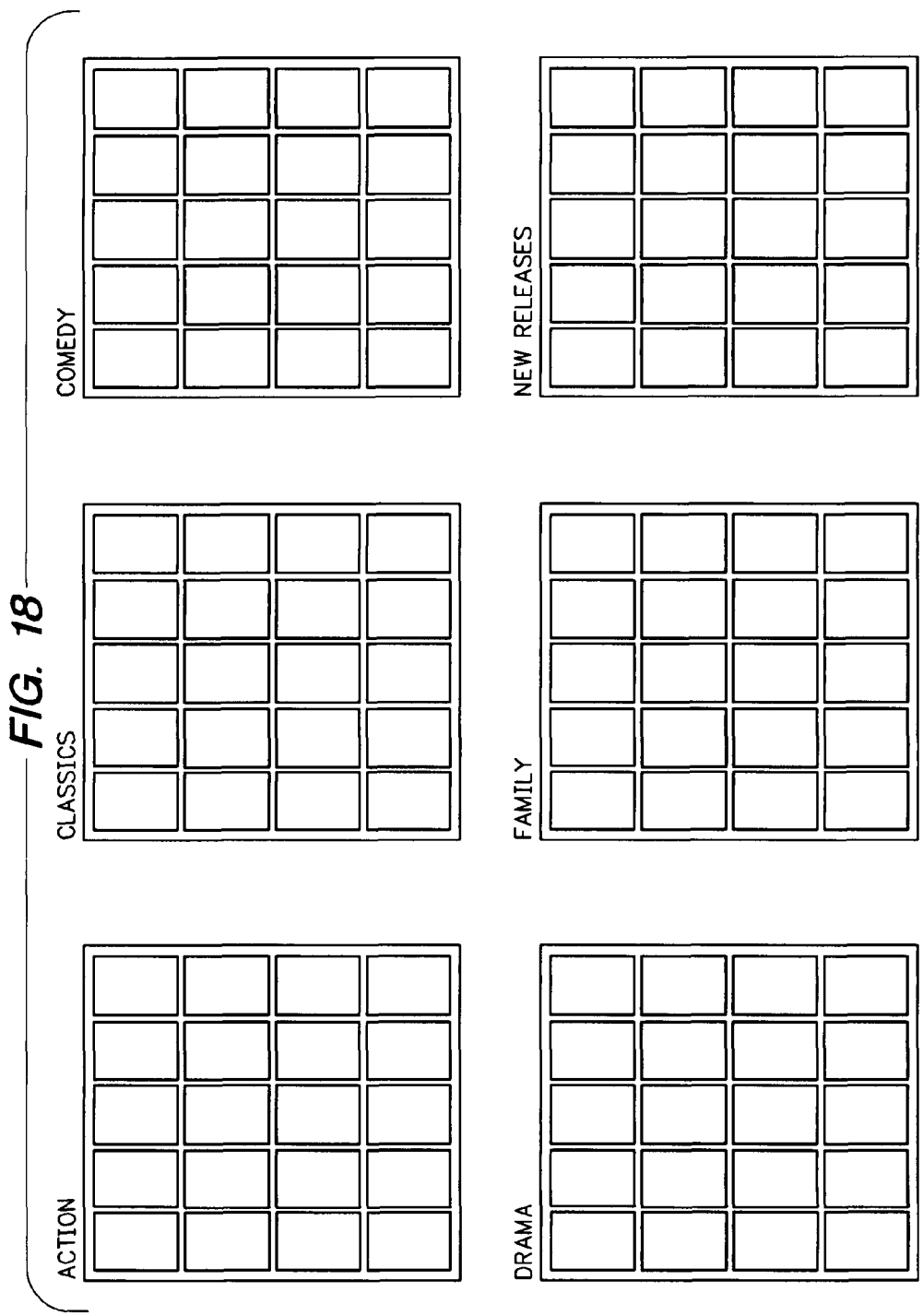

These capabilities of graphical user interfaces according to the present invention will become even more apparent upon review of another exemplary embodiment described below with respect to FIGS. 17-21. Therein, a startup GUI screen 1400 displays a plurality of organizing objects which operate as media group representations. The purely exemplary media group representations of home video, movies, TV, sports, radio, music and news could, of course include different, more or fewer media group representations. Upon actuation of one of these icons by a user, the GUI according to this exemplary embodiment will then display a plurality of images each grouped into a particular category or genre. For example, if the "movie" icon in FIG. 17 was actuated by a user, the GUI screen of FIG. 18 can then be displayed. Therein, a large number, e.g., 120 or more, selection objects are displayed. These selection objects can be categorized into particular group(s), e.g., action, classics, comedy, drama, family and new releases. Those skilled in the art will appreciate that more or fewer categories could be provided. In this exemplary embodiment, the media item images can be cover art associated with each movie selection. Although the size of the blocks in FIG. 18 is too small to permit detailed illustration of this relatively large group of selection item images, in implementation, the level of magnification of the images is such that the identity of the movie can be discerned by its associated image, even if some or all of the text may be too small to be easily read.

Figure 19:
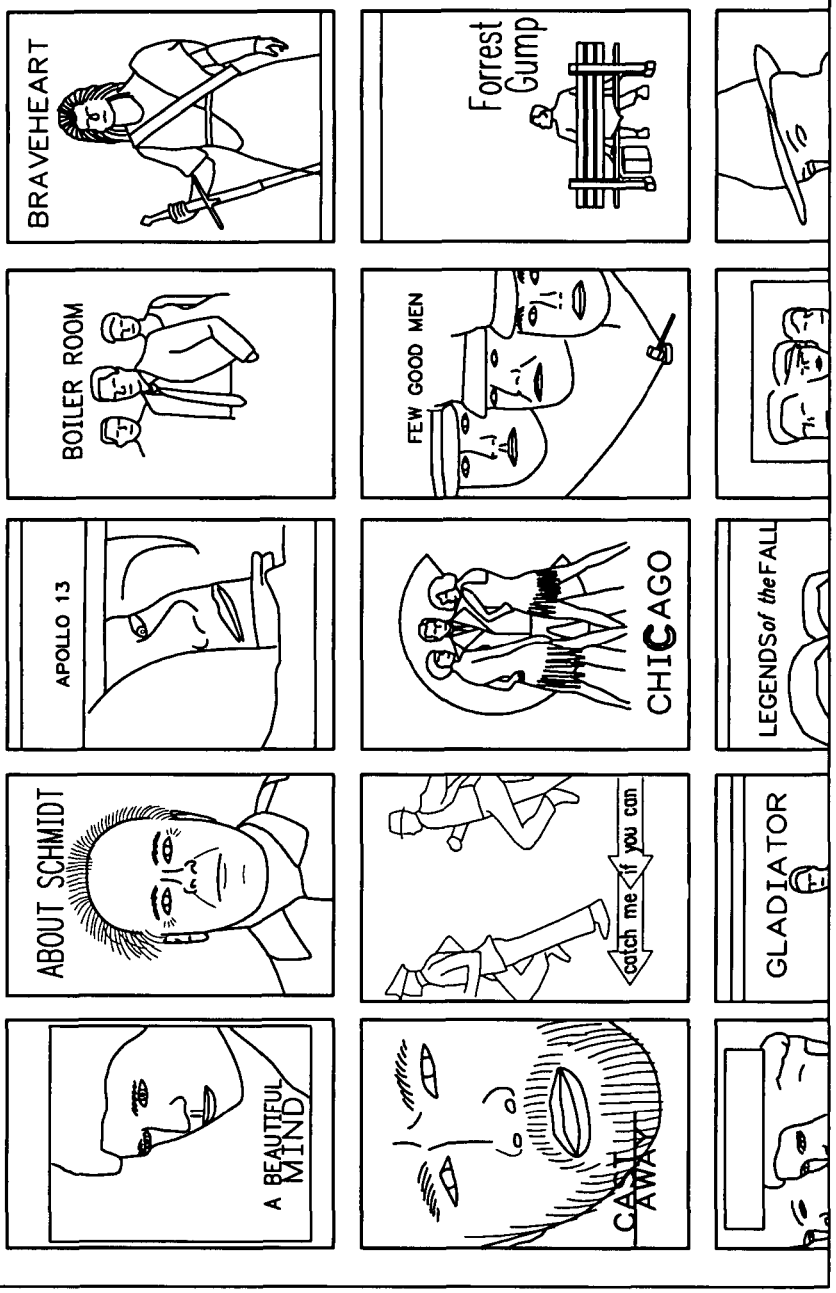

The cursor (not shown in FIG. 18) can then be disposed over a group of the movie images and the input device actuated to provide a selection indication for one of the groups. In this example the user selects the drama group and the graphical user interface then displays a zoomed version of the drama group of images as seen in FIG. 19. As with the previous embodiment, a transition effect can also be displayed as the GUI shifts from the GUI screen of FIG. 18 to the GUI screen of FIG. 19, e.g., the GUI may pan the view from the center of the GUI screen of FIG. 18 to the center of the drama group of images during or prior to the zoom. Note that although the zoomed version of the drama group of FIG. 19 only displays a subset of the total number of images in the drama group, that this zoomed version can alternatively contain all of the images in the selected group. The choice of whether or not to display all of the images in a selected group in any given zoomed in version of a GUI screen can be made based upon, for example, the number of media items in a group and a minimum desirable magnification level for a media item for a particular zoom level. This latter characteristic of GUIs according to the present invention can be predetermined by the system designer/service provider or can be user customizable via software settings in the GUI. For example, the number of media items in a group and the minimum and/or maximum magnification levels can be configurable by either or both of the service provider or the end user. Such features enable those users with, for example, poor eyesight, to increase the magnification level of media items being displayed. Conversely, users with especially keen eyesight may decrease the level of magnification, thereby increasing the number of media items displayed on a GUI screen at any one time and decrease browsing time.

One exemplary transition effect which can be employed in graphical user interfaces according to the present invention is referred to herein as the "shoe-to-detail" view effect. When actuated, this transition effect takes a zoomed out image and simultaneously shrinks and translates the zoomed out image into a smaller view, i.e., the next higher level of magnification. The transition from the magnification level used in the GUI screen of FIG. 18 to the greater magnification level used in the GUI screen of FIG. 19 results in additional details being revealed by the GUI for the images which are displayed in the zoomed in version of FIG. 19. The GUI selectively reveals or hides details at each zoom level based upon whether or not those details would display well at the currently selected zoom level. Unlike a camera zoom, which attempts to resolve details regardless of their visibility to the unaided eye, exemplary embodiments of the present invention provide for a configurable zoom level parameter that specifies a transition point between when to show the full image and when to show a version of the image with details that are withheld. The transition point can be based upon an internal resolution independent depiction of the image rather the resolution of TV/Monitor 212. In this way, GUIs according to the present invention are consistent regardless of the resolution of the display device being used in the media system.

In this exemplary embodiment, an additional amount of magnification for a particular image can be provided by passing the cursor over a particular image. This feature can be seen in FIG. 20, wherein the cursor has rolled over the image for the movie "Apollo 13". Although not depicted in FIG. 20, such additional magnification could, for example, make more legible the quote "Houston, we have a problem" which appears on the cover art of the associated media item as compared to the corresponding image in the GUI screen of FIG. 19 which is at a lower level of magnification. User selection of this image, e.g., by depressing a button on the input device, can result in a further zoom to display the details shown in FIG. 21. This provides yet another example of semantic zooming as it was previously described since various information and control elements are present in the GUI screen of FIG. 21 that were not available in the GUI screen of FIG. 20. For example, information about the movie "Apollo 13" including, among other things, the movie's runtime, price and actor information is shown. Those skilled in the art will appreciate that other types of information could be provided here. Additionally, this GUI screen includes GUI control objects including, for example, button control objects for buying the movie, watching a trailer or returning to the previous GUI screen (which could also be accomplished by depressing the ZOOM OUT button on the input device). Hyperlinks can also be used to allow the user to jump to, for example, GUI screens associated with the related movies identified in the lower right hand corner of the GUI screen of FIG. 21 or information associated with the actors in this movie. In this example, some or all of the film titles under the heading "Filmography" can be implemented as hyperlinks which, when actuated by the user via the input device, will cause the GUI to display a GUI screen corresponding to that of FIG. 21 for the indicated movie.

A transition effect can also be employed when a user actuates a hyperlink. Since the hyperlinks may be generated at very high magnification levels, simply jumping to the linked media item may cause the user to lose track of where he or she is in the media item selection "map". Accordingly, exemplary embodiments of the present invention provide a transition effect to aid in maintaining the user's sense of geographic position when a hyperlink is actuated. One exemplary transition effect which can be employed for this purpose is a hop transition. In an initial phase of the transition effect, the GUI zooms out and pans in the direction of the item pointed to by the hyperlink. As mentioned previously, one exemplary set of techniques for implementing this type of transition effect is described below under the heading "ZML". Zooming out and panning continues until both the destination image and the origination image are viewable by the user. Using the example of FIG. 21 once again, if the user selects the hyperlink for "Saving Private Ryan", then the first phase of the hyperlink hop effect would include zooming out and panning toward the image of "Saving Private Ryan" until both the image for "Saving Private Ryan" and "Apollo 13" were visible to the user. At this point, the transition effect has provided the user with the visual impression of being moved upwardly in an arc toward the destination image. Once the destination image is in view, the second phase of the transition effect gives the user the visual impression of zooming in and panning to, e.g., on the other half of the arc, the destination image. The hop time, i.e., the amount of time both phases one and two of this transition effect are displayed, can be fixed as between any two hyperlinked image items. Alternatively, the hop time may vary, e.g., based on the distance traveled over the GUI. For example, the hop time can be parameterized as HopTime=A log(zoomed-in scale level/hop apex scale level)+B(distance between hyperlinked media items)+C, where A, B and C are suitably selected constant values.

Figure 20:
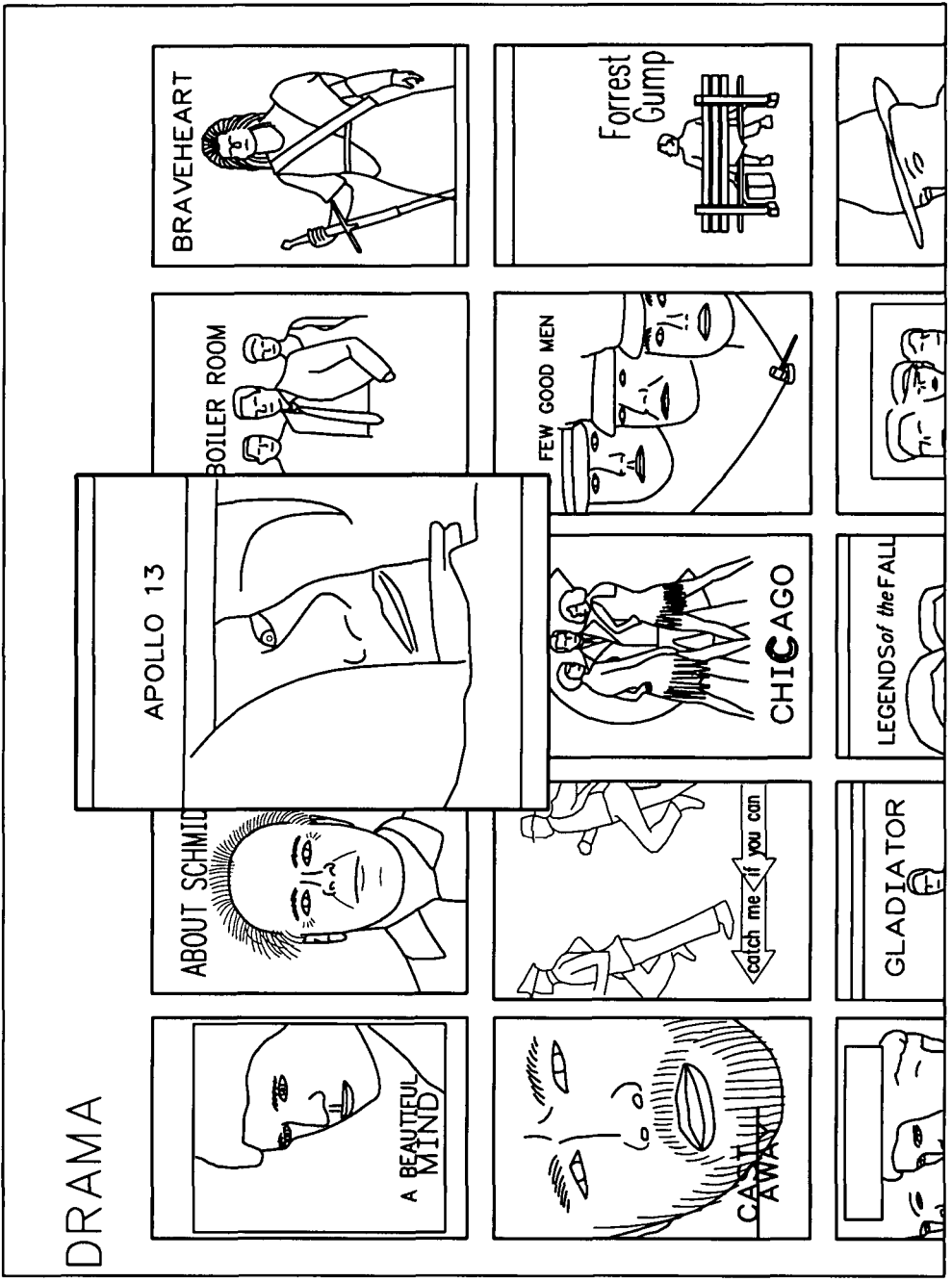

The node watcher algorithm described above with respect to FIGS. 10-14(b) can also be used to aid in the transition between the zoom level depicted in the exemplary GUI screen of FIG. 20 and the exemplary GUI screen of FIG. 21. The rendering of GUI screens containing text and/or control elements which are not visible in other zoom level versions of the selected image may be more computationally and/or memory intensive than the images at lower magnification levels. Accordingly, the node watcher algorithm can be used in exemplary embodiments of the present invention to aid in pre-loading of GUI screens such as that shown in FIG. 21 by watching the navigation code of the GUI to more rapidly identify the particular media item being zoomed in on.

Figure 22:
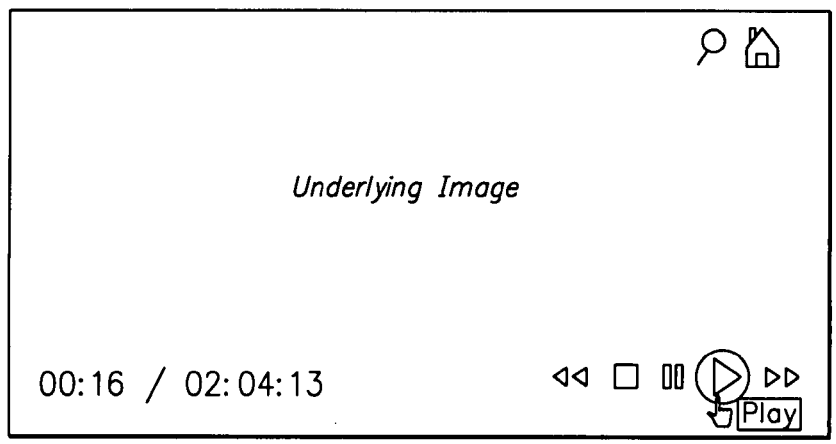
FIG. 22 illustrates an exemplary set of overlay controls which can be provided according to exemplary embodiments of and the present invention.

Included in exemplary implementations of the present invention are screen-location and semantically-based navigation controls. These control regions appear when the user positions the cursor near or in a region associated with those controls on a screen where those controls are appropriate as shown in FIG. 22. For example, when playing a movie, the so-called trick functions of Fast Forward, Rewind, Pause, Stop and so on are semantically appropriate. In this exemplary embodiment, the screen region assigned to those functions is the lower right corner and when the cursor is positioned near or in that region, the set of icons for those trick functions appear. These icons then disappear when the function engaged is clearly completed or when the cursor is repositioned elsewhere on the screen. The same techniques can also be used to cover other navigational features like text search and home screen selection. In this exemplary implementation, these controls are semantically relevant on all screens and the region assigned to them is the upper right corner. When the cursor is positioned near or in that region, the set of icons for those navigational controls appear. These icons then disappear when the function is activated or the cursor is repositioned elsewhere on the screen. Note that for user training purposes, the relevant control icons may initially optionally appear briefly (e.g., 5 seconds) on some or all of the relevant screens in order to alert the inexperienced user to their presence.

Figure 23:
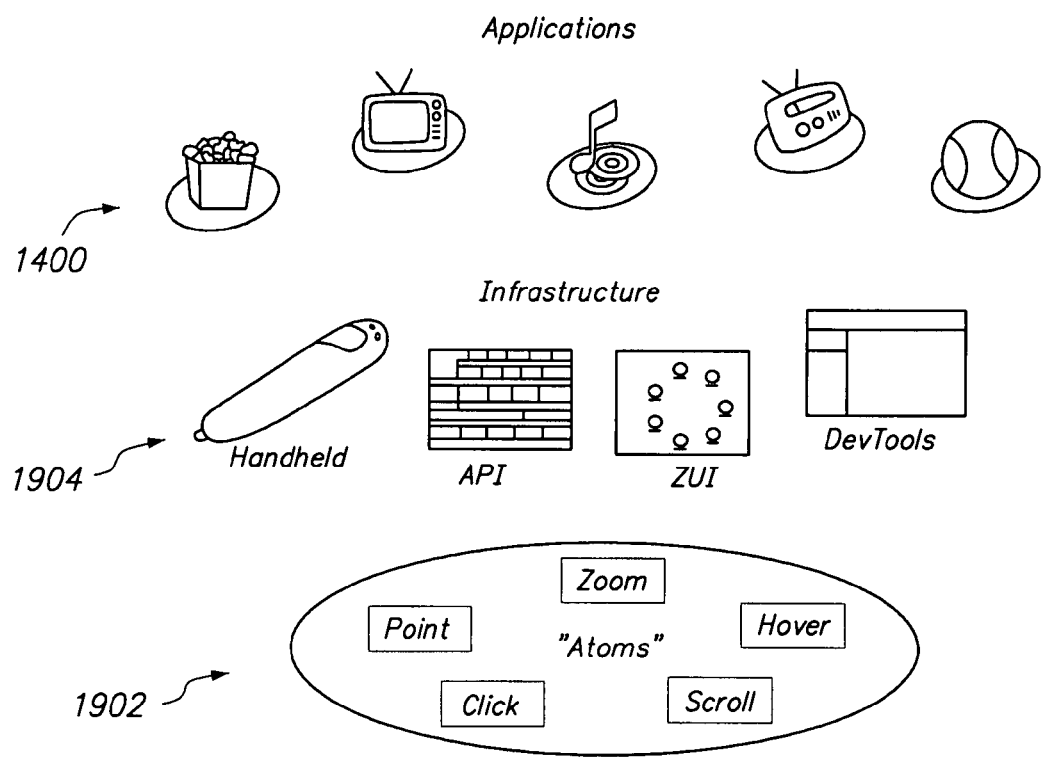
FIG. 23 illustrates an exemplary framework for implementing zoomable graphical user interfaces according to the present invention.

Having provided some examples of zoomable graphical user interfaces according to the present invention, exemplary frameworks and infrastructures for using such interfaces will now be described. FIG. 23 provides a framework diagram wherein zoomable interfaces associated with various high level applications 1900, e.g., movies, television, music, radio and sports, are supported by primitives 1902 (referred to in the Figure as "atoms"). In this exemplary embodiment, primitives 1902 include POINT, CLICK, ZOOM, HOVER and SCROLL, although those skilled in the art will appreciate that other primitives may be included in this group as well, e.g., PAN and DRAG. As described above the POINT and CLICK primitives operate to determine cursor location and trigger an event when, for example, a user actuates the ZOOM IN or ZOOM OUT button on the handheld input device. These primitives simplify navigation and remove the need for repeated up-down-right-left button actions. As illustrated above, the ZOOM primitive provides an overview of possible selections and gives the user context when narrowing his or her choices. This concept enables the interface to scale to large numbers of media selections and arbitrary display sizes. The SCROLL primitive handles input from the scroll wheel input device on the exemplary handheld input device and can be used to, for example, accelerates linear menu navigation. The HOVER primitive dynamically enlarges the selections underneath the pointer (and/or changes the content of the selection) to enable the user to browse potential choices without committing. Each of the aforedescribed primitive operations can be actuated in GUIs according to the present invention in a number of different ways. For example, each of POINT, CLICK, HOVER, SCROLL and ZOOM can be associated with a different gesture which can be performed by a user. This gesture can be communicated to the system via the input device, whether it be a free space pointer, trackball, touchpad, etc. and translated into an actuation of the appropriate primitive. Likewise, each of the primitives can be associated with a respective voice command.

Between the lower level primitives 1902 and the upper level applications 1900 reside various software and hardware infrastructures 1904 which are involved in generating the images associated with zoomable GUIs according to the present invention. As seen in FIG. 23, such infrastructures 1904 can include a handheld input device/pointer, application program interfaces (APIs), zoomable GUI screens, developers' tools, etc.

The foregoing exemplary embodiments are purely illustrative in nature. The number of zoom levels, as well as the particular information and controls provided to the user at each level may be varied. Those skilled in the art will appreciate that the present invention provides revolutionary techniques for presenting large and small sets of media items using a zoomable interface such that a user can easily search through, browse, organize and play back media items such as movies and music. Graphical user interfaces according to the present invention organize media item selections on a virtual surface such that similar selections are grouped together. Initially, the interface presents a zoomed out view of the surface, and in most cases, the actual selections will not be visible at this level, but rather only their group names. As the user zooms progressively inward, more details are revealed concerning the media item groups or selections. At each zoom level, different controls are available so that the user can play groups of selections, individual selections, or go to another part of the virtual surface to browse other related media items. Zooming graphical user interfaces according to exemplary embodiments of the present invention can contain categories of images nested to an arbitrary depth as well as categories of categories. The media items can include content which is stored locally, broadcast by a broadcast provider, received via a direct connection from a content provider or on a peering basis. The media items can be provided in a scheduling format wherein date/time information is provided at some level of the GUI. Additionally, frameworks and GUIs according to exemplary embodiments of the present invention can also be applied to television commerce wherein the items for selection are being sold to the user.

ZML (ZUI Markup Language)

There are a number of different ways to develop software usable to generate the GUI screens described above, as well as the other user interface features associated with such systems. Conceptually, if the number of user interface elements were fixed and relatively few in number, one could "hard code" each scene and each transition between each scene. However, hard coding is not particularly desirable, or possibly not even feasible, for large scale implementations wherein it is desirable for third-party developers to have the opportunity to add value by way of extensions or applications development within a zoomable user interface framework. Accordingly, exemplary embodiments of the present invention provide tools for rendering rich ZUIs which are also easily extensible.

The term "scene" is used herein in discussing ZUI construction according to exemplary embodiments of the present invention. A scene describes, for example, the collective set of ZUI components available to the user between navigation changes, i.e., those user interface objects available in a particular UI view. As mentioned above, ZUIs according to exemplary embodiments of the present invention provide the user with navigation information by, among other things, establishing spatial relationships between scenes which are conveyed by, among other mechanisms, zooming and panning animations. In order to implement such ZUIs in a way other than hard coding the interface, the following exemplary embodiments describe one way in which a programming language (and corresponding applications program interface (API)) can be extended to enable programmers to develop these types of ZUIs.

For example, scenes associated with ZUIs can be generated using a programming language which is based on the Scalable Vector Graphics (SVG) specification. SVG is a language which is designed for use in describing two-dimensional graphics in Extensible Markup Language (XML). SVG is specified in, for example, the "Scalable Vector Graphics (SVG) 1.1 Specification", promulgated by the W3C Recommendation 14 Jan. 2003, which can be found at http://www.w3.org/TR/2003/REC-SVG11-20030114/, the disclosure of which is incorporated here by reference, as well as another version, SVG Tiny 1.2, which can be found at http://www.w3.org/TR/SVGMobile12/coords.html#InitialCoordinateSystem, the disclosure of which is also incorporated here by reference. Among other things, SVG provides for three types of graphic objects: vector graphic shapes (e.g., paths consisting of straight lines and curves), images and text. Graphical objects can be grouped, styled, transformed and composed into previously rendered objects. The feature set includes nested transformations, clipping paths, alpha masks, filter effects and template objects. Many of the features available in SVG can be used to generate scenes for creating zoomable user interfaces, such as those described above. However, extensions to the SVG language have been developed according to exemplary embodiments of the present invention in order to provide some ZUI functionality, including the capability to establish and manipulate spatial relationships between scenes. These exemplary extensions to SVG include both new elements, as well as new attributes associated with conventional elements which are currently provided for in the SVG language, some examples of which are provided below for functionality associated with describing scenes and scene transitions in zoomable user interfaces. Therein, element names denoted in the form "zui: name" identify element extensions to SVG. After describing the various SVG extension elements and attributes, some further examples relating to how these extensions can be used to generate ZUIs according to exemplary embodiments will be provided.

The hyperlink tag <a> creates a hyperlink to another scene in the zoomable user interface. This is similar in concept to the hyperlink tag used in web pages but the syntax for specifying a hyperlink reference (xlink:href) follows ZML protocols, namely "zuipath" and "zuichild". A scene specified with a "zuichild" path name is treated as a child of the current scene. The child scene is placed below the parent scene in the tree, and the variable scope of the parent scene extends to the child scene. When a user clicks the link in the ZUI associated with the hyperlink tag, the view moves to the new scene, using any transition specified. Because the new scene is a child of the previous scene, variables specified in the parent scene are available to the new scene. A scene specified with a "zuipath" path name is not a child of the original scene, instead there is no relationship at all. The variable scope is not shared, so the new scene has no access to the prior scene's variables. One or more locatable elements (or a zui:brick that includes such elements) may be enclosed within the <a> tag; these specify what users click to activate the link.

TABLE 2

<a> Tag Attributes

| Attribute | Possible Values | Description |
| --- | --- | --- |
| id | Alphanumeric string | User-defined values can make JavaScript clearer. |
| xlink:href | URL | Allow auto-assignment of this value; Possible prefixes include "zuichild" for subscenes/bricks, "zuipath" for hyperlinks. |
| zui:metadata | Variable | Variable or database expression that resolves to the URL destination. The result will automatically update when the value of the expression changes. |
| zui:duration | Integer | If a zui:duration of 0 is specified this overrides any other transition specified and turns the link into an immediate flash cut or teleport. Do not use other values with zui:duration. |

<g>

The grouping tag <g> allows a ZUI programmer to group a set of nodes together. These nodes become child elements of the grouping node. The grouping tag permits the programmer to easily move, enable/disable, or modify related objects by simply modifying the grouping node since many attributes set on the grouping node are inherited by or applied to the grouping node's children. Attributes that are inherited include: pointer-events, visibility, zui:internal-node and zui:informational. Changes to the grouping node's transform attribute are applied to the children of the node rather than inherited, but the effect is the same. In contrast to the SVG Tiny Specification, style attributes such as color are not inherited according to this exemplary embodiment.

TABLE 3

| <g> Tag Attributes | | |
|---|---|---|
| Attribute | Possible Values | Description |
| Id | Alpha-numeric string | User-defined values can make JavaScript clearer. |
| Transform | "TransformList" as defined in the SVG Tiny spec. In practice, usually consists of a "matrix(x,x,x,x,x,x)" string. | To manipulate the transform attribute use getTraitMatrix( ) to return an object of type "SVGMatrix", which has a number of convenience methods as described in the spec. "transform.js" in the "scripts" directory contains a standard set of methods for manipulating the transform in JavaScript. |
| pointer-events | none \| zui:all | Use none to disable 3D pointer events; Use zui:all to enable; Hidden/invisible elements will receive pointer events unless this attribute is set to none |
| Visibility | hidden \| visible | Use hidden to hide an element; Use visible to make it visible; Visibility has no effect on user input. Use the pointer-events attribute instead. |
| zui:layer | null \| background \| [Alpha-numeric string] | Use the layer attribute to associate an element with a layer in the scene; A null value is associated with the default layer (the foreground); Non-null values that do not equal "background" become overlays. |
| zui:informational | true \| false | If true, the node should be ignored by the framework. This is useful for including placement artwork and backgrounds that should not be displayed at run time. |
| zui:internal-node | true \| false | Used to specify the destination for placement swap effects. A group that will act as the destination location for a swap effect should be marked as internal-node = true. |
| zui:cursor | URL to a cursor image \| arrow \| hand | Used to specify the cursor image. "arrow" and "hand" are the standard system cursors, which can be specific to a customer implementation environment. |

<image> 40

The <image> element loads an image into the scene. Static and placeholder images use the href attribute, while the zui: metadata tag is used to replace placeholder artwork with metadata defined images/cover art.

TABLE 4

| <image> Tag Attributes | | |
|---|---|---|
| Attribute | Possible Values | Description |
| id | Alpha-numeric string | User-defined values can make JavaScript clearer |
| transform | "TransformList" as defined in the SVG Tiny spec. In practice, usually consists of a "matrix(x,x,x,x,x,x)" string. | To manipulate the transform attribute use getTraitMatrix( ) to return an object of type "SVGMatrix", which has a number of convenience methods as described in the spec. "transform.js" in the "scripts" directory contains a standard set of methods for manipulating the transform in JavaScript. |
| x | Float | Horizontal position to render the text relative to the top left of the screen. |
| y | Float | Vertical position to render the text relative to the top left of the screen. |
| width | Float | The width of the node. |
| height | Float | The height of the node. |
| pointer-events | none \| zui:all | Use none to disable 3D pointer events; Use zui:all to enable; Hidden/invisible elements will receive |

TABLE 4-continued

<image> Tag Attributes

| Attribute | Possible Values | Description |
| --- | --- | --- |
| visibility | hidden \| visible | 3D pointer events unless this attribute is set to none. Use hidden to hide an element; Use visible to make it visible. Visibility has no effect on user input in itself; set pointer-events to none to keep a hidden image from responding to 3D pointer events. |
| preserveAspectRatio | [xMinYMin \| xMidYMin \| xMaxYMin \| xMinYMid \| xMidYMid \| xMaxYMid \| xMinYMax \| xMidYMax \| xMaxYMax \| none] [meet \| slice] | This attribute consists of two enumerated string values with a space between them. The first determines the anchor point for preserving the aspect ratio and the point at which hoverzooms occur (xMidYMid is the typical value); The second determines how to handle scaling (meet is the typical value) See the preserveAspectRatio attribute in the SVG Tiny spec. |
| xlink:href | URL | The URL of the image to display. This image will be used if no zui:metadata attribute is specified, or if the zui:metadata request fails to resolve. In practice the image URL is relative to the SVG, as the image directory is located in a child directory of the SVG directory. |
| zui:metadata | MQL expression | An expression in MQL that is evaluated to determine the image to display. The result of the expression should be a URL to the image to display. The image will be updated every time the result of the expression changes. |
| zui:layer | null \| background \| [Alpha-numeric string] | Use the layer attribute to associate an element with a layer in the scene; A null value is associated with the default layer (the foreground); Non-null values that do not equal "background" become overlays |
| zui:informational | true \| false | If true, the node should be ignored by the framework; This is useful for including placement artwork and backgrounds that should not be displayed at run time. |
| zui:internal-node | true \| false | Used to specify the destination for placement swap effects. A group that will act as the destination location for a swap effect should be marked as internal-node = true. |
| zui:cursor | URL to a cursor image \| arrow \| hand | Used to specify the cursor image. "arrow" and "hand" are the standard system cursors, which can be specific to a customer implementation environment. |

<rect>
The <rect> element defines a rectangle that will be drawn on the scene, which may be useful for debugging. In the API, <rect> tags are typically hidden and can be used to define boundaries for various widgets (e.g., a global navigation activation region).

TABLE 5

<rect> Tag Attributes

| Attribute | Possible Values | Description |
| --- | --- | --- |
| id | Alpha-numeric string | User-defined values can make JavaScript clearer |
| transform | "TransformList" as defined in the SVG Tiny spec. In | To manipulate the transform attribute use getTraitMatrix( ) to return an object of type |

TABLE 5-continued

<rect> Tag Attributes

| Attribute | Possible Values | Description |
|---|---|---|
| | practice, usually consists of a "matrix(x,x,x,x,x,x)" string | "SVGMatrix", which has a number of convenience methods as described in the spec. "transform.js" in the "scripts" directory contains a standard set of methods for manipulating the transform in JavaScript. |
| x | Float | Horizontal position of the upper left corner relative to the top left of the screen. |
| y | Float | Vertical position of the upper left corner relative to the top left of the screen. |
| width | Float | The width of the node. |
| height | Float | The height of the node. |
| fill | Color value | The color to fill the rectangle with. |
| stroke | Color value | The color to outline the rectangle with. |
| pointer-events | none \| zui:all | Use none to disable 3D pointer events; Use zui:all to enable. Hidden/invisible elements will receive pointer events unless this attribute is set to none |
| visibility | hidden \| visible | Use hidden to hide an element; Use visible to make it visible. Visibility has no effect on user input in itself; set pointer-events to none to keep a hidden rectangle from responding to pointer events. |
| zui:layer | null \| background \| [Alpha-numeric string] | Use the layer attribute to associate an element with a layer in the scene; A null value is associated with the default layer (the foreground); Non-null values that do not equal "background" become overlays |
| zui:informational | true \| false | If true, the node should be ignored by the framework; This is useful for including placement artwork and backgrounds that should not be displayed. |
| zui:internal-node | true \| false | Used to specify the destination for placement swap effects. A group that will act as the destination location for a swap effect should be marked as internal-node = true. |
| zui:cursor | URL to a cursor image \| arrow \| hand | Used to specify the cursor image. "arrow" and "hand" are the standard system cursors, which can be specific to a customer implementation environment. |

<script>

The <script> element denotes which JavaScript files the system should load to add interactivity to the ZML. Typically, one JavaScript file is included in the ZML using the script tag and all dependencies are loaded in the JavaScript file using the document.include(<file>) function.

TABLE 6

<script> Tag Attributes

| Attribute | Possible Values | Description |
|---|---|---|
| Language | Alpha-numeric string | The language that the referenced script file is written in. "application/ecmascript" is supported by the framework. "javascript" is also supported for backward compatibility. |
| xlink:href | URL | The URL of the script to load. |

<svg>

The <svg> element is used as the outermost tag of an SVG file. It can, therefore, be used to denote the size (bounds) of the scene, the onload JavaScript event, and very high level attributes of the scene.

TABLE 7

<svg> Tag Attributes

| Attribute | Possible Values | Description |
|---|---|---|
| id | Alpha-numeric string | User-defined values can make JavaScript clearer |
| Width | Float | The width of the node. |
| Height | Float | The height of the node. |
| Onload | JavaScript function name | The JavaScript function to call when the system processes the onload event for the scene. This attribute is created by the Toolkit, along with the corresponding function in the .js file for the scene. |
| xmlns:<namespace> | URL | The URL that describes the specified namespace. Several required xmlns attributes are generated by the Toolkit. There should be no need to alter these. |
| zui:top | true \| false | true if clicking the top button in global navigation should stop on this scene; false if the system should bypass this scene when navigating to top. |

<view>

The view tag can be used to add a new view to the scene. In a Java framework, every scene by default has a view with the id "everything". This "everything" view is defined as the entire scene.

TABLE 8

<view> Tag Attributes

| Attribute | Possible Values | Description |
| --- | --- | --- |
| Id | Alpha-numeric string | User-defined values can make JavaScript clearer |
| viewBox | (x, y, width, height) | Specifies the size of the view and where it is located within the scene, subject to value of preserveAspectRatio. |
| preserveAspectRatio | [xMinYMin | xMidYMin | xMaxYMin | xMinYMid | xMidYMid | xMaxYMid | xMinYMax | xMidYMax | xMaxYMax | none] [meet | slice] | This attribute consists of two enumerated string values with a space between them. The first determines the anchor point for preserving the aspect ratio and the point at which hoverzooms occur (xMidYMid is the typical value); The second determines how to handle scaling (meet is the typical value). See the preserveAspectRatio attribute in the SVG Tiny spec. |
| zui:transition | [hcrest_teleport | hcrest_swap_effect | hcrest_placement_swap_effect | hcrest_view | non_system_transition_id] | Similar to scene transitions. This attribute specifies how the transition into the view should look. It can either use a system defined transition (usually "hcrest_view" which would animate into the view and record history) or a custom transition. For a custom transition, specify the id of a <zui:transition> element elsewhere in the SVG file. |

<zui:background-transition>

The zui:background-transition tag specifies how the to scene background should transition to the from scene background.

TABLE 9

<zui:background> Tag Attributes

| Attribute | Possible Values | Description |
| --- | --- | --- |
| id | Alpha-numeric string | User-defined values can make JavaScript clearer |
| effect | [curtain | cross fade | slide left | slide right | etc] | This attribute specifies what framework-supported effect to run on the background during the transition. Things like a curtain effect, cross fade, etc. would be supported. |
| effect-start | Integer | This attribute specifies when to start the background effect. This value is a percentage in terms the actual transition duration. Valid values range from 0 to 100 inclusive. |
| effect-end | Integer | This attribute specifies when the background effect should end. This value is a percentage in terms of the actual transition duration and should always be greater than the effect-start attribute value. Valid values range from 0 to 100 inclusive. |
| start | Integer | This attribute specifies the start time when the swap between the 'to' and 'from' backgrounds should occur. This value is a percentage in terms of the actual transition duration. Valid values range from 0 to 100 inclusive. |
| end | Integer | This attribute specifies the end time when the swap between the 'to' and 'from' backgrounds should occur. This value is a percentage in terms of the actual transition duration and should be greater than or equal to the start attribute. Valid values range from 0 to 100 inclusive. |
| inherits | Alpha-numeric string | The element id that this background transition should inherit behavior from. If null, use default values. If set, use the values set in the other element as the defaults for this transition. |

<zui:brick>

The zui:brick tag inserts another ZML/SVG file into the scene at the specified location. A new variable scope is created for the brick and the user can pass variables into the brick using child zui:variable tags.

TABLE 10

<zui:brick> Tag Attributes

| Attribute | Possible Values | Description |
|---|---|---|
| id | Alpha-numeric string; must start with an alpha character, may include underscore character | User-defined values can make JavaScript clearer |
| width | Float | The width of the node. |
| height | Float | The height of the node. |
| transform | "TransformList" as defined in the SVG Tiny spec. In practice, usually consists of a "matrix(x, x, x, x, x, x)" string. | To manipulate the transform attribute use getTraitMatrix( ) to return an object of type "SVGMatrix", which has a number of convenience methods as described in the SVG Tiny spec. "transform.js" in the "scripts" directory contains a standard set of methods for manipulating the transform in JavaScript. |
| pointer-events | none | zui:all | Use none to disable 3D pointer events; Use zui:all to enable; Hidden/invisible elements will receive pointer events unless this attribute is set to none |
| visibility | hidden | visible | Use hidden to hide an element; Use visible to make it visible; Visibility has no effect on user input. Visibility has no effect on user input in itself; set pointer-events to none to keep a hidden brick from responding to pointer events. |
| xlink:href | URL | The URL of the ZML/SVG file to load as a brick. |
| zui:layer | null | background | [Alpha-numeric string] | Use the layer attribute to associate an element with a layer in the scene; A null value is associated with the default layer (the foreground); Non-null values that do not equal "background" become overlays. Do not create overlays in bricks in the C++ Framework. |
| zui:cursor | URL to a cursor image | arrow | hand | Used to specify the cursor image. "arrow" and "hand" are the standard system cursors, which can be specific to a customer implementation environment. |

<zui:clipRect>

The zui:clipRect element is similar to the grouping tag and functions in the same way with one exception: the zui:clipRect element will clip all children to its bounds and will not permit children to draw outside of its stated area. This is useful for enforcing layouts, creating thermometer effects, and the like.

TABLE 11

<zui:clipRect> Tag Attributes

| Attribute | Possible Values | Description |
|---|---|---|
| id | Alpha-numeric string | User-defined values can make JavaScript clearer |
| x | Float | Horizontal position of the upper left corner relative to the top left of the screen. |
| y | Float | Vertical position of the upper left corner relative to the top left of the screen. |
| width | Float | The width of the node. |
| height | Float | The height of the node. |
| transform | "TransformList" as defined in the SVG Tiny spec. In practice, usually consists of a "matrix(x, x, x, x, x, x)" string. | To manipulate the transform attribute use getTraitMatrix( ) to return an object of type "SVGMatrix", which has a number of convenience methods as described in the spec. "transform.js" in the "scripts" directory contains a standard set of methods for manipulating the transform in JavaScript. |
| pointer-events | none|zui:all | Use none to disable 3D pointer events; Use zui:all to enable; Hidden/invisible elements will receive pointer events unless this attribute is set to none |

TABLE 11-continued

<zui:clipRect> Tag Attributes

| Attribute | Possible Values | Description |
| --- | --- | --- |
| visibility | hidden\|visible | Use hidden to hide an element; Use visible to make it visible; Visibility has no effect on user input. Visibility has no effect on user input in itself; set pointer-events to none to keep a hidden clipRect from responding to pointer events. |
| zui:layer | null\|background\| [Alpha-numeric string] | Use the layer attribute to associate an element with a layer in the scene; A null value is associated with the default layer (the foreground); Non-null values that do not equal "background" become overlays. If the selected layer is not the foreground layer, all children will be forced in the same layer as this element automatically. |
| zui:informational | true\|false | If true, the node should be ignored by the framework; This is useful for including placement artwork and backgrounds that should not be displayed at run time. |
| zui:internal-node | true\|false | Used to specify the destination for placement swap effects. A group that will act as the destination location for a swap effect should be marked as internal-node = true. |

<zui:scene>

The zui:scene extension element to SVG specifies that the system should place a scene as a child of the current scene. This element differs from a brick in that the brick is a component of the scene and appears within the current scene. Elements of the scene do not appear until the new scene is transitioned into.

TABLE 12

<zui:scene> Tag Attributes

| Attribute | Possible Values | Description |
| --- | --- | --- |
| id | Alpha-numeric string; must start with an alpha character, may include underscore character | User-defined values can make JavaScript clearer |
| x | Float | Horizontal position of the upper left corner of the scene placement bounds relative to the upper left corner of the screen. |
| y | Float | Vertical position of the upper left corner of the scene placement bounds relative to the upper left corner of the screen. |
| width | Float | The width of the placement. |
| height | Float | The height of the placement. |
| xlink:href | URL | The URL of the scene to load. |
| zui:transition | [hcrest_teleport\| hcrest_swap_effect\| hcrest_placement_swap_effect\| hcrest_view\| non_system_transition_id] | Similar to scene transitions. This attribute specifies how the transition into the subscene should look. It can either use a system defined transition (usually "hcrest_view" which would animate into the subscene and record history) or a custom transition. For a custom transition, specify the id of a <zui:transition> element elsewhere in the SVG file. |

<zui:scene-swap>

This sets up scene swap transition effects for scene transitions. Cover is the only mandatory attribute in this exemplary implementation.

TABLE 13

<zui:scene-swap> Tag Attributes

| Attribute | Possible Values | Description |
|---|---|---|
| id | Alpha-numeric string | User-defined values can make JavaScript clearer |
| cover | Alpha-numeric string | The id of the cover (element) to use for the scene swap effect. This should be the id of an element in the same SVG file. That element should have its <zui:internal> tag set to "true". |
| start | Integer | The start time when the swap should start in terms of the percent of the transition duration. 0 is an instant swap, and 100 is a swap at the very end of the transition. |
| end | Integer | The end time when the swap should finish in terms of the percent of the transition duration. Should always be greater than or equal to start. |
| inherits | Alpha-numeric string | The element id this transition should inherit behavior from, OR a literal string specifying one of the system transition names (i.e., "hcrest_teleport", "hcrest_swap_effect", "hcrest_view", or hcrest_placement_swap_effect). If null, use default values. If set to en element id, use the values specified in that element as the defaults for the transition. Otherwise use the named transition effect. |

<zui:text-rect>

The zui:text-rect node displays text, and provides the user with the ability to determine the bounds in which to render text. Optionally, the text can be justified or capitalized. The node will truncate text and add a " . . . " if it is not possible to render the text within the specified font size boundaries. Wrapping is done automatically for the user on word boundaries. The developer can provide default display text within the start and end tags. Any XML control characters will need to be escaped as entities. For example, to display "Bob & Sue", the XML text content will contain "Bob & Sue". Alternatively, the text can be placed in a CDATA section to simplify the escaping rules. For example, <![CDATA[Bob & Sue]]>. If a zui:metadata attribute is provided, the result of its expression will be used to replace the text content.

TABLE 14

<zui:text-rect> Tag Attributes

| Attribute | Possible Values | Description |
|---|---|---|
| id | Alpha-numeric string | User-defined values can make JavaScript clearer |
| x | Float | Horizontal position of the upper left corner of the text bounds relative to the top left of the screen. |
| y | Float | Vertical position of the upper left corner of the text bounds relative to the top left of the screen. |
| width | Float | The width of the text bounds. |
| height | Float | The height of the text bounds. |
| font-family | Font name | Name of the font to use (e.g. HelveticaNeue LT 67 Medium Condensed). Only TrueType fonts are supported by the client. UX standards specify font and color for many UX elements. |
| fill | Color value | Color to render the font in (e.g "#FFFFFF") |
| font-size | Length | Font size to render the text. This acts as the upper bound font size. |
| pointer-events | none\|zui:all | Use none to disable 3D pointer events; Use zui:all to enable; Hidden/invisible elements will receive pointer events unless this attribute is set to none |
| visibility | hidden\|visible | Use hidden to hide an element; Use visible to make it visible; Visibility has no effect on user input. Visibility has no effect on user input in itself; set pointer-events to none to keep a hidden text-rec from responding to pointer events. |
| preserveAspectRatio | [xMinYMin\| xMidYMin\| xMaxYMin\| xMinYMid\| xMidYMid\| xMaxYMid\| xMinYMax\| xMidYMax\| | This attribute consists of two enumerated string values with a space between them. The first determines the anchor point for preserving the aspect ratio and the point at which hoverzooms occur (xMidYMid is the typical value); The second determines how to handle scaling (meet is the typical value) See the preserveAspectRatio attribute in the SVG Tiny spec. |

TABLE 14-continued

| | <zui:text-rect> Tag Attributes | |
|---|---|---|
| Attribute | Possible Values | Description |
| | xMaxYMax\|none] [meet\|slice] | |
| zui:metadata | MQL expression | An expression in MQL that is evaluated to determine the text to display. Updating variables (asynchronously) will cause the text to change to the evaluated result of the metadata property. |
| zui:layer | null\|background\|[Alpha-numeric string] | Use the layer attribute to associate an element with a layer in the scene; A null value is associated with the default layer (the foreground); Non-null values that do not equal "background" become overlays |
| zui:informational | true\|false | If true, the node should be ignored by the framework; This is useful for including placement artwork and backgrounds that should not be displayed. |
| zui:internal-node | true\|false | Used to specify the destination for placement swap effects. A group that will act as the destination location for a swap effect should be marked as internal-node = true. |
| zui:text-justification | left\|center | left causes text to be left justified; center causes text to be center justified; right justification is currently not supported by the system |
| zui:text-allcaps | null\|original\|uppercase\|lowercase | null or original preserves the user or metadata casing of the text; lowercase forces all text in the node to lowercase; uppercase forces all text in the node to uppercase |
| zui:min-font-size | Length | The minimum font size to render text at; Only used if the text does not fit the bounds at the full 'font-size' size. If text still overflows at this font size, it is truncated and is post-pended with an ellipse (". . .") |
| zui:cursor | URL to a cursor image \|arrow\|hand | Used to specify the cursor image. "arrow" and "hand" are the standard system cursors, which can be specific to a customer implementation environment. |

<zui:transition>

The parent node for all transition parameter elements, including zui:camera-transition, zui:scene-swap, zui:transition-param, and zui:background-transition.

TABLE 15

| | <zui:transition> Tag Attributes | |
|---|---|---|
| Attribute | Possible Values | Description |
| id | Alpha-numeric string | User-defined values can make JavaScript clearer |
| duration | Integer | The duration of the transition described by this element (in milliseconds). |
| history | true\|false | true if this transition should be recorded in history; false if it should be omitted. If the history tag is not specified, the transition is inserted into history. |
| background-zoom | true\|false | true if the transition should use the classic zooming background behavior; false otherwise. |
| inherits | Alpha-numeric string | The element id this transition should inherit behavior from, OR a literal string specifying one of the system transition names (i.e., "hcrest_teleport", "hcrest_swap_effect", "hcrest_view", or hcrest_placement_swap_effect). If null, use default values. If set to en element id, use the values specified in that element as the defaults for the transition. Otherwise use the named transition effect. |

<zui:transition-param>

TABLE 16

| <zui:transition-param> Tag Attributes | | |
| --- | --- | --- |
| Attribute | Possible Values | Description |
| id | Alpha-numeric string | User-defined values can make JavaScript clearer |

<zui:variable>

Sets the specified variable in the current scope to the specified value. Variable scopes are automatically created by the svg, zui:scene, and zui:brick tags, and are inherited by their children.

TABLE 17

| <zui:variable> Tag Attributes | | |
| --- | --- | --- |
| Attribute | Possible Values | Description |
| id | Alpha-numeric string | User-defined values can make JavaScript clearer, though the name of the variable is more useful for this purpose. |
| name | String | The name of the variable to set. |
| value | Variable | The value of the variable to set. |

Usage

<zui:video>

Creates a node that is capable of playing video and other multimedia content.

TABLE 18

| <zui:video> Tag Attributes | | |
| --- | --- | --- |
| Attribute | Possible Values | Description |
| id | Alpha-numeric string | User-defined values can make JavaScript clearer |
| x | Float | Horizontal position to render the video relative to the top left of the screen. |
| y | Float | Vertical position to render the video relative to the top left of the screen. |
| width | Float | The width of the node. |
| height | Float | The height of the node. |
| state | play\|stop\|pause\|skipForward\|skipBackward | Sends the appropriate signal to the underlying video player to move to the specified state. |
| playbackRate | Double | The playback rate of the video player. |
| feed | Alpha-numeric string | The name of the video feed that should be played in this video node. (e.g. "LIVE TV", "DVD", etc.). These are defined as part of the framework. |
| pointer-events | none\|zui:all | Use none to disable 3D pointer events; Use zui:all to enable; Hidden/invisible elements will receive pointer events unless this attribute is set to none |
| visibility | Hidden\|visible | Use hidden to hide an element; Use visible to make it visible; Visibility has no effect on user input |
| zui:layer | null\|background\|[Alpha-numeric string] | Use the layer attribute to associate an element with a layer in the scene; A null value is associated with the default layer (the foreground); Non-null values that do not equal "background" become overlays |
| zui:informational | true\|false | If true, the node should be ignored by the framework; This is useful for including placement artwork and backgrounds that should not be displayed. |
| zui:internal-node | true\|false | Used to specify the destination for placement swap effects. A group that will act as the destination location for a swap effect should be marked as internal-node = true. |
| preserveAspectRatio | [xMinYMin\|xMidYMin\|xMaxYMin\|xMinYMid\|xMidYMid\|xMaxYMid\|xMinYMax\|xMidYMax\|xMaxYMax\|none] [meet\|slice] | This attribute consists of two enumerated string values with a space between them. The first determines the anchor point for preserving the aspect ratio and the point at which hoverzooms occur (xMidYMid is the typical value); The second determines how to handle scaling (meet is the typical value) See the preserveAspectRatio attribute in the SVG Tiny spec. |
| zui:metadata | MQL expression | An expression in MQL that is evaluated to determine the video to play. Updating variables will cause the xlink:href to change to the evaluated result of the metadata property. If both xlink:href and zui:metadata are present, the zui:metadata specification takes precedence. |

TABLE 18-continued

<zui:video> Tag Attributes

| Attribute | Possible Values | Description |
| --- | --- | --- |
| xlink:href | URL | The URL of the media file to play. This value may be overwritten by the result of the zui:metadata attribute, |
| zui:cursor | URL to a cursor image\|arrow\|hand | Used to specify the cursor image. "arrow" and "hand" are the standard system cursors, which can be specific to an implementation environment. |

Of particular interest among the foregoing XML extensions are the zui:scene element and the zuipath URI. These elements can be used, for example, as core components that form the geographic hierarchy through separate SVG files that are used to make exemplary ZUI's according to these exemplary embodiments. Also noteworthy are the extensions to the g element and zui:transition described above which aid in making the zooming transitions appear as desired. For example, the zooming transitions according to exemplary embodiments animate several things on the screen at once that can be individually controlled. These include, for example, animating a scene's background, foreground, and any overlays independently. For example, according to one exemplary embodiment, the background image of a scene usually doesn't zoom on a transition, the foreground image of a scene almost always zooms in and out, and the overlays associated with a scene zoom out when a user navigates "above" them, but either don't change or disappear when a user zooms in. The zui:layer attribute on the g element described above specifies the layer (background, foreground, or overlay) of its child elements. The zui:transition element describes how the transition animation occurs, e.g., how the camera zooms the foreground layer (rate, interpolation curve), what happens to the background (zoom or fade), and how to animate elements from the source scene to the destination scene. The latter description is how exemplary embodiments specify placement swap effect animations where the cover art image from the bookshelf scene translates and scales down to a location on the detail view—all while the main zooming transition is happening.

As mentioned earlier, the system maintains a scene graph, that is, a type of tree locating scenes in relation to one another, which defines the ZUI. All scenes have parents (except the home scene) and many scenes have children. Scenes may be siblings to one another, i.e., lying at the same level of the tree and sharing a set of parents. The zuipath to a scene instance may reflect the entire tree of parents (using the zuipath: protocol), or may be relative to the scene from which the zuipath is specified (by using the zuichild: protocol). Each scene has a set of bounds and an internal transform used for placing elements within the scene; these amount to a kind of local coordinate space. When scenes are invoked, they are placed in a location relative to other scenes. This placement may occur in real time or be calculated ahead of time for all scenes with the information stored on the server. In either case, when a user moves from one scene to another the transform and the resulting graphical transitions are calculated internally according to the type of transition specified by the developer in the <zui:transition> and <zui:scene_swap> elements. Various standard transition types and swap effects can be defined.

Figure 24:
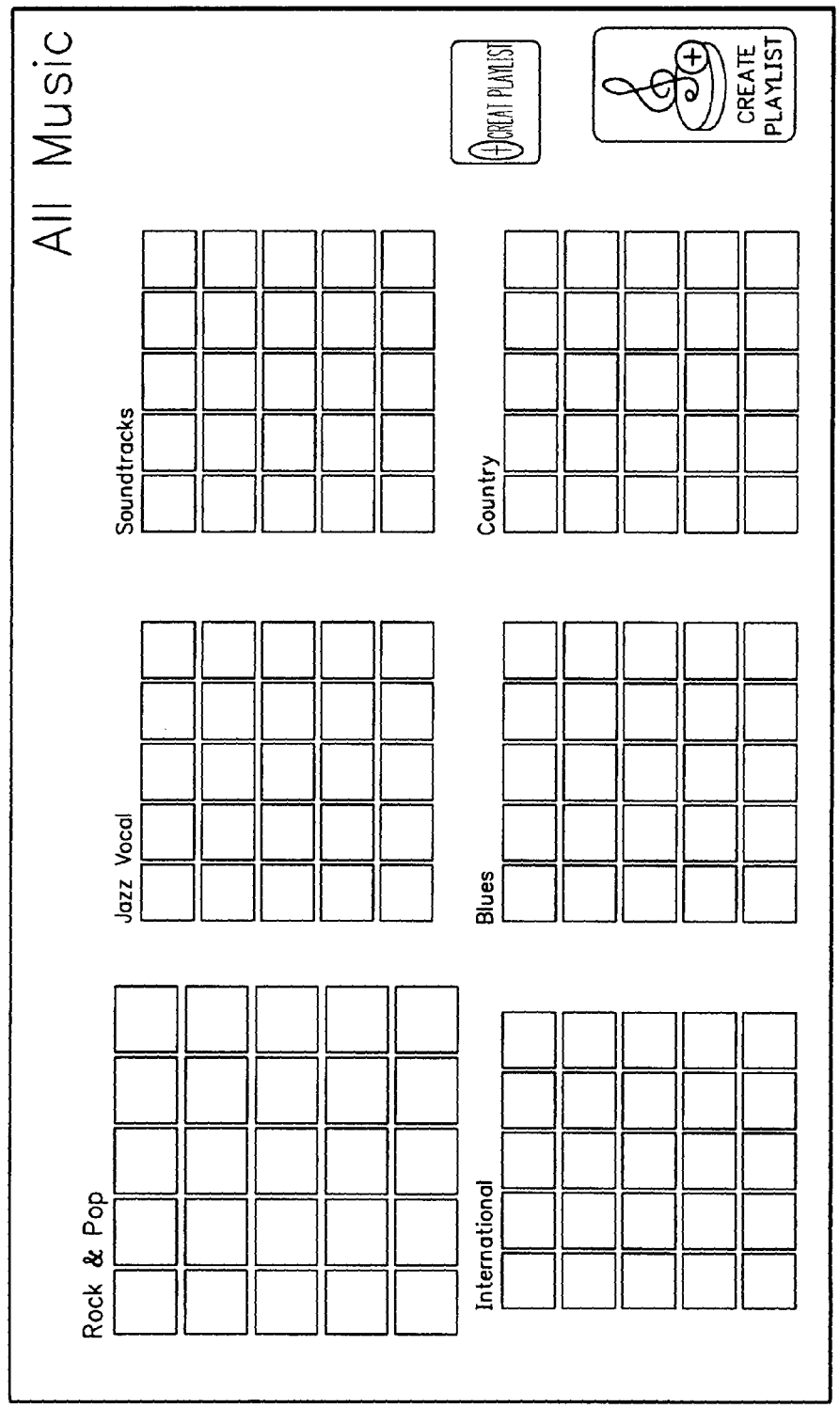
FIG. 24 illustrates a GUI screen drawn using a ZML extensions according to exemplary embodiments of the present invention.

Views within a scene also have locations; these are specified as part of defining the view. Transitions from the entire scene to a view, from view to view, or from view to the entire scene are calculated by the framework based on these locations and the standard effect specifications. The use of the afore-described extensions to SVG to provide programming constructs which are particularly useful in generating zoomable user interfaces, e.g., those described above, will be better understood by considering a purely illustrative example provided below with respect to FIGS. 24-26. FIG. 24 depicts a first zoomable display level of an exemplary user interface associated with music selections. Therein, a GUI screen displays six groups (music shelves) each of which contains 25 selectable music items grouped by category (e.g., 5×5 music cover art images). Each group is implemented as a brick which includes a title hover effect, e.g., as shown in FIG. 24 the user's cursor (not shown) is positioned over the group entitled "Rock & Pop" such that the title of that group and the elements of that group are slightly magnified relative to the other five groups shown on this GUI screen. To generate this GUI screen, the software code associated with this brick is passed a variable named "music" which is a query to the user's music collection with the genre of Rock sorted by title, as illustrated by the highlighted portion of the exemplary software code below.

```
<?xml version="1.0" encoding="UTF-8" standalone="no" ?>
<!DOCTYPE svg PUBLIC "-//W3C//DTD SVG 1.1//EN"
"http://www.w3.org/Graphics/SVG/1.1/DTD/svg11.dtd">
<svg height="720" id="svg" onload="music_shelf_system_onload(evt)" width="1280"
xmlns="http://www.w3.org/2000/svg" xmlns:xlink="http://www.w3.org/1999/xlink"
xmlns:zi="http://ns.hcrest.com/ZuIIllustratorExtensions/1.0"
xmlns:zui="http://ns.hcrest.com/ZUIExtensions/1.0" zui:top="true">
    <script language="javascript" xlink:href="./music_shelf.js"/>
    <g id="bkgd">
        <image height="720" id="musicbkgd" preserveAspectRatio="xMidYMid meet"
transform="matrix(1.000, 0.000, 0.000, 1.000, 1, 0)" width="1280"
xlink:href="../background/hdtv/music_hdtv.png" zui:layer="background"/>
        <text fill="#ffffff" font-family="HelveticaNeue LT 87 Heavy Condensed" font-
size="38" id="glob_121" transform="matrix(0.984, 0.000, 0.000, 1.000, 16, 0)" x="1020"
y="103">
            <![CDATA[All Music]]>
        </text>
```

-continued

```
<zui:brick height="306" id="svg—123" transform="matrix(0.660, 0.000, 0.000, 0.669,
245, 129)" width="262" xlink:href="./brick—shelf.svg" zi:cursorControl="true">
    <zui:variable id="var—0" name="music" value="com.hcrest.music.mds:albums(genres
contains 'Rock & Pop', @sort='title')"/>
</zui:brick>
<zui:brick height="306" id="glob_124" transform="matrix(0.660, 0.000, 0.000,
0.669, 522, 129)" width="262" xlink:href="./brick_shelf.svg">
    <zui:variable id="var_26" name="music" value="com.hcrest.music.mds:albums(genres
contains 'Jazz Vocal', @sort='title')"/>
</zui:brick>
<zui:brick height="306" id="glob_170" transform="matrix(0.660, 0.000, 0.000,
0.669, 245, 391)" width="262" xlink:href="./brick_shelf.svg">
    <zui:variable id="var_78" name="music" value="com.hcrest.music.mds:albums(genres
contains 'International', @sort='title')"/>
</zui:brick>
<zui:brick height="306" id="glob_169" transform="matrix(0.660, 0.000, 0.000,
0.669, 522, 391)" width="262" xlink:href="./brick_shelf.svg">
    <zui:variable id="var_104" name="music"
value="com.hcrest.music.mds:albums(genres contains 'Blues', @sort='title')"/>
</zui:brick>
<zui:brick height="306" id="glob_168" transform="matrix(0.660, 0.000, 0.000,
0.669, 799, 391)" width="262" xlink:href="./brick_shelf.svg">
    <zui:variable id="var_130" name="music"
value="com.hcrest.music.mds:albums(genres contains 'Country', @sort='title')"/>
</zui:brick>
<zui:brick height="365" id="svg_0" transform="matrix(0.660, 0.000, 0.000, 0.660,
799, 127)" width="350" xlink:href="./brick_shelf_soundtrackv2.svg">
    <zui:variable id="var_51" name="music" value="com.hcrest.music.mds:albums(genres
contains 'Soundtracks', @sort='title')"/>
</zui:brick>
</g>
<g id="Layer_3">
<zui:brick height="720" id="playlistBrick" transform="matrix(1.000, 0.000, 0.000,
1.000, 0, -56)" width="1280" xlink:href="../playlistBrick/playlist_brick.svg"
zui:layer="playlistOverlay">
    <zui:variable id="var_156" name="playlistGroup" value="'music'"/>
    <zui:variable id="var_157" name="playlistType" value="'music'"/>
    <zui:variable id="var_158" name="cover_art_field" value="'album.image.uri'"/>
    <zui:variable id="var_159" name="title_field" value="'title'"/>
    <zui:variable id="var_160" name="watch_uri_field" value="'Uri'"/>
</zui:brick>
<g id="screw_you_button_6_state_andjoe">
    <g id="new_slideshow">
        <image height="67" id="new_slideshow_on" preserveAspectRatio="xMidYMid meet"
transform="matrix(0.342, 0.000, 0.000, 1.221, 1071, 376)" width="257"
xlink:href="../playlistBrick/images/create_playlist_normal_over.png"/>
        <image height="65" id="new_slideshow_off" preserveAspectRatio="xMidYMid meet"
transform="matrix(0.342, 0.000, 0.000, 1.221, 1071, 377)" width="257"
xlink:href="../playlistBrick/images/create_playlist_normal.png"/>
    </g>
</g>
<g id="createplaylist" zi:p6Base="createplaylist-off" zi:p6Down="createplaylist-
down" zi:p6Label="true" zi:p6Over="createplaylist-over" zi:p6Sel="createplaylist-sel"
zi:p6SelDown="createplaylist-sel_down" zi:p6SelOver="createplaylist-sel_over">
    <image height="226" id="createplaylist-sel_down" preserveAspectRatio="xMidYMid
meet" transform="matrix(0.734, 0.000, 0.000, 0.734, 1081, 463)" visibility="hidden"
width="124" xlink:href="./images/createplaylist-over.png"/>
    <image height="226" id="createplaylist-sel_over" preserveAspectRatio="xMidYMid
meet" transform="matrix(0.734, 0.000, 0.000, 0.734, 1081, 463)" visibility="hidden"
width="124" xlink:href="./images/createplaylist-over.png"/>
    <image height="226" id="createplaylist-sel" preserveAspectRatio="xMidYMid meet"
transform="matrix(0.734, 0.000, 0.000, 0.734, 1081, 463)" visibility="hidden"
width="124" xlink:href="./images/createplaylist-off.png"/>
    <image height="226" id="createplaylist-down" preserveAspectRatio="xMidYMid meet"
transform="matrix(0.734, 0.000, 0.000, 0.734, 1081, 463)" visibility="hidden"
width="124" xlink:href="./images/createplaylist-over.png"/>
    <image height="226" id="createplaylist-over" preserveAspectRatio="xMidYMid meet"
transform="matrix(0.734, 0.000, 0.000, 0.734, 1081, 463)" visibility="hidden"
width="124" xlink:href="./images/createplaylist-over.png"/>
    <image height="226" id="createplaylist-off" preserveAspectRatio="xMidYMid meet"
transform="matrix(0.734, 0.000, 0.000, 0.734, 1081, 463)" width="124"
xlink:href="./images/createplaylist-off.png"/>
</g>
</g>
</svg>
```

Figure 25:
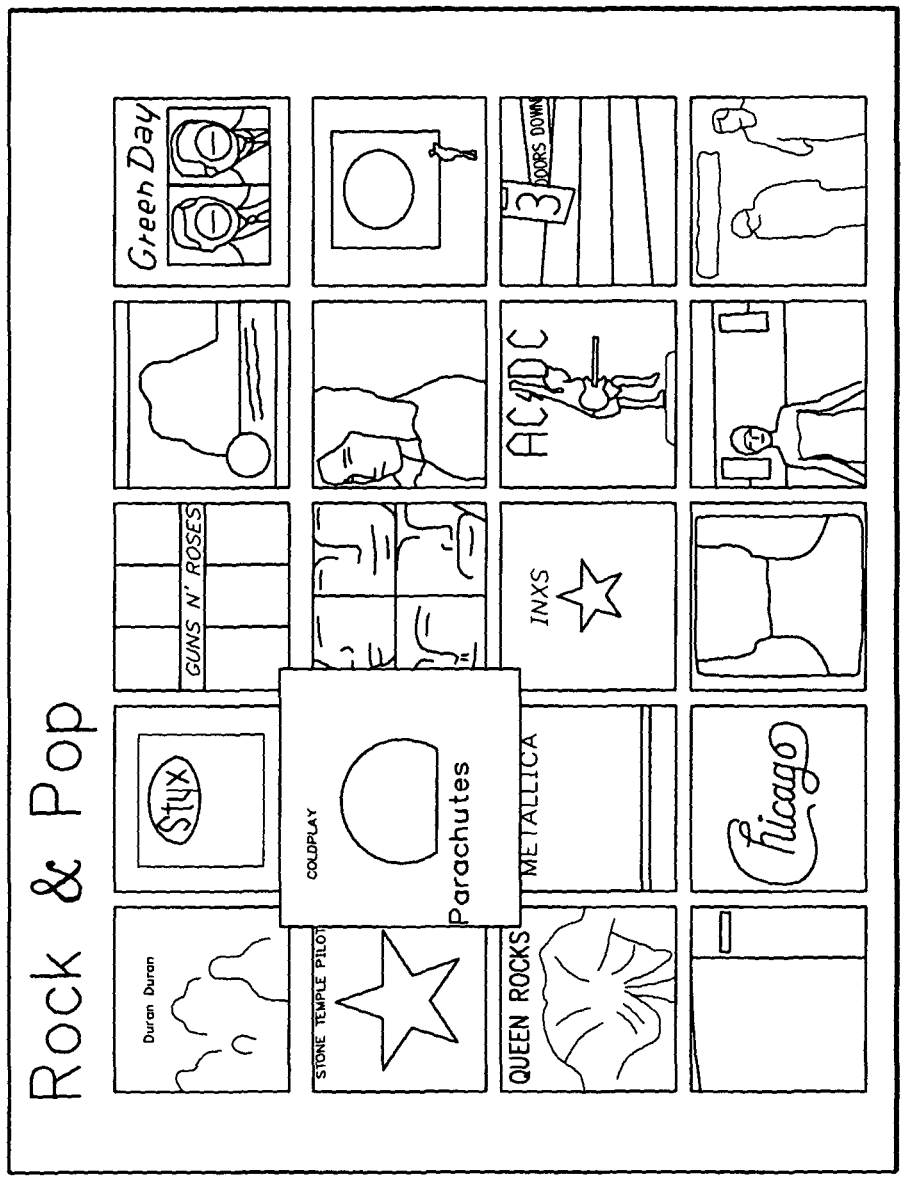
FIG. 25 illustrates a second GUI screen drawn using ZML extensions according to exemplary embodiments of the present invention.

Each ZUI element (cover art image) within each group is also coded as a brick according to exemplary embodiments of the present invention. Thus, as shown in FIG. 25, when a user pauses a cursor over one of the 25 elements within the "Rock&Pop" group, this causes that element (in this example an image of an album cover "Parachutes") to be magnified. Exemplary brick code for implementing this ZUI screen is provided below.

```xml
<?xml version="1.0" encoding="UTF-8" standalone="no" ?>
<!DOCTYPE svg PUBLIC "-//W3C/DTD SVG 1.1//EN" "http://www.w3.org/Graphics/SVG/1.1/DTD/svg11.dtd">
<svg height="365" onload="brick_shelf_system_onload(evt)" width="350" xmlns="http://www.w3.org/2000/svg" xmlns:xlink="http://www.w3.org/1999/xlink" xmlns:zi="http://ns.hcrest.com/ZUIIllustratorExtensions/1.0" xmlns:zui="http://ns.hcrest.com/ZUIExtensions/1.0">
  <script language="javascript" xlink:href="./brick_shelf.js"/>
  <g id="Layer_1">
    <zui:brick height="46" id="svg24" transform="matrix(1.305, 0.000, 0.000, 1.239, 277, 290)" width="47" xlink:href="./albumCoverEffect.svg">
      <zui:variable id="var__0" name="this" value="music[24]"/>
    </zui:brick>
    <zui:brick height="46" id="svg23" transform="matrix(1.305, 0.000, 0.000, 1.239, 210, 290)" width="47" xlink:href="./albumCoverEffect.svg">
      <zui:variable id="var__1" name="this" value="music[23]"/>
    </zui:brick>
    <zui:brick height="46" id="svg22" transform="matrix(1.305, 0.000, 0.000, 1.239, 144, 290)" width="47" xlink:href="./albumCoverEffect.svg">
      <zui:variable id="var__2" name="this" value="music[22]"/>
    </zui:brick>
    <zui:brick height="46" id="svg21" transform="matrix(1.305, 0.000, 0.000, 1.239, 77, 290)" width="47" xlink:href="./albumCoverEffect.svg">
      <zui:variable id="var__3" name="this" value="music[21]"/>
    </zui:brick>
    <zui:brick height="46" id="svg20" transform="matrix(1.305, 0.000, 0.000, 1.239, 11, 290)" width="47" xlink:href="./albumCoverEffect.svg">
      <zui:variable id="var__4" name="this" value="music[20]"/>
    </zui:brick>
    <zui:brick height="46" id="svg19" transform="matrix(1.305, 0.000, 0.000, 1.239, 278, 228)" width="47" xlink:href="./albumCoverEffect.svg">
      <zui:variable id="var__5" name="this" value="music[19]"/>
    </zui:brick>
    <zui:brick height="46" id="svg18" transform="matrix(1.305, 0.000, 0.000, 1.239, 210, 228)" width="47" xlink:href="./albumCoverEffect.svg">
      <zui:variable id="var__6" name="this" value="music[18]"/>
    </zui:brick>
    <zui:brick height="46" id="svg17" transform="matrix(1.305, 0.000, 0.000, 1.239, 144, 228)" width="47" xlink:href="./albumCoverEffect.svg">
      <zui:variable id="var__7" name="this" value="music[17]"/>
    </zui:brick>
    <zui:brick height="46" id="svg16" transform="matrix(1.305, 0.000, 0.000, 1.239, 77, 228)" width="47" xlink:href="./albumCoverEffect.svg">
      <zui:variable id="var__8" name="this" value="music[16]"/>
    </zui:brick>
    <zui:brick height="46" id="svg15" transform="matrix(1.305, 0.000, 0.000, 1.239, 11, 228)" width="47" xlink:href="./albumCoverEffect.svg">
      <zui:variable id="var__9" name="this" value="music[15]"/>
    </zui:brick>
    <zui:brick height="46" id="svg14" transform="matrix(1.305, 0.000, 0.000, 1.239, 278, 165)" width="47" xlink:href="./albumCoverEffect.svg">
      <zui:variable id="var__10" name="this" value="music[14]"/>
    </zui:brick>
    <zui:brick height="46" id="svg13" transform="matrix(1.305, 0.000, 0.000, 1.239, 210, 165)" width="47" xlink:href="./albumCoverEffect.svg">
      <zui:variable id="var__11" name="this" value="music[13]"/>
    </zui:brick>
    <zui:brick height="46" id="svg12" transform="matrix(1.305, 0.000, 0.000, 1.239, 144, 165)" width="47" xlink:href="./albumCoverEffect.svg">
      <zui:variable id="var__12" name="this" value="music[12]"/>
    </zui:brick>
    <zui:brick height="46" id="svg11" transform="matrix(1.305, 0.000, 0.000, 1.239, 77, 165)" width="47" xlink:href="./albumCoverEffect.svg">
      <zui:variable id="var__13" name="this" value="music[11]"/>
    </zui:brick>
    <zui:brick height="46" id="svg10" transform="matrix(1.305, 0.000, 0.000, 1.239, 11, 165)" width="47" xlink:href="./albumCoverEffect.svg">
      <zui:variable id="var__14" name="this" value="music[10]"/>
    </zui:brick>
    <zui:brick height="46" id="svg9" transform="matrix(1.305, 0.000, 0.000, 1.239, 278, 101)" width="47" xlink:href="./albumCoverEffect.svg">
      <zui:variable id="var__15" name="this" value="music[9]"/>
    </zui:brick>
    <zui:brick height="46" id="svg8" transform="matrix(1.305, 0.000, 0.000, 1.239, 210, 101)" width="47" xlink:href="./albumCoverEffect.svg">
      <zui:variable id="var__16" name="this" value="music[8]"/>
    </zui:brick>
```

-continued

```
<zui:brick height="46" id="svg7" transform="matrix(1.305, 0.000, 0.000, 1.239, 144, 101)" width="47"
xlink:href="./albumCoverEffect.svg">
     <zui:variable id="var__17" name="this" value="music[7]"/>
</zui:brick>
<zui:brick height="46" id="svg6" transform="matrix(1.305, 0.000, 0.000, 1.239, 77, 101)" width="47"
xlink:href="./albumCoverEffect.svg">
     <zui:variable id="var__18" name="this" value="music[6]"/>
</zui:brick>
<zui:brick height="46" id="svg5" transform="matrix(1.305, 0.000, 0.000, 1.239, 11, 101)" width="47"
xlink:href="./albumCoverEffect.svg">
     <zui:variable id="var__19" name="this" value="music[5]"/>
</zui:brick>
<zui:brick height="46" id="svg4" transform="matrix(1.305, 0.000, 0.000, 1.239, 278, 36)" width="47"
xlink:href="./albumCoverEffect.svg">
     <zui:variable id="var__20" name="this" value="music[4]"/>
</zui:brick>
<zui:brick height="46" id="svg3" transform="matrix(1.305, 0.000, 0.000, 1.239, 210, 36)" width="47"
xlink:href="./albumCoverEffect.svg">
     <zui:variable id="var__21" name="this" value="music[3]"/>
</zui:brick>
<zui:brick height="46" id="svg2" transform="matrix(1.305, 0.000, 0.000, 1.239, 144, 36)" width="47"
xlink:href="./albumCoverEffect.svg">
     <zui:variable id="var__22" name="this" value="music[2]"/>
</zui:brick>
<zui:brick height="46" id="svg1" transform="matrix(1.305, 0.000, 0.000, 1.239, 77, 36)" width="47"
xlink:href="./albumCoverEffect.svg">
     <zui:variable id="var__23" name="this" value="music[1]"/>
</zui:brick>
<zui:brick height="46" id="svg0" transform="matrix(1.305, 0.000, 0.000, 1.239, 11, 36)" width="47"
xlink:href="./albumCoverEffect.svg">
     <zui:variable id="var__24" name="this" value="music[0]"/>
</zui:brick>
<g id="more" visibility="hidden" zi:p6Base="more-off" zi:p6Down="more-down" zi:p6Label="true" zi:p6Over="more-over"
zi:p6Sel="more-sel" zi:p6SelDown="more-sel__down" zi:p6SelOver="more-sel__over">
     <image height="84" id="more-sel__down" preserveAspectRatio="xMidYMid meet" transform="matrix(0.274, 0.000, 0.000,
0.274, 281, 9)" visibility="hidden" width="213" xlink:href="../movielink/images/homescreen/more-over.png"/>
     <image height="84" id="more-sel__over" preserveAspectRatio="xMidYMid meet" transform="matrix(0.274, 0.000, 0.000,
0.274, 281, 9)" visibility="hidden" width="213" xlink:href="../movielink/images/homescreen/more-over.png"/>
     <image height="84" id="more-sel" preserveAspectRatio="xMidYMid meet" transform="matrix(0.274, 0.000, 0.000, 0.274,
281, 9)" visibility="hidden" width="213" xlink:href="../movielink/images/homescreen/more-off.png"/>
     <image height="84" id="more-down" preserveAspectRatio="xMidYMid meet" transform="matrix(0.274, 0.000, 0.000,
0.274, 281, 9)" visibility="hidden" width="213" xlink:href="../movielink/images/homescreen/more-over.png"/>
     <image height="84" id="more-over" preserveAspectRatio="xMidYMid meet" transform="matrix(0.274, 0.000, 0.000, 0.274,
281, 9)" visibility="hidden" width="213" xlink:href="../movielink/images/homescreen/more-over.png"/>
     <image height="84" id="more-off" preserveAspectRatio="xMidYMid meet" transform="matrix(0.274, 0.000, 0.000, 0.274,
281, 9)" width="213" xlink:href="../movielink/images/homescreen/more-off.png"/>
</g>
<zui:text-rect fill="#ffffff" font-family="HelveticaNeue LT 67 Medium Condensed" font-size="24" height="23" id="genre"
pointer-events="none" width="235" x="10" y="9" zui:metadata="music[0].genres[0]" zui:text-allcaps="original" zui:text-
justification="left">
     <![CDATA[Genre]]>
</zui:text-rect>
<view id="top" viewBox="(-71, -30, 493, 302)" zui:transition="hcrest__view"/>
<a id="top__bounds" xlink:href="#top">
     <rect height="302" id="top__rect__1" width="493" x="-71" y="-30"/>
</a>
<view id="bottom" viewBox="(-71, 97, 493, 302)" zui:transition="hcrest__view"/>
<a id="bottom__bounds" xlink:href="#bottom">
     <rect height="302" id="bottom__rect__1" width="493" x="-71" y="97"/>
</a>
<rect height="188" id="autopan__up" stroke=#ff0000" visibility="hidden" width="399" x="-24" y="-23"/>
<rect height="167" id="autopan__down" stroke="#00ff00" visibility="hidden" width="399" x="-24" y="222"/>
</g>
<zui:scene height="48" id="trans__xx__25" width="47" x="8" xlink:href="music__detail.svg" y="37"/>
<zui:scene height="48" id="trans__xx__26" width="47" x="8" xlink:href="music__detail.svg" y="37"/>
<zui:scene height="48" id="trans__xx__27" width="47" x="8" xlink:href="music__detail.svg" y="37"/>
<zui:scene height="48" id="trans__xx__28" width="47" x="8" xlink:href="music__detail.svg" y="37"/>
<zui:scene height="48" id="trans__xx__29" width="47" x="8" xlink:href="music__detail.svg" y="37"/>
<zui:scene height="48" id="trans__xx__30" width="47" x="8" xlink:href="music__detail.svg" y="37"/>
<zui:scene height="48" id="trans__xx__31" width="47" x="8" xlink:href="music__detail.svg" y="37"/>
<zui:scene height="48" id="trans__xx__32" width="47" x="8" xlink:href="music__detail.svg" y="37"/>
<zui:scene height="48" id="trans__xx__33" width="47" x="8" xlink:href="music__detail.svg" y="37"/>
<zui:scene height="48" id="trans__xx__34" width="47" x="8" xlink:href="music__detail.svg" y="37"/>
<zui:scene height="48" id="trans__xx__35" width="47" x="8" xlink:href="music__detail.svg" y="37"/>
<zui:scene height="48" id="trans__xx__36" width="47" x="8" xlink:href="music__detail.svg" y="37"/>
<zui:scene height="48" id="trans__xx__37" width="47" x="8" xlink:href="music__detail.svg" y="37"/>
```

```
<zui:scene height="48" id="trans_xx_38" width="47" x="8" xlink:href="music_detail.svg" y="37"/>
<zui:scene height="48" id="trans_xx_39" width="47" x="8" xlink:href="music_detail.svg" y="37"/>
</svg>
```

Note that the bolded code in the above example above refers to the 25th element of the variable music which was set up in the parent SVG brick (music_shelf.svg). The prior music query returns up to 25 elements. Then the music element (in this example an album) is passed into the child brick called albumCoverEffect.svg using a variable named "this". The two code snippets above, and corresponding ZUI screens (scenes) of FIGS. 24 and 25, serve to illustrate two beneficial characteristics associated with the reusable extensions to SVG according to exemplary embodiments of the present invention, described herein for use in generating zoomable graphical user interfaces. First, SVG bricks provide a programming construct which provides code that is reusable from GUI screen to GUI screen (scene to scene). In this context, the brick code used to generate the GUI screen of FIG. 24 is reused to generate the GUI screen of FIG. 25. Additionally, the bricks are parameterized in the sense that at least some of the graphical display content which they generate is drawn from metadata, which may change over time. This means that the same program code can be used to generate user interfaces to select, e.g., on demand movies, as those movies change over time and that the content of the user interface portrayed on any given zoom level of an interface according to the present invention may also change accordingly over time.

Figure 26:
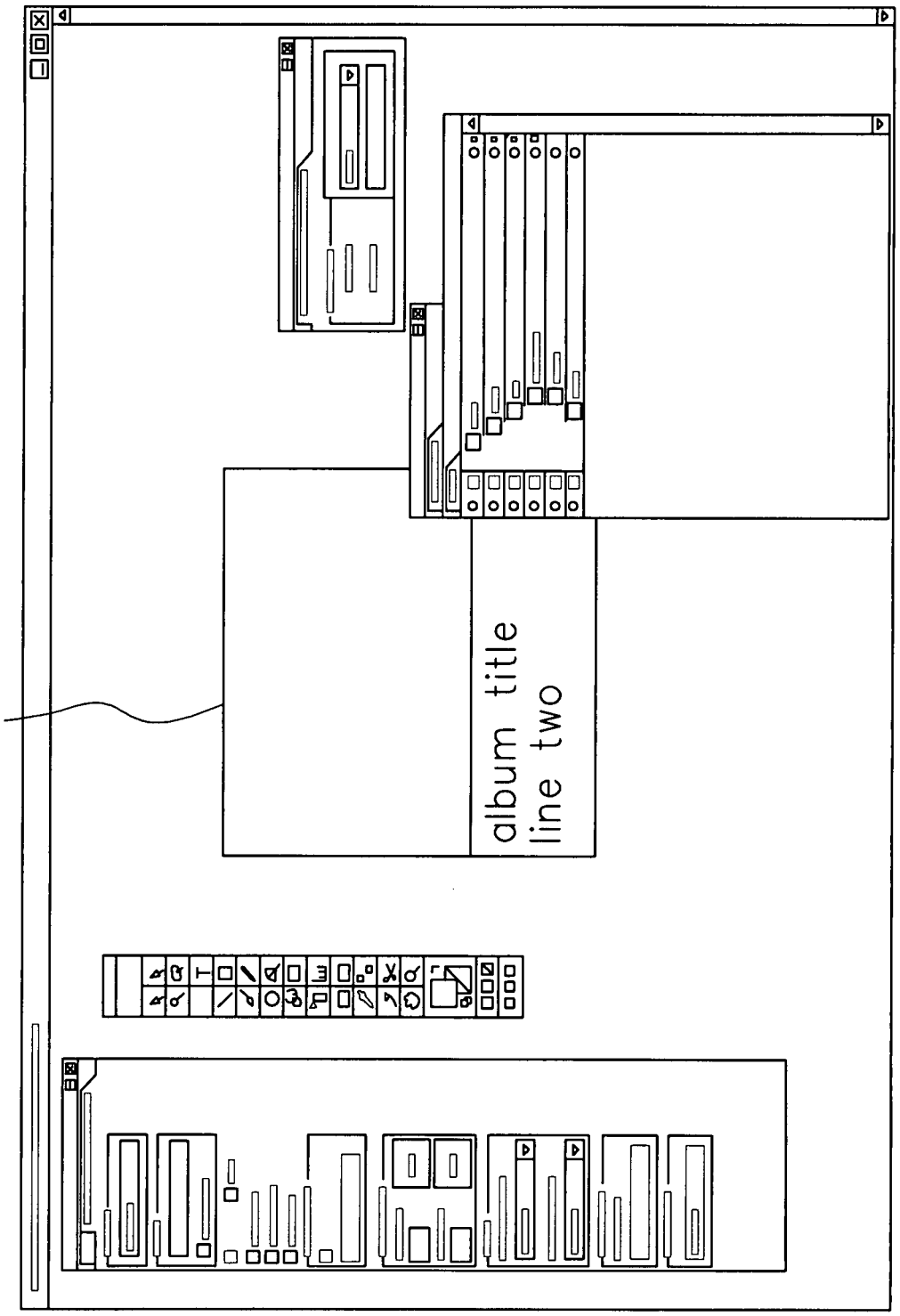
FIG. 26 illustrates a toolkit screen usable to create scenes using ZML extensions according to exemplary embodiments of the present invention.

The brick code itself can be generated using, for example, a visual programming interface (also referred to herein as a "toolkit"), an example of which is illustrated in FIG. 26, wherein a music element 2600 (album cover image brick) is being coded. Some exemplary code associated with this toolkit function is provided below.

```
<?xml version="1.0" encoding="UTF-8" standalone="no" ?>
<!DOCTYPE svg PUBLIC "-//W3C//DTD SVG 1.1//EN"
"http://www.w3.org/Graphics/SVG/1.1/DTD/svg11.dtd">
<svg height="46" onload="albumCoverEffect_system_onload(evt)" width="47"
xmlns="http://www.w3.org/2000/svg" xmlns:xlink="http://www.w3.org/1999/xlink"
xmlns:zi="http://ns.hcrest.com/ZUIIllustratorExtensions/1.0"
xmlns:zui="http://ns.hcrest.com/ZUIExtensions/1.0">
    <script language="javascript" xlink:href="./albumCoverEffect.js"/>
    <g id="layer">
        <a id="anchor_0" xlink:href="zuichild:trans_0">
            <g id="cover">
                <image height="150.00" id="image" preserveAspectRatio="xMidYMid meet"
transform="matrix(0.313, 0.000, 0.000, 0.307, 0.000, -0.050)" width="150.00"
xlink:href="../placeholders/cdcover.png" zui:metadata="this.image.uri"/>
                <g id="title">
                    <rect fill="#000000" height="15" id="rect_0" width="47" x="0" y="31"/>
                    <zui:text-rect fill="#ffffff" font-family="HelveticaNeue LT 67 Medium
Condensed" font-size="6" height="14" id="textrect—0" width="45" x="1" y="32"
zui:metadata="this.title" zui:text-allcaps="original" zui:text-justification="left">
                        <![CDATA[album title
line two]]>
                    </zui:text-rect>
                </g>
            </g>
        </a>
    </g>
    <zui:scene height="46" id="trans_0" transition="trans_0_transition" width="47" x="0"
xlink:href="music_detail.svg" y="0">
        <zui:variable name="this" value="this" usage="musicDetail" />
    </zui:scene>
    <zui:transition id="trans_0_transition" inherits="hcrest_placement_swap_effect">
        <zui:scene-swap cover="cover"/>
    </zui:transition>
</svg>
Also see albumCoverAffect.js This file is a companion file to the SVG. The javascript is what actually creates the title hover effect.
document.include("../scripts/Hoverzoom.js");
document.include("../scripts/Cursor.js");
function albumCoverEffect_user_onload_pre(evt) {
        createCursorController(document.getElementById("cover"));
        createHoverzoomTitleEffect(document.getElementById("cover"),
                        0.400000,
                        250.000000,
                        document.getElementById("title"));
}
// @Toolkit-begin (pseudo-tag for Toolkit-generated code) //
////////////////////////////////////////////////////////
!!! The prior function albumCoverEffect_user_onload_pre is what actually creates the
title hover effect.
/**
* AUTO GENERATED CODE : DO NOT EDIT
*/
```

```
function albumCoverEffect__system__onload(evt) {
        if ("albumCoverEffect__user__onload__pre" in this) {
                albumCoverEffect__user__onload__pre(evt);
        }
        if ("albumCoverEffect__user__onload__post" in this) {
                albumCoverEffect__user__onload__post(evt);
        }
}
// @Toolkit-end (pseudo-tag for Toolkit-generated code) //
//////////////////////////////////////////////////////////
```

In the bolded portion of the above software code example, there is an element called "cover". The cover element is the image metadata associated with the album cover to be portrayed by this brick at a particular location on the GUI screen. Also note therein the program line that says "zui:metadata='this.image.uri'". This was setup in the first code example (parent SVG) which is the album of interest, i.e., the album is passed into this brick and the associated cover art is referenced by this variable.

Another example will serve to further illustrate how the foregoing described extensions to SVG can be used to generate ZUIs according to exemplary embodiments of the present invention. Consider the example in FIG. 27 which depicts a visual menu screen that provides users with access to various settings functions. This "Settings" scene can be reached from, for example, the home scene shown in FIG. 5 by clicking the settings icon, and displays a set of graphics that function as buttons, each linked to a different setting option in its own scene. The following extended SVG program code can be used, according to a purely illustrative exemplary embodiment, to generate the scene illustrated in FIG. 27.

```
1:  <?xml version="1.0" encoding="UTF-8" standalone="no" ?>
2:  <!DOCTYPE svg PUBLIC "-//W3C//DTD SVG 1.1//EN"
    "http://www.w3.org/Graphics/SVG/1.1/DTD/svg11.dtd">    // boilerplate
3:
4:  <svg height="720" onload="index__1280x720__system__onload(evt)" width="1280"
       xmlns="http://www.w3.org/2000/svg"
       xmlns:xlink="http://www.w3.org/1999/xlink"
       xmlns:zi="http://ns.hcrest.com/ZUIIllustratorExtensions/1.0"
       xmlns:zui="http://ns.hcrest.com/ZUIExtensions/1.0">
5:
6:  <script language="javascript" xlink:href="./index__1280x720.js"/>
7:
8:  <g id="bgLayer">
9:  <image height="720" id="image__0" preserveAspectRatio="xMidYMid meet"
                transform="matrix(1.000, 0.000, 0.000, 1.000, 0, 0)" width="1280"
                xlink:href="./images/bg__16x9.png" zui:layer="background"/>
10:</g>
11:
12:<g id="iconLayer">
13:     <a id="anchor__1" xlink:href="zuichild:trans__1">
14:             <image height="188" id="image__1" preserveAspectRatio="xMidYMid meet"
                        transform="matrix(1.000, 0.000, 0.000, 1.000, 395, 393)"
                        width="238" xlink:href="./images/alerts.png"
                        zi:cursorControl="true" zi:hzDuration="250.000"
                        zi:hzScale="0.200"/>
15:     </a>
16:     <a id="anchor__2" xlink:href="zuichild:trans__2">
17:             <image height="188" id="image__2" preserveAspectRatio="xMidYMid meet"
                        transform="matrix(1.000, 0.000, 0.000, 1.000, 395, 185)"
                        width="238" xlink:href="./images/channelLineup.png"
                        zi:cursorControl="true" zi:hzDuration="250.000"
                        zi:hzScale="0.200"/>
18:     </a>
19:     <a id="anchor__3" xlink:href="zuichild:trans__3">
20:             <image height="188" id="image__3" preserveAspectRatio="xMidYMid meet"
                        transform="matrix(1.000, 0.000, 0.000, 1.000, 144, 185)"
                        width="238" xlink:href="./images/displaySettings.png"
                        zi:cursorControl="true" zi:hzDuration="250.000"
                        zi:hzScale="0.200"/>
21:     </a>
22:
23:// anchors 4 – 7 omitted; similar to 1–3 and 8
24:
25:     <a id="anchor__8" xlink:href="zuichild:trans__8">
26:             <image height="188" id="image__8" preserveAspectRatio="xMidYMid meet"
                        transform="matrix(1.000, 0.000, 0.000, 1.000, 899, 393)"
                        width="238" xlink:href="./images/setupWizard.png"
                        zi:cursorControl="true" zi:hzDuration="250.000"
                        zi:hzScale="0.200"/>
27:     </a>
28:
```

```
29:// This text rect displays the scene title, with fixed date
30:     <zui:text-rect fill="#e8e6d5" font-family="HelveticaNeue LT 87 Heavy
              Condensed" font-size="48" height="52" id="textrect_0" width="225"
              x="982" y="55" zui:text-allcaps="original" zui:text-
              justification="left">
31:
32:     <![CDATA[Settings]]> // Fixed text to display in the text rect
33:     </zui:text-rect>
34:</g>
35:
36:     <zui:scene height="188" id="trans_1" transition="trans_1_transition"
              width="238" x="395"
              xlink:href="../hcrest.ux.alerts.settings/index_1280x720.svg"
              y="393"/>
37:
38:     <zui:transition id="trans_1_transition" inherits="hcrest_swap_effect">
39:         <zui:scene-swap cover="image_1"/>
40:     </zui:transition>
41:// scene tag for the Guide settings scene
42:     <zui:scene height="188" id="trans_2" transition="trans_2_transition"
              width="238" x="395"
              xlink:href="../hcrest.ux.tvGuide.settings/index_1280x720.svg"
              y="185"/>
43:// transition into the Guide settings scene
44:     <zui:transition id="trans_2_transition" inherits="hcrest_swap_effect">
45:         <zui:scene-swap cover="image_2"/>
46:     </zui:transition>
47:     <zui:scene height="188" id="trans_3" transition="trans_3_transition"
              width="238" x="144" xlink:href="./display/display_1280x720.svg"
              y="185"/>
48:
49:     <zui:transition id="trans_3_transition" inherits="hcrest_swap_effect">
50:         <zui:scene-swap cover="image_3"/>
51:     </zui:transition>
52:// ....scenes and transitions 4 through 7 omitted
53:
54:     <zui:scene height="188" id="trans_8" transition="trans_8_transition"
              width="238" x="899"
              xlink:href="../hcrest.ux.settings/wizard/wizard_1280x720.svg"
              y="393"/>
55:
56:     <zui:transition id="trans_8_transition" inherits="hcrest_swap_effect">
57:         <zui:scene-swap cover="image_8"/>
58:     </zui:transition>
59:
60:</svg>
```

Some description of the afore-described exemplary program code will further illuminate the manner in which the afore-described exemplary extensions to SVG can be used to create ZUIs according to exemplary embodiments of the present invention. Therein, program code lines 1-2 declare the doctype and invoke the SVG definitions. These can, for example, be generated by the toolkit and appear in all ZVG/ZML files. The <zi> namespace contains extensions used for toolkit-generated code, while the <zui> namespace contains framework extensions. Program code line 4 is the <svg> tag. Also generated by the toolkit, the <svg> tag establishes the size limits (in user coordinate space) of the SVG file, invokes the custom namespaces required by ZML, and sets up an onload function to be executed in a JavaScript file. These namespaces can be declared as standard URLs with http:// notation. Program code line 60: at the end of the file closes the SVG file with an </svg> tag.

Figure 27:
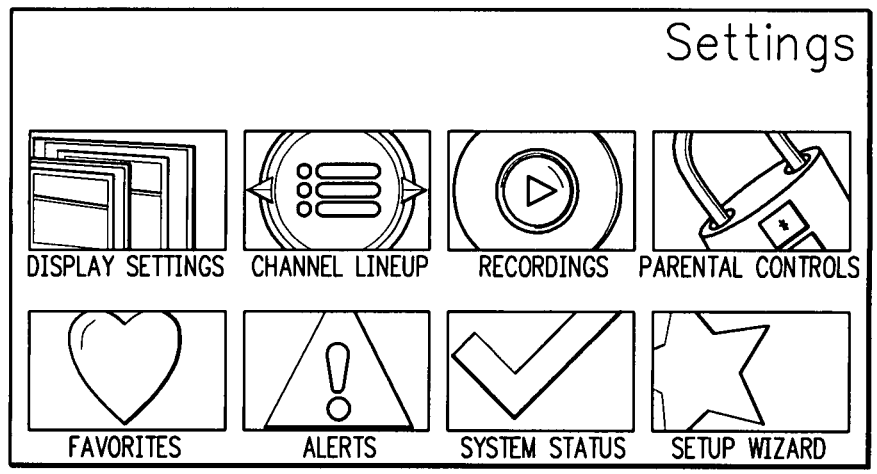
FIG. 27 illustrates a scene drawn using ZML extensions according to another exemplary embodiment of the present invention.

Program code line 6, generated by the toolkit, links this SVG file to a JavaScript file (not illustrated) that provides its script and interactivity. According to this example, the main script file shares the name of the SVG file, but appends the .js extension and resides in the same directory as the SVG file such that the xlink:href can be expressed in relative notation, as here. Program code lines 8-10 above create the background over which the various settings icons shown in FIG. 27 are rendered, as the id attribute implies. The <g> tag encloses an <image> tag that displays the actual background (no background image is shown in FIG. 27). It is the same size as the SVG, and uses an image file located in an images directory under the main directory for this scene, again following convention and using relative notation. The zui:layer="background" attribute places the image on the background layer. By default the image is visible and captures pointer events.

Program code lines 12-34 set up and display the icon layer group (id="iconlayer"). This is the set of clickable items in the scene, e.g., a button labeled "Display Settings", a second button labeled "Channel Lineup", etc., each of which is set down as an anchor (<a> tag) with similar properties and which form a single layer. Consider the first anchor in the program code in detail, set forth in program code lines 13-15, and excerpted below.

```
13:<a id="anchor_1" xlink:href="zuichild:trans_1">
14:    <image height="188" id="image_1" preserveAspectRatio=
          "xMidYMid meet" transform="matrix(1.000, 0.000, 0.000,
          1.000, 395, 393)" width="238" xlink:href=
          "./images/alerts.png" zi:cursorControl="true"
          zi:hzDuration="250.000" zi:hzScale="0.200"/>
15:</a>
```

Therein, program code line 13 opens the anchor tag, gives it an id ("anchor_1") that can be used to refer to the anchor, and establishes the destination. The destination is a scene referred to by its id ("trans_1"). That ID belongs to the scene tag at line 36: So a user who selects this anchor, i.e., clicks on this displayed button, will go to the scene named in the xlink:href attribute of the scene tag which is ../hcrest.ux.alerts.settings/index_1280x720.svg. Because the xlink:href attribute of the anchor includes the "zuichild" prefix, the link will go to the new scene as a child of this scene, meaning that the new tree is placed in the existing scene tree below this scene and shares a variable scope with the parent scene. The <image> tag in program code line 14 displays the graphic that acts as the button, which is found in the images subdirectory of the directory of this SVG file. Other attributes of the image tag can be created by the toolkit. The three "zi:" attributes relate to the hoverzoom effect associated with cursor interaction with this button in the ZUI. Using toolkit defaults, the programmer set up this image so that when the cursor is positioned over this button, the button image will increase in size by 20% and stay enlarged for 250 milliseconds. The hoverzoom effect is illustrated, for example, in FIG. 20 and described above.

Program code lines 36-58 place the subscenes and define the transition from the main scene to each one. Consider the second subscene/transition pair, detailed above in program code lines 42-46 and excerpted below.

```
42:<zui:scene height="188" id="trans_2" transition="trans_2_transition"
     width="238" x="395"
     xlink:href="../hcrest.ux.tvGuide.settings/
     index_1280x720.svg" y="185"/>
43:
44:<zui:transition id="trans_2_transition"
inherits="hcrest_swap_effect">
45:    <zui:scene-swap cover="image_2"/>
46:    </zui:transition>
```

Figure 28:
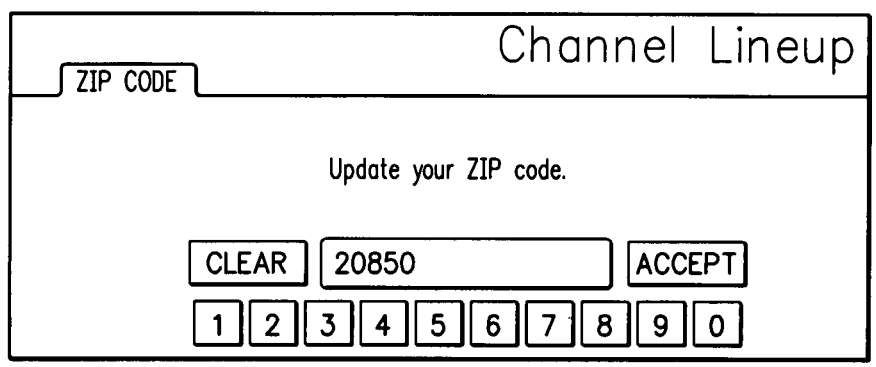
FIG. 28 depicts a subscene of the scene depicted in FIG. 27 drawn using ZML extensions according to an exemplary embodiment of the present invention.

This portion of the program code defines what will occur if the user positions a cursor over the "Channel Lineup" button shown in FIG. 27 and executes a click command (or other selection input). Therein, program code line 42: is the scene tag for the new scene that will be rendered when the "Channel Lineup" button is actuated by a user. FIG. 28 illustrates the subscene that will be rendered using this exemplary program code. This scene tag defines the scene dimensions, names the file where the scene SVG file is stored, using relative notation for the path to the SVG file. The directory name indicates the scene function while the filename follows the convention of naming the main scene SVG "index" concatenated with a reference to the display size for which the SVG was designed. The transition attribute indicates that the transition with id "trans_2_transition" will be used when moving from the current scene (FIG. 27) into the subscene (FIG. 28). That transition is defined in the transition tag in lines 44:-46: Along with the id, the transition inherits a standard swap effect ("hcrest_swap_effect") defined as part of the framework. The "cover" attribute of the zui:scene-swap tag defines which image will be used as the destination location for the effect.

Figure 29:
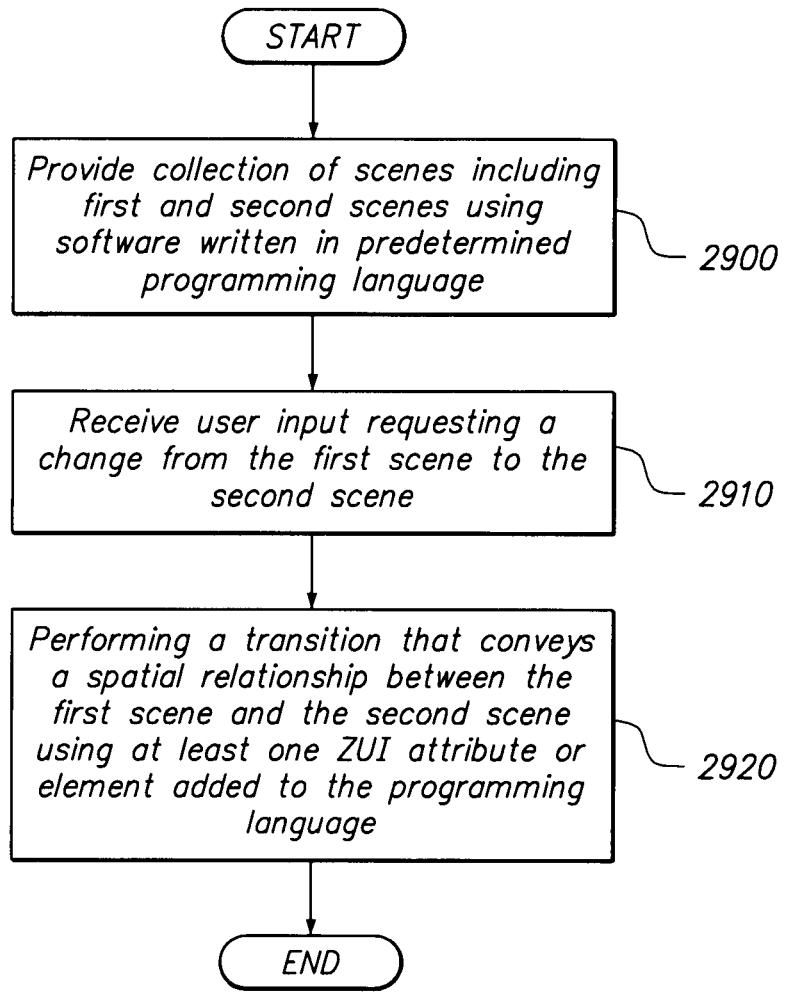
FIG. 29 is a flowchart illustrating a method for displaying scenes according to an exemplary embodiment of the present invention.

It will be appreciated based upon the foregoing discussion that exemplary embodiments of the present invention extend programming languages, e.g., SVG, and leverage those extensions to facilitate the creation and usage of ZUIs. Thus, a generalized method for displaying scenes on a zoomable user interface (ZUI) includes the steps illustrated in the flowchart of FIG. 29. Therein, a collection of scenes on is provided for display on the ZUI including a first scene and a second scene, (e.g., FIGS. 18 and 24, respectively) each of the scenes being implemented using software written in a programming language (e.g., SVG) at step 2900. When a user input is received that requests a change from the first scene to the second scene (step 2910), a transition is performed which conveys a spatial relationship between the first scene and the second scene (e.g., using zooming and/or panning) at step 2920. The transition is implemented using at least one ZUI attribute or element added to the programming language, e.g., the layer attribute added to the grouping tag or the zui:scene-swap element as described above.

According to exemplary embodiments of the present invention, events are used to drive the system. For example, there are can be two types of events: input events and scene events. Input events are those generated by the user, such as cursor movement, button clicks, and scroll wheel movements and are sometimes referred to herein as "user events". Scene events are generated by the framework and exposed to the JavaScript, e.g., when the user is entering or leaving a scene. An event is created (thrown), either by the system or in the code and then the event is received and processed. According to exemplary embodiments of the present invention, events can be caught by, for example, (1) setting up an event listener (attached to a ZUI element) and executing the function named in the event listener, (2) using a handleEvent function, or (3) using the onevent attributes. For example, to capture all mouseup events on an element, the attribute onmouseup="myfunction (event)" can be added in the SVG file or set from JavaScript using setAttribute. To receive a pointer event, an element can have its pointer-events attribute set to zui:all. Otherwise the event is passed to any element under that element, to the brick or scene if there is no element underneath or that element does not handle pointer events. Some pointer events are handled by the system framework rather than in JavaScript. For example, when users click the right mouse button or the back button, the framework takes care of sending the user to the previous scene.

The majority of events processed in the system are user-generated events such as mouse clicks, scroll wheel movements, mouse movements, and keystrokes. Table 19 lists input events according to an exemplary embodiment of the present invention. A ZUI element receives pointer events (e.g., 2D or 3D pointer inputs) if its pointer-events attribute is set to "zui:all".

TABLE 19

| Event Name | Description |
| --- | --- |
| focusin | An object has received the focus (based on user inputs via, e.g., the 3D pointing device) |
| focusout | An object has lost the focus. |
| keyup | A key on the (physical) keyboard is released. |
| mouseup | User has released the mouse/loop button or the scrollwheel over an object. |
| mouse2up | User has released the scroll wheel button. |
| mousedown | User has pressed a mouse/loop button. |
| mousedrag | User has moved the mouse while an object is selected |
| mousemove | User has moved the mouse/loop and thus the cursor. |
| mouseout | Cursor is no longer over an object it formerly was over. |
| mouseover | Cursor is over an object. |
| scrollwheel | User has rotated the scroll wheel. |
| wheel | User has rotated the scroll wheel |
| activated | Pointer click/maybe up maybe down depending on situation - result is object is selected. |
| selected | Pointer click/maybe up maybe down depending on situation - result is object is selected |

These events are generated automatically by the system and sent for processing. For pointer/cursor events, the event is sent first to the relevant element (the element over which the mouse was pressed, for example). If pointer-events was set to zui:all for that element and if that element has an event listener, the function named in the event listener or the element's handleEvent function runs.

Another significant extension to the SVG programming language discussed above involves variables, variable dependencies and associated asynchronous processing. ZML variables according to exemplary embodiments of the present invention are assigned and updated asynchronously. This prevents execution from stalling while server-dependent variables are resolved behind the scenes. Variable values can, for example, be changed in these ways:

TABLE 20

Ways to Change Variable Values

| | |
|---|---|
| <zui:variable>value attribute: | At creation time, in the SVG. The value attribute may be an expression. If the expression includes another variable, a dependency is set up, and the zui:variable is updated whenever the variable it depends on changes. |
| assignZuiVariable: | At any time, in the JavaScript. Breaks any previous dependency; sets up a new one if the variable is assigned to an expression including another variable. |
| zui:metadata: | When a zui:text-rec or other element that displays text is created it may display text that is based on meta-data via some expression; when the meta-data changes (probably as a result of JavaScript statements being executed), the displayed text changes asynchronously in response. |
| processAsynch: | The expression resolved may result in updating one or more variables (asynchronously). So can the function called. Any variables that depend on the changed variables will change (asynchronously) as well when the dependency fires. |
| addValueChangeListener: | When a variable changes, the function specified for execution via addValueChangeListener may include setting variables. |
| addMetadataChangeListener: | When underlying metadata changes, the function specified for execution via addMetadataChangeListener may include setting variable values. |

To set the value of a variable directly after the variable is created, a programmer of a ZUI according to exemplary embodiments can use the assignZuiVariable statement. When an assignZuiVariable statement is encountered, the variable is set to that value as soon as possible and any callback function is executed without waiting for server-dependent data. Similarly, any other statement that changes a variable value is preferably carried out as soon as possible.

According to exemplary embodiments of the present invention, variables used in ZUI program code are scoped. Variable scopes are created by the tags <svg>, <zui:scene> and <zui:brick>, which were described above. Thus, all variables created will have a scope defined by the <svg> tag that they were created under. Any sub-scopes created by the <svg> tag, the <zui:scene> tag, or the <zui:brick> tag will have access to these variables. This is because variable lookup starts in the local scope and then moves up through the parents until the variable identifier of interest is found for the first time, or the lookup runs out of parents. An identifier is in scope if it exists in the current scope or any of the parent scopes. Thus, when a zuiVariable is created, its scope is set to the current scope, which defaults to the innermost element where the variable is defined. For example, if the zui:variable tag is within a brick, the variable is accessible and meaningful only within the scope of that brick and any bricks the brick invokes. Alternatively, if the tag is within a <scene> tag, the variable is accessible and meaningful within that scene and any other scenes or bricks also enclosed within the parent scene. Moreover, variable scopes according to these exemplary embodiments are inherited. This means that any code executed within, for example, the brick that refers to a zuiVariable defined in the enclosing SVG program code can successfully access that zuiVariable.

Although the foregoing exemplary embodiments are described in terms of extensions to SVG which facilitate the generation of ZUIs, those skilled in the art will appreciate that the present invention is not so limited. Similar extensions can be made to other programming languages used to create ZUIs including, but not limited to, HTML, non-SVG versions of XML, Flash and the like. Moreover, it will be understood that the phrase "zoomable user interface" and its acronym "ZUI" are intended to refer herein to user interfaces which employ zooming and/or camera zooming transitions between at least some of the scenes within the user interface. Similarly, the phrase "spatial relationship" as it refers to navigation between scenes in a user interface is intended to refer to any such relationship including, but not limited to, lateral relationships, depth relationships, etc.

Systems and methods for processing data according to exemplary embodiments of the present invention can be performed by one or more processors executing sequences of instructions contained in a memory device. Such instructions may be read into the memory device from other computer-readable mediums such as secondary data storage device(s). Execution of the sequences of instructions contained in the memory device causes the processor to operate, for example, as described above. In alternative embodiments, hard-wire circuitry may be used in place of or in combination with software instructions to implement the present invention.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A zoomable user interface (ZUI) apparatus, comprising:
a data storage configured to store a collection of scenes displayable on a ZUI, each of said scenes being implemented using software written in a programming language;
an event capture mechanism configured to identify user inputs related to said ZUI, including a user input for requesting a change from a first scene to a second scene different from said first scene in said collection of scenes; and
a controller configured to control the ZUI to display a transition from said first scene to said second scene, said transition conveying a spatial relationship between said first scene and said second scene within said ZUI,
wherein a manner in which said transition is displayed is implemented by at least one ZUI attribute or element included in said software written in said programming language and associated with said first scene or said second scene.

2. The ZUI apparatus of claim 1, wherein said programming language is one of SVG, HTML, XML and Flash.

3. The ZUI apparatus of claim 1, wherein said at least one ZUI attribute or element is a metadata attribute added to at least one of a hyperlink tag and an image tag.

4. The ZUI apparatus of claim 1, wherein said at least one ZUI attribute or element is a duration attribute added to a hyperlink tag.

5. The ZUI apparatus of claim 1, wherein said at least one ZUI attribute or element is a layer attribute added to at least one of a grouping tag and an image tag, a rectangle tag, said layer attribute associating an element with a layer in a scene.

6. The ZUI apparatus of claim 1, wherein said at least one ZUI attribute or element is an internal node attribute added to at least one of a grouping tag and an image tag, rectangle tag, said internal node attribute specifying a destination for placement swap effects.

7. The ZUI apparatus of claim 1, wherein said at least one ZUI attribute or element is a cursor attribute added to at least one of a grouping tag and an image tag, rectangle tag, said cursor attribute identifying a cursor image.

8. The ZUI apparatus of claim 1, wherein said at least one ZUI attribute or element is an informational attribute added to at least one of a grouping tag, an image tag, and a rectangle tag, said informational attribute indicating whether said ZUI should ignore a particular node.

9. The ZUI apparatus of claim 1, wherein said at least one ZUI attribute or element is a top attribute added to a script element, said top attribute indicating whether said ZUI should bypass a particular scene when navigating to a top scene in said ZUI.

10. The ZUI apparatus of claim 1, wherein said at least one ZUI attribute or element is a transition attribute added to a view element, said transition attribute specifying a manner in which a transition into a view of said ZUI will occur.

11. The ZUI apparatus of claim 1, wherein said at least one ZUI attribute or element is a background transition element which specifies a manner in which a background will transition from a first background associated with a current scene to a second background associated with a scene to which the ZUI is zooming.

12. The ZUI apparatus of claim 11, wherein said background transition element includes at least one of:
an effect attribute which specifies an effect to run during a background transition,
an effect start attribute which specifies when said effect is to begin during said background transition,
an effect end attribute which specifies when said effect is to end during said background transition,
a start attribute which specifies when said first background is to begin being swapped with said second background,
an end attribute which specifies when said first background is to end being swapped with said second background and
an inherits attribute which specifies which element the background transition is to inherit behavior from.

13. The ZUI apparatus of claim 1, wherein said at least one ZUI attribute or element is a brick tag element, said brick tag element indicating that another file is to be inserted into a scene at a specified location.

14. The ZUI apparatus of claim 13, wherein said brick tag element includes at least one of:
a width attribute, a height attribute, a transform attribute, a pointer-events attribute, a visibility attribute, a link attribute, a layer attribute and a cursor attribute.

15. The ZUI apparatus of claim 1, wherein said at least one ZUI attribute or element is a clip rectangle element, said clip rectangle element specifying that child scenes are clipped to said clip rectangle element's bounds.

16. The ZUI apparatus of claim 15, wherein said clip rectangle element includes at least one of:
an x position attribute, a y position attribute, a width attribute, a height attribute, a transform attribute, a pointer-events attribute, a visibility attribute, a layer attribute, an informational attribute and an internal node attribute.

17. The ZUI apparatus of claim 1, wherein said at least one ZUI attribute or element is a scene element, said scene element specifying that said ZUI is to place a scene as a child of a current scene.

18. The ZUI apparatus of claim 17, wherein said scene element includes at least one of:
an x position attribute, a y position attribute, a width attribute, a height attribute, a link attribute and a transition attribute, wherein said transition attribute specifies a type of transition effect to use for a subscene.

19. The ZUI apparatus of claim 1, wherein said at least one ZUI attribute or element is a scene swap element, said scene swap element sets up transition effects between a first scene and a second scene of said ZUI.

20. The ZUI apparatus of claim 19, wherein said scene swap element includes at least one of: a cover attribute which identifies an element to use in a scene swap effect, a start attribute which specifies when said first scene is to begin being swapped with said second scene, an end attribute which specifies when said scene background is to finish being swapped with said second scene and an inherits attribute which specifies which element the scene swap transition is to inherit behavior from.

21. The ZUI apparatus of claim 1, wherein said at least one ZUI attribute or element is a text rectangle element, said text rectangle element specifying bounds in which to render text in said ZUI.

22. The ZUI apparatus of claim 21, wherein said text rectangle element includes at least one of:
an x position attribute, a y position attribute, a width attribute, a height attribute, a font-family attribute, a fill attribute, a font-size attribute, a pointer-events attribute, a visibility attribute, a preserve aspect ratio attribute, a metadata attribute, a layer attribute, an informational attribute, an internal node attribute, a text justification attribute, a text allcaps attribute, a minimum font size attribute and a cursor attribute.

23. The ZUI apparatus of claim 1, wherein said at least one ZUI attribute or element is a transition element, said transition element specifies a parent node for transition parameter elements.

24. The ZUI apparatus of claim 23, wherein said transition element includes at least one of:
a duration attribute, a history attribute, a background-zoom attribute, and an inherits attribute.

25. The ZUI apparatus of claim 1, wherein said at least one ZUI attribute or element is a video element, said video element specifies a node capable of playing video and other multimedia content.

26. The ZUI apparatus of claim 25, wherein said video element includes at least one of:
an x position attribute, a y position attribute, a width attribute, a height attribute, a state attribute, a playback rate attribute, a feed attribute, a pointer-events attribute, a visibility attribute, a layer attribute, an informational attribute, an internal node attribute, a preserve aspect ration attribute, a metadata attribute, a link attribute and a cursor attribute.

27. A method for displaying scenes on a zoomable user interface (ZUI) comprising:
providing a collection of scenes for display on said ZUI, each of said scenes being implemented using software written in a programming language;
identifying user inputs related to said ZUI, including a user input for requesting a change from a first scene to a second scene; and
transitioning from said first scene to said second scene, while conveying a spatial relationship between said first scene and said second scene within said ZUI,
wherein a manner in which said transitioning step is performed is implemented by at least one ZUI attribute or element included in said software written in said programming language and associated with said first scene or said second scene.

28. The method of claim 27, wherein said programming language is one of SVG, HTML, XML and Flash.

29. The method of claim 27, wherein said at least one ZUI attribute or element is a metadata attribute added to at least one of a hyperlink tag and an image tag.

30. The method of claim 27, wherein said at least one ZUI attribute or element is a duration attribute added to a hyperlink tag.

31. The method of claim 27, wherein said at least one ZUI attribute or element is a layer attribute added to at least one of a grouping tag and an image tag, a rectangle tag, said layer attribute associating an element with a layer in a scene.

32. The method of claim 27, wherein said at least one ZUI attribute or element is an internal node attribute added to at least one of a grouping tag and an image tag, rectangle tag, said internal node attribute specifying a destination for placement swap effects.

33. The method of claim 27, wherein said at least one ZUI attribute or element is a cursor attribute added to at least one of a grouping tag and an image tag, rectangle tag, said cursor attribute identifying a cursor image.

34. The method of claim 27, wherein said at least one ZUI attribute or element is an informational attribute added to at least one of a grouping tag, an image tag, and a rectangle tag, said informational attribute indicating whether said ZUI should ignore a particular node.

35. The method of claim 27, wherein said at least one ZUI attribute or element is a top attribute added to a script element, said top attribute indicating whether said ZUI should bypass a particular scene when navigating to a top scene in said ZUI.

36. The method of claim 27, wherein said at least one ZUI attribute or element is a transition attribute added to a view element, said transition attribute specifying a manner in which a transition into a view of said ZUI will occur.

37. The method of claim 27, wherein said at least one ZUI attribute or element is a background transition element which specifies a manner in which a background will transition from a first background associated with a current scene to a second background associated with a scene to which the ZUI is zooming.

38. The method of claim 37, wherein said background transition element includes at least one of:
an effect attribute which specifies an effect to run during a background transition, an effect start attribute which specifies when said effect is to begin during said background transition, an effect end attribute which specifies when said effect is to end during said background transition, a start attribute which specifies when said first background is to begin being swapped with said second background, an end attribute which specifies when said first background is to end being swapped with said second background and an inherits attribute which specifies which element the background transition is to inherit behavior from.

39. The method of claim 27, wherein said at least one ZUI attribute or element is a brick tag element, said brick tag element indicating that another file is to be inserted into a scene at a specified location.

40. The method of claim 39, wherein said brick tag element includes at least one of:
a width attribute, a height attribute, a transform attribute, a pointer-events attribute, a visibility attribute, a link attribute, a layer attribute and a cursor attribute.

41. The method of claim 27, wherein said at least one ZUI attribute or element is a clip rectangle element, said clip rectangle element specifying that child scenes are clipped to said clip rectangle element's bounds.

42. The method of claim 41, wherein said clip rectangle element includes at least one of:
an x position attribute, a y position attribute, a width attribute, a height attribute, a transform attribute, a pointer-events attribute, a visibility attribute, a layer attribute, an informational attribute and an internal node attribute.

43. The method of claim 27, wherein said at least one ZUI attribute or element is a scene element, said scene element specifying that said ZUI is to place a scene as a child of a current scene.

44. The method of claim 43, wherein said scene element includes at least one of:
an x position attribute, a y position attribute, a width attribute, a height attribute, a link attribute and a transition attribute, wherein said transition attribute specifies a type of transition effect to use for a subscene.

45. The method of claim 27, wherein said at least one ZUI attribute or element is a scene swap element, said scene swap element sets up transition effects between a first scene and a second scene of said ZUI.

46. The method of claim 45, wherein said scene swap element includes at least one of:
a cover attribute which identifies an element to use in a scene swap effect, a start attribute which specifies when said first scene is to begin being swapped with said second scene, an end attribute which specifies when said scene background is to finish being swapped with said second scene and an inherits attribute which specifies which element the scene swap transition is to inherit behavior from.

47. The method of claim 27, wherein said at least one ZUI attribute or element is a text rectangle element, said text rectangle element specifying bounds in which to render text in said ZUI.

48. The method of claim 47, wherein said text rectangle element includes at least one of:
an x position attribute, a y position attribute, a width attribute, a height attribute, a font-family attribute, a fill attribute, a font-size attribute, a pointer-events attribute, a visibility attribute, a preserve aspect ratio attribute, a metadata attribute, a layer attribute, an informational attribute, an internal node attribute, a text justification attribute, a text allcaps attribute, a minimum font size attribute and a cursor attribute.

49. The method of claim 27, wherein said at least one ZUI attribute or element is a transition element, said transition element specifies a parent node for transition parameter elements.

50. The method of claim 49, wherein said transition element includes at least one of:
a duration attribute, a history attribute, a background-zoom attribute, and an inherits attribute.

51. The method of claim 27, wherein said at least one ZUI attribute or element is a video element, said video element specifies a node capable of playing video and other multimedia content.

52. The method of claim 51, wherein said video element includes at least one of:
an x position attribute, a y position attribute, a width attribute, a height attribute, a state attribute, a playback rate attribute, a feed attribute, a pointer-events attribute, a visibility attribute, a layer attribute, an informational attribute, an internal node attribute, a preserve aspect ration attribute, a metadata attribute, a link attribute and a cursor attribute.

53. A system for displaying scenes on a zoomable user interface (ZUI) comprising:
means for providing a collection of scenes for display on said ZUI, each of said scenes being implemented using software written in a programming language;
means for identifying user inputs related to said ZUI, including a user input for requesting a change from a first scene to a second scene in said collection of scenes; and
means for transitioning from said first scene to said second scene by a transition conveying a spatial relationship between said first scene and said second scene within said ZUI,
wherein said means for transitioning perform said transition in a manner which is implemented by at least one ZUI attribute or element included in said software written in said programming language and associated with said first scene or said second scene.

54. A computer-readable medium containing instructions which, when executed on a computer, perform the steps of:
providing a collection of scenes for display on a zoomable user interface (ZUI), each of said scenes being implemented using software written in a programming language;
identifying user inputs related to said ZUI, including a user input for requesting a change from a first scene to a second scene in said collection of scenes; and
transitioning from said first scene to said second scene, while conveying a spatial relationship between said first scene and said second scene within said ZUI,
wherein a manner in which said transitioning is performed is implemented by at least one ZUI attribute or element included in said software written in said programming language and associated with said first scene or said second scene.

* * * * *